United States Patent
Kim et al.

(10) Patent No.: US 12,389,481 B2
(45) Date of Patent: *Aug. 12, 2025

(54) METHOD AND DEVICE FOR TRANSMITTING AND RECEIVING SIGNIFICANT UPDATE INFORMATION REGARDING SPECIFIC AP VIA MANAGEMENT FRAME IN WIRELESS LAN SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Insun Jang, Seoul (KR); Sunhee Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,356

(22) Filed: Apr. 22, 2024

(65) Prior Publication Data

US 2024/0276573 A1  Aug. 15, 2024

Related U.S. Application Data

(63) Continuation of application No. 18/316,643, filed on May 12, 2023, now Pat. No. 11,997,735, which is a
(Continued)

(30) Foreign Application Priority Data

Mar. 16, 2021  (KR) ........................ 10-2021-0034131

(51) Int. Cl.
  *H04W 76/15* (2018.01)
  *H04W 76/20* (2018.01)
  *H04W 84/12* (2009.01)

(52) U.S. Cl.
  CPC ........... *H04W 76/15* (2018.02); *H04W 76/20* (2018.02); *H04W 84/12* (2013.01)

(58) Field of Classification Search
  CPC ..... H04W 76/15; H04W 76/20; H04W 84/12; H04W 68/00; H04W 28/06; H04W 76/11;
  (Continued)

(56) References Cited

U.S. PATENT DOCUMENTS

2020/0404737 A1  12/2020  Cariou et al.
2021/0014776 A1  1/2021  Patil et al.
(Continued)

FOREIGN PATENT DOCUMENTS

CN   111935800    11/2020

OTHER PUBLICATIONS

Korean Intellectual Property Office Application No. 10-2023-7012318, Notice of Allowance dated May 29, 2024, 3 pages.
(Continued)

*Primary Examiner* — Will W Lin
(74) *Attorney, Agent, or Firm* — LEE, HONG, DEGERMAN, KANG & WAIMEY

(57) ABSTRACT

Proposed are a method and a device for receiving significant update information regarding a specific AP via a management frame in a WLAN system. Specifically, a reception MLD receives a management frame from a transmission MLD via a first link. The reception MLD decodes the management frame. The management frame includes a notification method mode field. If a significant update on a second transmission STA occurs, a value of the notification method mode field is set to 1, and the management frame includes significant update information of the second transmission STA.

9 Claims, 57 Drawing Sheets

Related U.S. Application Data continuation of application No. PCT/KR2022/003537, filed on Mar. 14, 2022.

(58) Field of Classification Search
CPC .. H04W 48/10; H04L 27/2603; H04L 5/0053; H04L 5/0091; H04L 27/2602; H04L 69/14; H04L 5/0048; H04L 27/2613; Y02D 30/70

See application file for complete search history.

(56) References Cited

U.S. PATENT DOCUMENTS

| | | | |
|---|---|---|---|
| 2021/0321410 A1* | 10/2021 | Patil | H04W 72/0446 |
| 2022/0132419 A1* | 4/2022 | Kwon | H04W 48/12 |
| 2022/0183062 A1* | 6/2022 | Seok | H04W 28/0278 |
| 2023/0071851 A1* | 3/2023 | Gan | H04L 69/14 |
| 2023/0110142 A1* | 4/2023 | Gan | H04W 76/11 370/312 |
| 2023/0262768 A1* | 8/2023 | Ko | H04W 76/15 |

OTHER PUBLICATIONS

European Patent Office Application Serial No. 22771707.1, Search Report dated May 23, 2024, 13 pages.
Patil et al., "MLO Indication of Critical Updates," IEEE 802.11-20/0586r4, Apr. 2020, 17 pages.
Patil et al., "MLO Indication of Critical Updates," IEEE 802.11-20/0586r8, Apr. 2020, 21 pages.
"Draft Standard for Information technology—Telecommunications and information exchange between systems Local and metropolitan area networks—Specific requirements," IEEE P802.11be TM/D1.0, May 2021, 772 pages.
European Patent Office Application Serial No. 22771707.1, Search Report dated Feb. 3, 2025, 10 pages.
LAN/MAN Standards Committee of the IEEE Computer Society, Draft Standard for Information technology-Telecommunications and information exchange between systems Local and metropolitan are networks-Specific requirements, Part 11: Wireless LAN Medium Access Control (MAC) and Physical Layer (PHY) Specifications, Amendment 8: Enhancements for extremely high throughput (EHT), IEEE P802.11beTM/D0.3, Jan. 2021, pp. 1-90.
LAN/MAN Standards Committee of the IEEE Computer Society, Draft Standard for Information technology-Telecommunications and information exchange between systems Local and metropolitan are networks-Specific requirements, Part 11: Wireless LAN Medium Access Control (MAC) and Physical Layer (PHY) Specifications, Amendment 8: Enhancements for extremely high throughput (EHT), IEEE P802.11beTM/D0.3, Jan. 2021, pp. 91-160.
LAN/MAN Standards Committee of the IEEE Computer Society, Draft Standard for Information technology-Telecommunications and information exchange between systems Local and metropolitan are networks-Specific requirements, Part 11: Wireless LAN Medium Access Control (MAC) and Physical Layer (PHY) Specifications, Amendment 8: Enhancements for extremely high throughput (EHT), IEEE P802.11beTM/D0.3, Jan. 2021, pp. 161-245.
LAN/MAN Standards Committee of the IEEE Computer Society, Draft Standard for Information technology-Telecommunications and information exchange between systems Local and metropolitan are networks-Specific requirements, Part 11: Wireless LAN Medium Access Control (MAC) and Physical Layer (PHY) Specifications, Amendment 8: Enhancements for extremely high throughput (EHT), IEEE P802.11beTM/D0.3, Jan. 2021, pp. 246-330.
LAN/MAN Standards Committee of the IEEE Computer Society, Draft Standard for Information technology-Telecommunications and information exchange between systems Local and metropolitan are networks-Specific requirements, Part 11: Wireless LAN Medium Access Control (MAC) and Physical Layer (PHY) Specifications, Amendment 8: Enhancements for extremely high throughput (EHT), IEEE P802.11beTM/D0.3, Jan. 2021, pp. 331-389.

* cited by examiner

FIG. 1
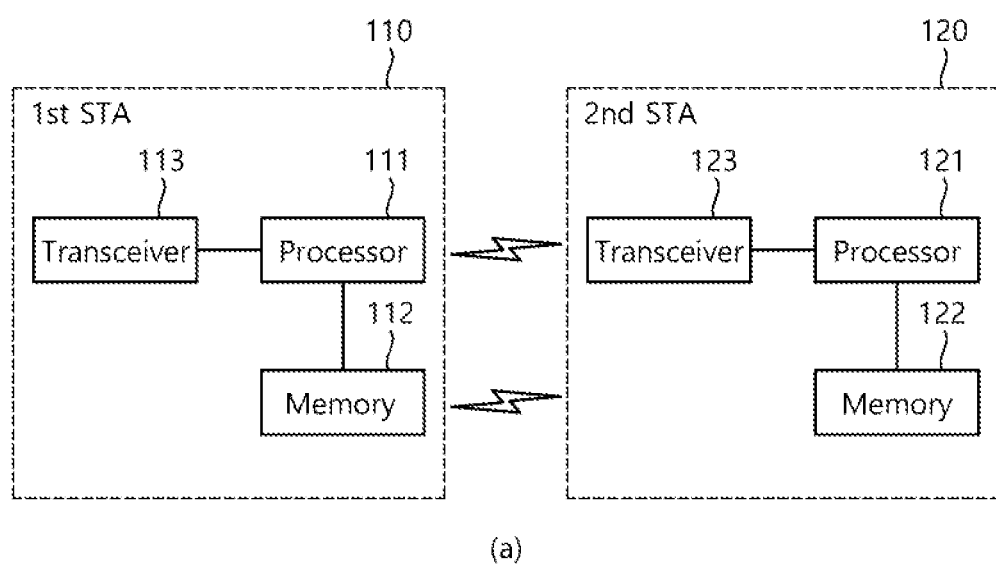
(a)
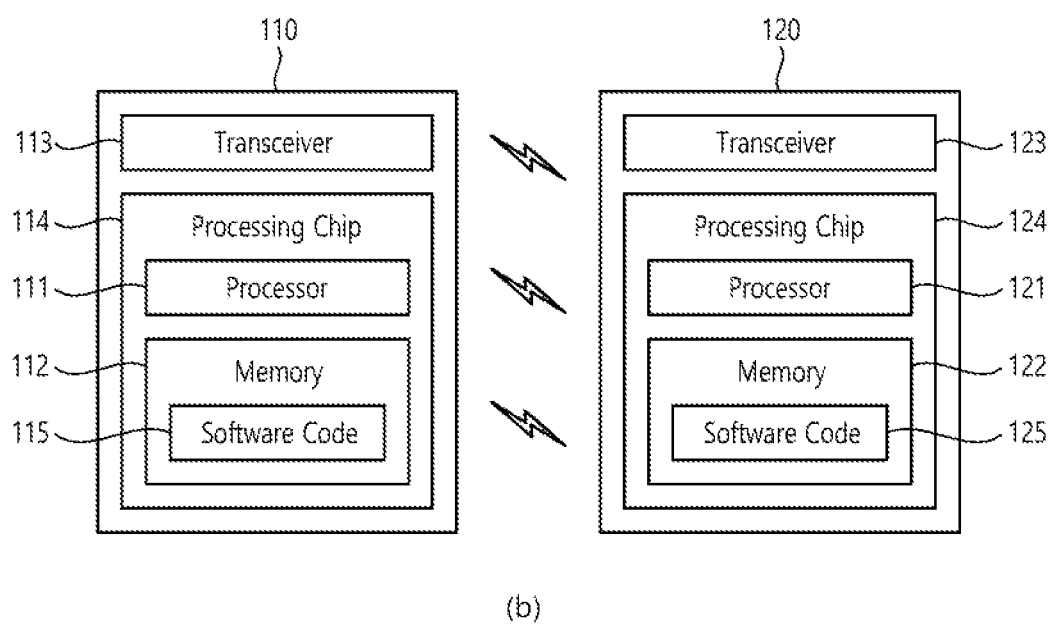
(b)

FIG. 2
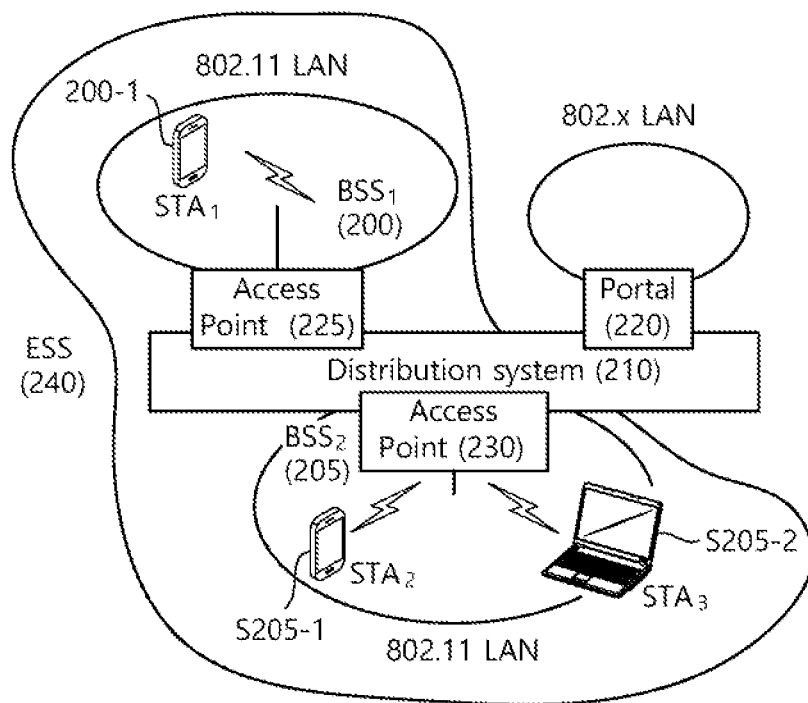
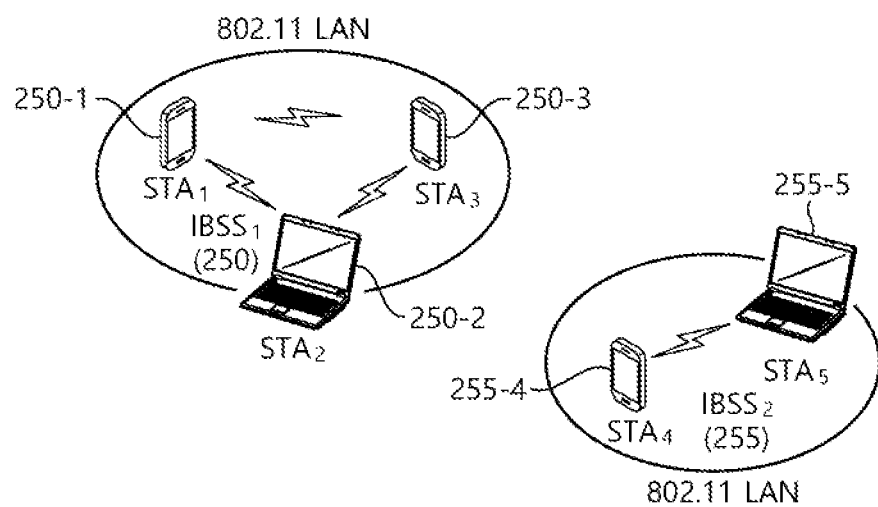

FIG. 4
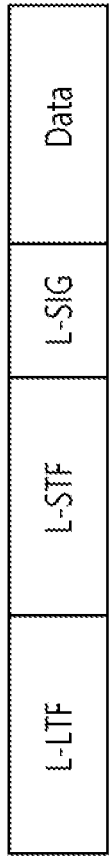
PPDU Format (IEEE 802.11a/g)
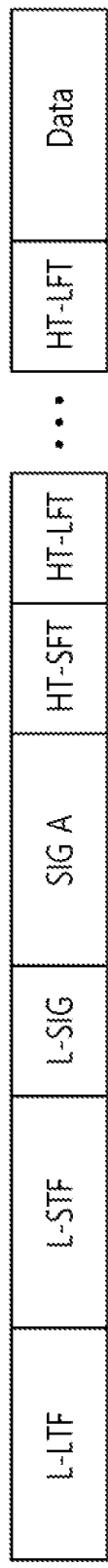
HT PPDU Format (IEEE 802.11n)
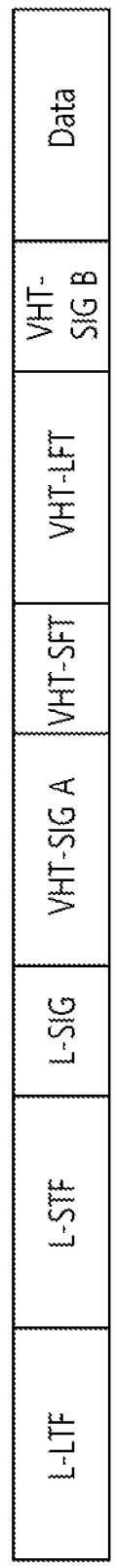
VHT PPDU Format (IEEE 802.11ac)
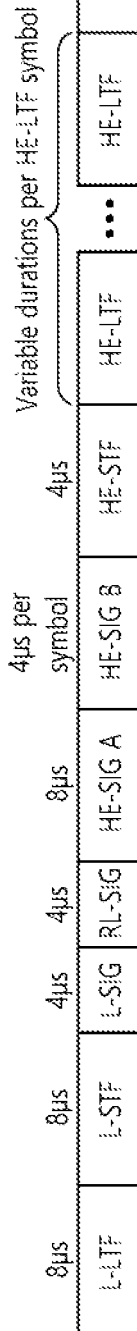

FIG. 12

| Multi-link STA | | |
|---|---|---|
| 5GHz | 6GHz | |
| STA 1 Link 1 | STA 2 Link 2 | STA 3 Link 3 |

FIG. 55

| B0 | B1 | B2 B3 | B4 | B5 | B6 | B7 |
|---|---|---|---|---|---|---|
| ESS | IBSS | Reserved | Privacy | Short Preamble | Critical Update Flag | Announcement method Mode |

| B8 | B9 | B10 | B11 | B12 | B13 | B14 | B15 |
|---|---|---|---|---|---|---|---|
| Spectrum Management | QoS | Short Slot Time | APSD | Radio Measurement | EPD | Reserved | Reserved |

METHOD AND DEVICE FOR TRANSMITTING AND RECEIVING SIGNIFICANT UPDATE INFORMATION REGARDING SPECIFIC AP VIA MANAGEMENT FRAME IN WIRELESS LAN SYSTEM

CROSS-REFERENCE TO RELATED APPLICATIONS

This application is a continuation of U.S. patent application Ser. No. 18/316,643, filed on May 12, 2023, which is a continuation of International Application No. PCT/KR2022/003537, filed on Mar. 14, 2022, which claims the benefit of earlier filing date and right of priority to Korean Application No. 10-2021-0034131, filed on Mar. 16, 2021, the contents of which are all hereby incorporated by reference herein in their entireties.

TECHNICAL FIELD

The present specification relates to a multi-link operation in a wireless LAN system, and more particularly, to a method and apparatus for transmitting and receiving critical update information for a specific AP through a management frame.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for transmitting and receiving critical update information for a specific AP through a management frame in a WLAN system.

An example of this specification proposes a method for requesting transmitting and receiving critical update information of another AP through an ML element.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for configuring a management frame notifying that an announcement frame including critical update information for a specific AP in a transmitting MLD will be transmitted based on an announcement method mode field. Here, the transmitting MLD may correspond to the AP MLD, and the receiving MLD may correspond to the non-AP MLD. A first transmitting STA connected to a first receiving STA included in the receiving MLD through a first link may correspond to a peer AP, the second and third transmitting STAs connected through different links (second and third links) may correspond to different APs.

A receiving multi-link device (MLD) receives a management frame from a transmitting MLD through a first link.

The receiving MLD decodes the management frame.

The transmitting MLD includes a first transmitting station (STA) operating on the first link and a second transmitting STA operating on a second link. The receiving MLD includes a first receiving STA operating on the first link and a second receiving STA operating on the second link.

The management frame includes an announcement method mode field.

When a critical update for the second transmitting STA occurs, a value of the announcement method mode field is set to 1, and the management frame includes critical update information of the second transmitting STA.

When the value of the announcement method mode field is set to 1, the announcement method mode field may include information indicating that the management frame will be transmitted until the next delivery traffic indication message (DTIM) of the first transmitting STA.

At this time, the management frame may be a beacon frame or an unsolicited probe response frame. The beacon frame or the unsolicited probe response frame may be broadcast.

That is, this embodiment proposes a method of notifying that an announcement frame including critical update information for a specific AP of a transmitting MLD will be transmitted by including an announcement method mode field in the management frame.

According to the embodiment proposed in this specification, the first receiving STA of the receiving MLD receives the beacon frame or the unsolicited probe response frame from the first transmitting STA of the transmitting MLD without transmitting a separate request message, thereby the first receiving STA obtains critical update information of other transmitting STAs. Accordingly, there is an effect that frame overhead can be reduced because the first receiving STA does not transmit the separate request message. In addition, when another receiving STA in the receiving MLD operates in Power Saving (PS) mode, critical update information of other transmitting STAs can be obtained without waking the corresponding receiving STA, so a power saving effect can be expected.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 12 shows an example of a non-AP MLD.

FIG. 55 shows the format of the Capability information field of a Beacon frame.

DETAILED DESCRIPTION

Figure 3:
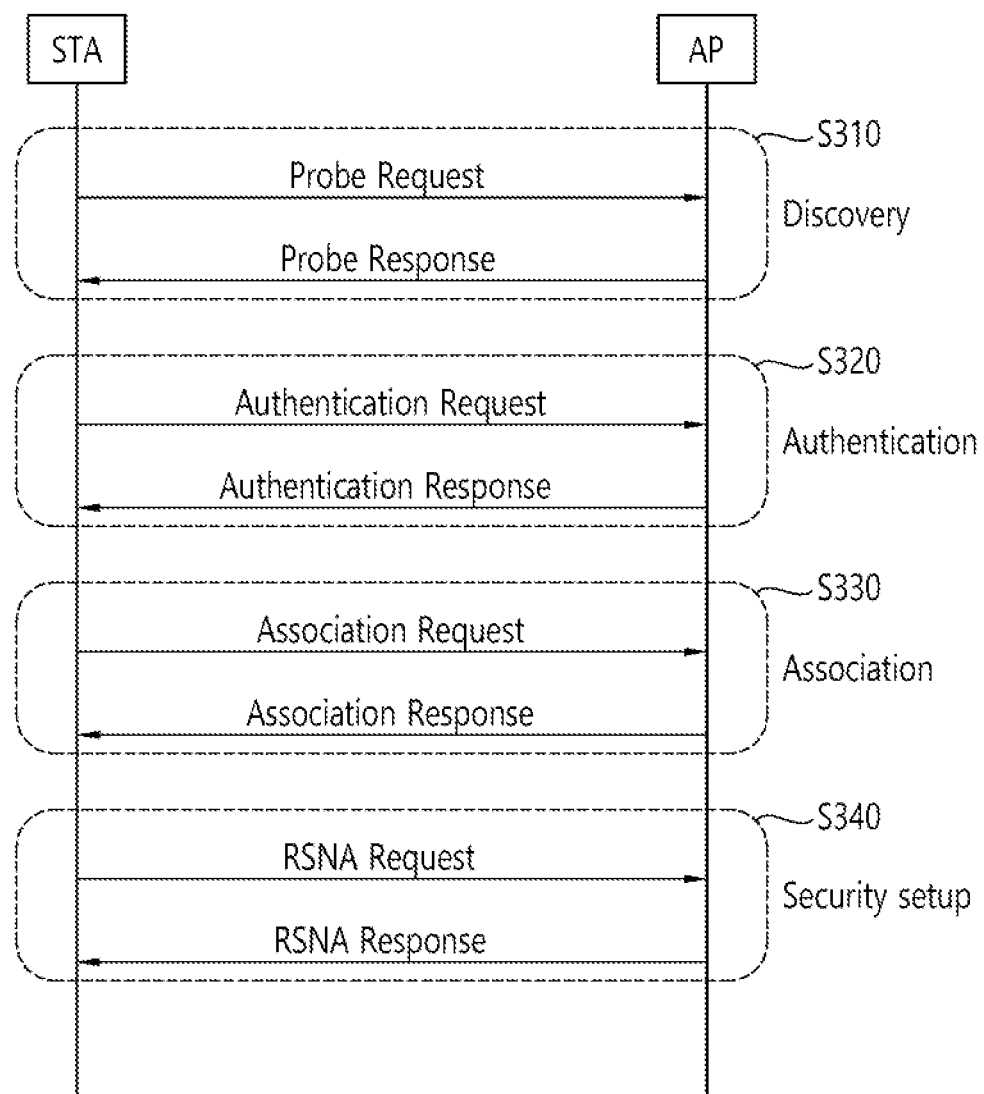
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
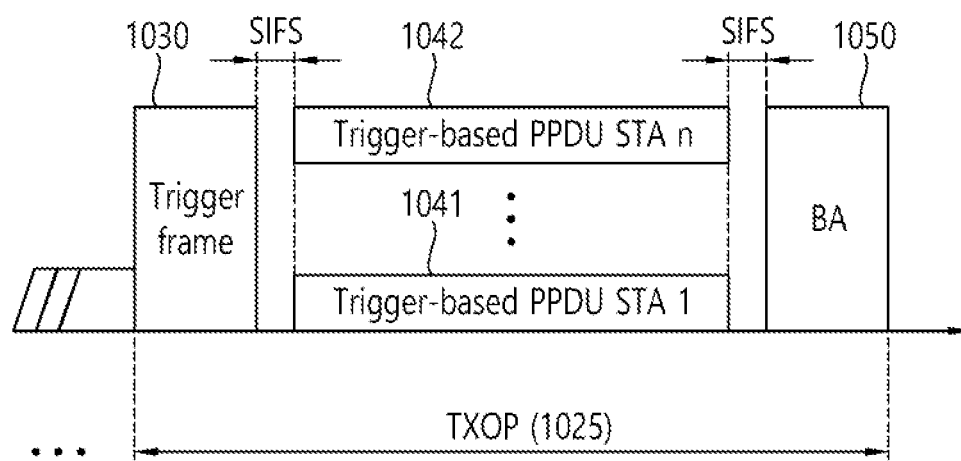
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
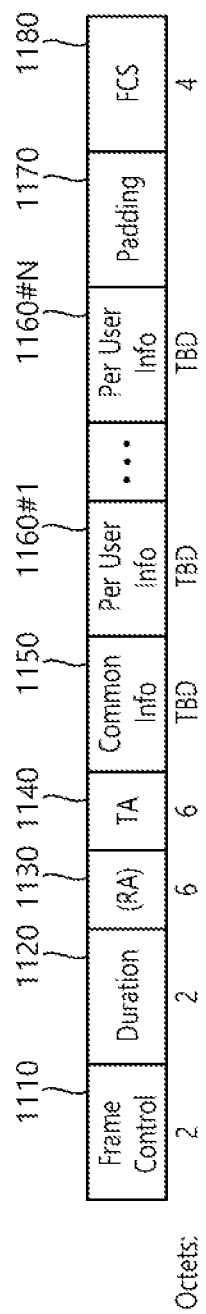
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
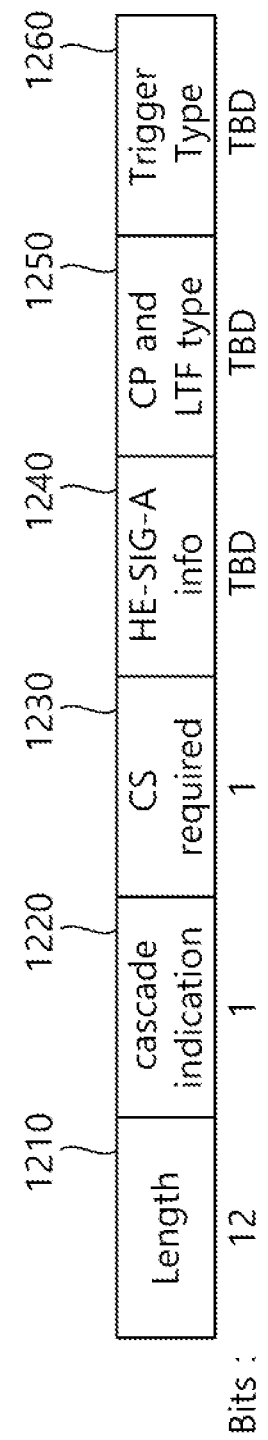
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
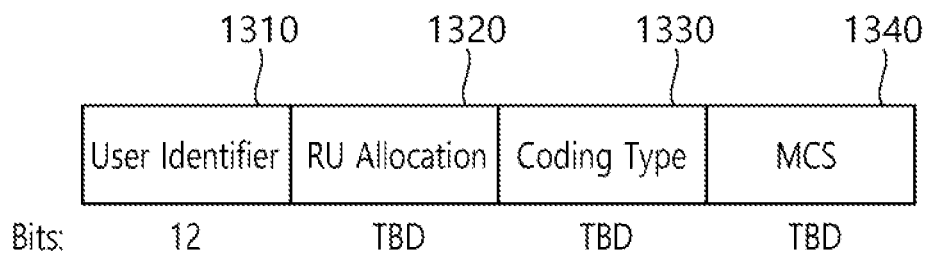
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
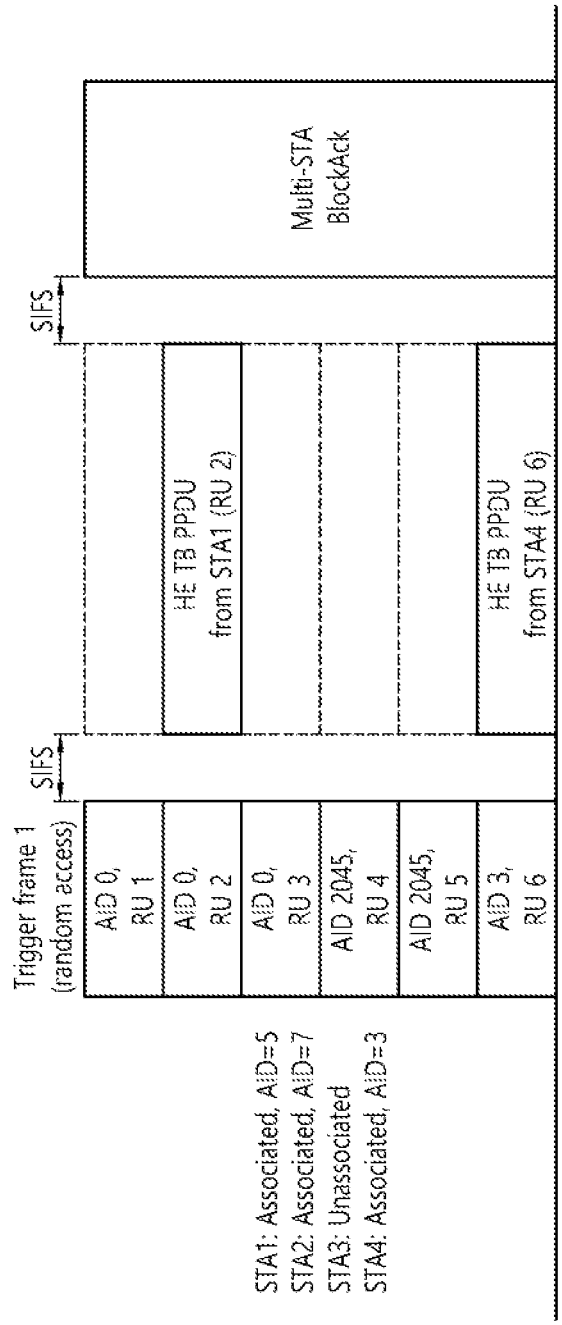
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

Figure 10:
FIG. 10 illustrates an example of a PPDU used in the present specification.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 µs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/

RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
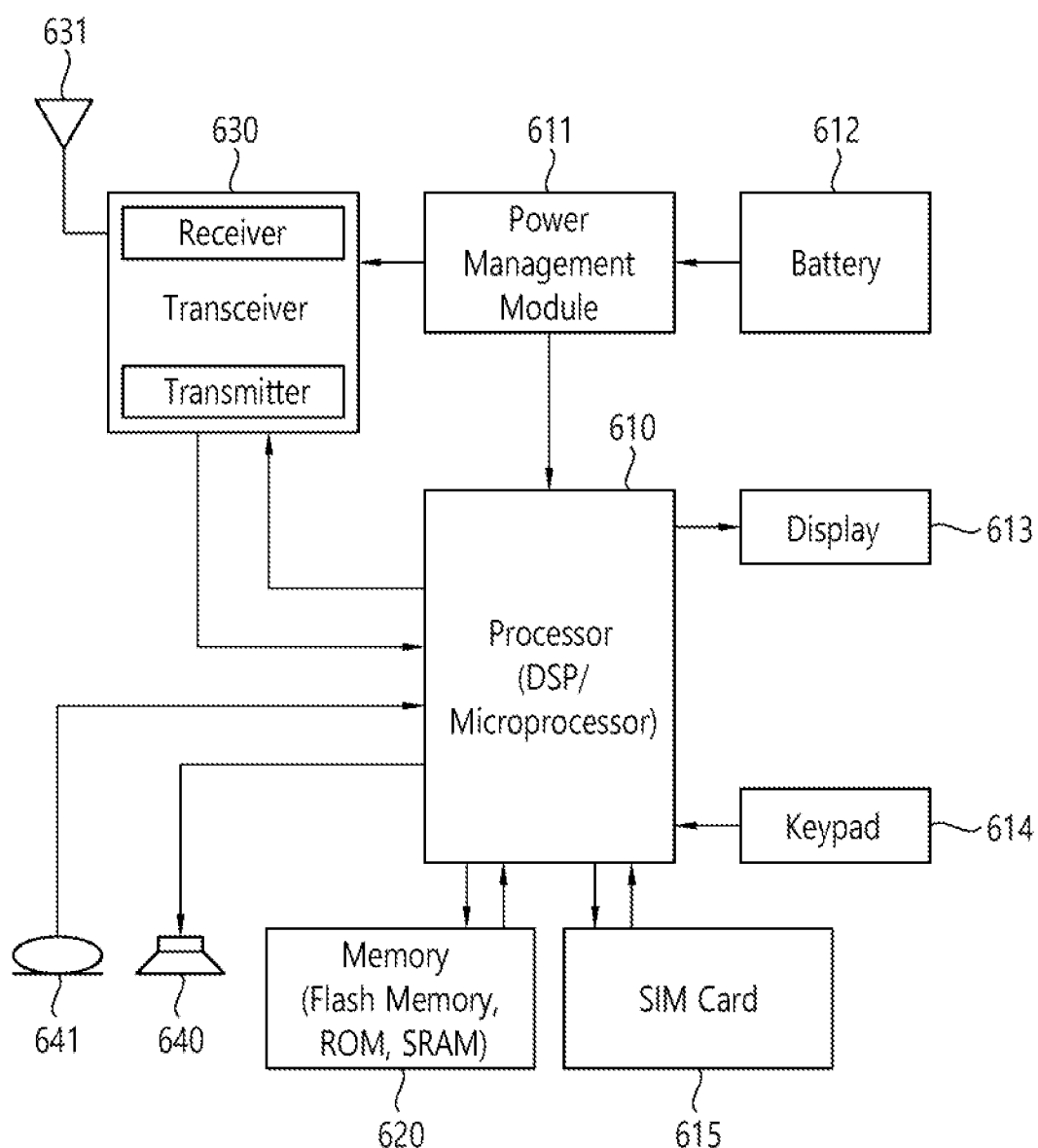
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHz band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHz/6 GHz band) and at least one channel within the 5 GHz band (or 2.4 GHz/6 GHz band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device; MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC_BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11ax, a multi-link environment in which one or more bands are simultaneously used is considered. When a device supports multi-link, the device can simultaneously or alternately use one or more bands (e.g., 2.4 GHz, 5 GHz, 6 GHz, 60 GHz, etc.).

In the following specification, MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

In the following specification, for convenience of explanation, it is described that the MLD (or the processor of the MLD) controls at least one STA, but is not limited thereto. As described above, the at least one STA may transmit and receive signals independently regardless of MLD.

According to an embodiment, an AP MLD or a non-AP MLD may have a structure having a plurality of links. In other words, a non-AP MLD can support multiple links. A non-AP MLD may include a plurality of STAs. A plurality of STAs may have Link for each STA.

In the EHT standard (802.11be standard), the MLD (Multi-Link Device) structure in which one AP/non-AP MLD supports multiple links is considered as a major technology. STAs included in the non-AP MLD may transmit information about other STAs in the non-AP MLD together through one link. Accordingly, there is an effect of reducing the overhead of frame exchange. In addition, there is an effect of increasing the link use efficiency of the STA and reducing power consumption.

Here, multi-link may include multi-band. That is, multi-link can represent links of several bands and multiple multi-links within one band at the same time.

FIG. 12 shows an example of a non-AP MLD.

FIG. 12 is an example of a structure in which one non-AP MLD has several Links. As shown in FIG. 12, the non-AP MLD has several STAs and each STA has a link. This has the same structure for AP MLD.

As such, in the case of an AP/non-AP MLD supporting Multi-Link, each AP of the AP MLD and each STA of the non-AP MLD are connected through each link through a link setup process. And at this time, the connected link can be changed or reconnected to another link by AP MLD or non-AP MLD depending on circumstances.

In addition, EHT (802.11be) considers the concept of dividing links into anchored/non-anchored links as a major technology to reduce power consumption. (However, the names for anchored link and non-anchored link may be changed in the future.) AP MLD supporting multi-link designates and manages each link as an anchored link or non-anchored link. AP MLD supports one or more links among multiple links as Anchored Link, and non-AP MLD selects and uses one or more of its own anchored links from the Anchored Link List (list of anchored links supported by AP MLD). Anchored link is used for non-data frame exchange (i.e. Beacon and Management frame) as well as frame exchange for synchronization, and non-anchored link is used only for data frame exchange. The non-AP MLD monitors only the anchored link for Beacon and Management frame reception during the idle period. Therefore, in the case of non-AP MLD, at least one anchored link must be connected to receive beacon and management frame, and this anchored link must always maintain an enable state. In contrast, since the non-anchored link is used only for data frame exchange, the STA corresponding to the non-anchored link can reduce power consumption by entering doze during the idle period when the channel is not used.

In addition, when an AP MLD and a non-AP MLD are connected through multiple links through multi-link setup, 802.11be considers cross-link signaling that transmits information about another link through one link.

Figure 13:
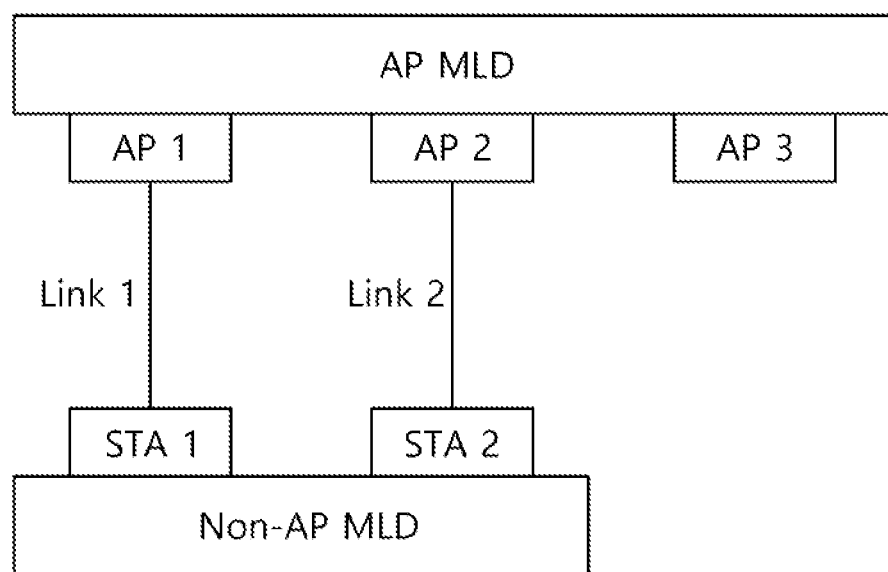
FIG. 13 shows an example of link connection between MLDs.

FIG. 13 shows an example of link connection between MLDs.

For example, as shown in FIG. 13, when an AP MLD and a non-AP MLD are connected by two links, AP 1 may transfer information about AP 2 to the non-AP MLD through Link 1.

This characteristic can be usefully used when the non-AP MLD is PS mode. In general, in order for the AP MLD to deliver information to STA 2, Link 2 must be used, but it can be delivered to STA 2 through Link 1 through cross-link signaling. However, for this purpose, information sharing capability capable of sharing information between STAs of non-AP MLD is required.

At this time, if STA 2 of the non-AP MLD enters the doze state due to PS mode, if there is information to be transmitted by AP 2, it can be transmitted through Link 1 without awakening STA 2 through cross-link signaling.

In the present specification, when there is changed information (e.g. critical update) among APs (i.e., BSSs) of the AP MLD, a method of notifying the connected non-AP STA of this information is proposed.

1.1 Announcement Method

In this specification, we propose a method of notifying the connected STA whenever critical information (e.g. critical update, BSS Parameters, Capabilities, Operation element, NSEP Priority Access, etc.) of the AP is changed or created (e.g. Low latency data traffic occurs).

In general, an STA may receive change information or new information of an AP through a periodically transmitted beacon frame, but in the case of specific information, since it may affect the transmission operation of the STA from the time of change, there may also be information that needs to be notified to the STA at the moment an event occurs. For example, in 802.11be, non-Simultaneous TX/RX (non-STR) capability caused by multi-link characteristics may cause restrictions on the TX/RX operation of the STA due to inter-link interference during data transmission. Information may be insufficient to convey through a beacon. In addition, in 802.11be, a change sequence field (or change sequence element, etc., information indicating a change sequence number) is included in a beacon or probe response frame to provide the STA with specific information (e.g., reporting AP or reported APs) for a specific AP. For example, elements classified as critical update events in 802.11be) are updated or not. For example, when specific BSS parameter information is changed, the AP notifies the STA of the changed BSS information and the version information (i.e., number) of the changed information in the beacon as a change sequence field, when the STA receives a sequence number different from the previously received version information, it determines that the information has been updated, and transmits a probe request to the updated BSS to receive the information. At this time, if the STA connected to the updated BSS is in Doze state, it may be awake through cross-signaling and then directly request the changed information.

The AP may notify whether or not the BSS information has been updated through the change sequence field. At this time, it may inform which information has been updated through an indicator transmitted together.

First, when link indication information (e.g. Link ID) is transmitted along with the change sequence field, the AP can also notify whether other APs in the same AP MLD have updated their BSS information. If the STA receiving the increased change sequence field value through the Beacon frame (or other frame) from the AP receives the Link ID together with the change sequence field, it can know which AP of the connected AP MLD has updated BSS information.

Second, when element indication information (e.g. Element ID) is transmitted along with the change sequence field, the AP can notify which information has been updated. If the STA receiving the increased Change sequence field value through the Beacon frame (or other frame, for example, (Broadcast) Probe response frame, etc.) from the AP receives the Element ID along with the Change sequence field, the STA may know which information of the connected AP has been updated. For example, specific information may be indicated using a Request element, Extended element, or PV1 Probe Response Option element. At this time, if the AP transmits not only element indication information but also link indication information together with the change sequence field, the STA may know which information of which BSS of the connected AP MLD has been updated. This information can be useful because it is possible to know the presence or absence of changed information without service disruption when some links of the AP MLD undergo power saving. In particular, when an STA of a non-AP MLD that has entered power saving knows that it has updated BSS information through information received by another STA (i.e., Awake state) of the same non-AP MLD, rather than unconditionally Awake, depending on the situation (depending on the importance of the information), the AP MLD will be able to choose whether or not to Awake. At this time, when the AP MLD transmits all critical update IEs (i.e. all IE information classified as critical update events in 802.11be) together with link information of a specific AP and Change Sequence field information of the corresponding AP, the AP may notify that a critical update has occurred for a certain AP. Since the STA, receiving the increased Change Sequence field value compared to its current CSN information through a Beacon frame (or other frame, for example, (Broadcast) Probe response frame, etc.) from the AP, can receive all the most recent all Critical update IEs from the corresponding AP regardless of its current CSN value, it can be useful for long sleep devices.

Therefore, in this specification, an announcement method is proposed for an AP to notify its own critical information when an update occurs or when critical information occurs. Signaling for this may deliver changed information through a separate announcement frame, or may be delivered by piggybacking to a DL frame of the AP. At this time, a separate announcement frame may be a management frame (e.g. Broadcast Probe response, etc.) or a separate new frame may be defined for this. In this specification, both a method considering a device with a single link and a device with multi-link are considered for the announcement method. Section 1.1.1 proposes an explicit method that directly delivers changed information, and Section 1.1.2 proposes an implicit method that indirectly delivers changed information through indication. Additionally, Section 1.2 proposes an announcement method considering power saving.

1.1.1 Explicit Method for Announcement

In this section, when the BSS information of the AP MLD is changed, a method of directly notifying the STA of the changed information is proposed. The STA that has acquired the changed information through this method can obtain the changed information from the AP without a separate additional operation. Also, this method can be used for notifying low latency STAs that low latency traffic has occurred.

First, when the AP MLD is connected to a non-AP MLD or legacy STA with a single link, when the BSS information of the AP is changed, a method of notifying the STA of this is proposed.

If a critical update occurs in the AP, the changed information is included in a separate announcement frame (e.g. new definition frame or broadcast probe response, etc.) and transmitted to the connected STA. An embodiment for this is shown in FIG. 14.

Figure 14:
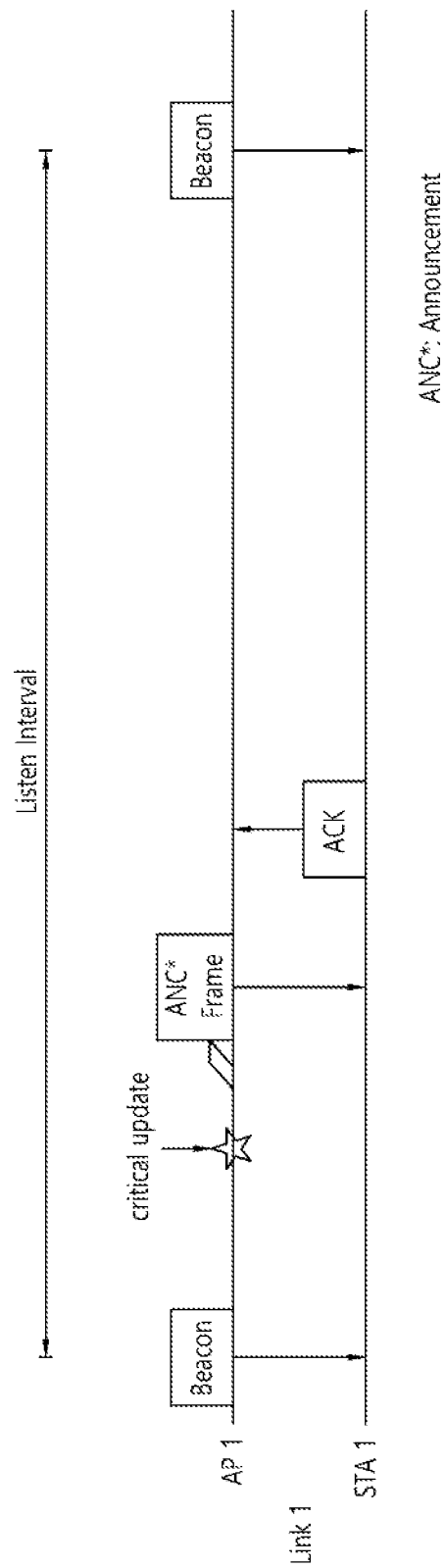
FIG. 14 shows an example of an announcement explicit method considering a single link device.

FIG. 14 shows an example of an announcement explicit method considering a single link device.

For example, when a channel switch occurs in the BSS of AP 1 (i.e., critical update), the STA may be notified of a change thereto through an announcement frame.

Figure 15:
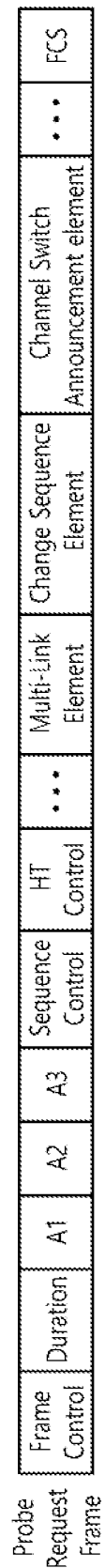
FIG. 15 shows an example of configuring an announcement frame using a probe response frame.

An embodiment of the case of using a probe response frame as an announcement frame for this is shown in FIG. 15.

FIG. 15 shows an example of configuring an announcement frame using a probe response frame.

For example, when a channel switch occurs in the BSS of a reporting AP (i.e., a critical update), corresponding information may be announced through a (Broadcast) Probe response. In this case, the corresponding probe response frame may inform the probe response by including CSN information (e.g. change sequence element) and changed parameter information (e.g. channel switch announcement) indicating that a critical update has occurred through the above form. That is, as the CSN of the AP is updated from 4 to 5, only the changed IE information is included in the frame and transmitted.

As described above, when a critical update occurs in the AP, only changed information may be notified through an announcement frame. A method of providing IE information is additionally proposed. For example, if the current CSN information of AP 1 is 5, STA 1 currently has CSN=4 information for AP 1, but STA 2 in long sleep has CSN=2 information for AP 1. Considering this, the AP may notify changed information through an announcement frame when a critical update event occurs. At this time, a frame including all IE information classified as a critical update event may be transmitted. At this time, all IE information classified as a critical update event means information defined in 802.11be. (In the current 802.11be, it is defined as 'The critical updates are defined in 11.2.3.15 (TIM Broadcast) and the additional update can be added if needed.') As such, when a critical update event occurs, the AP can provide the STA with the latest critical update information of the AP by transmitting an announcement frame (e.g. (Broadcast) Probe Response frame) including all critical update IEs defined in 802.11be.

Figure 16:
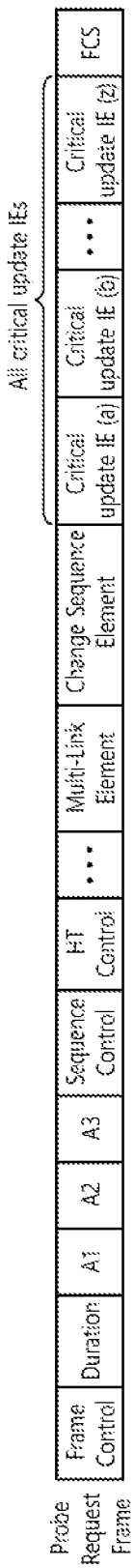
FIG. 16 shows another example of configuring an announcement frame using a probe response frame.

An embodiment of the case of using a (Broadcast) Probe response frame as an announcement frame for this is shown in FIG. 16.

FIG. 16 shows another example of configuring an announcement frame using a probe response frame.

For example, when a critical update event occurs in the BSS of a reporting AP, corresponding information may be announced through a (Broadcast) Probe response. In this case, the corresponding probe response frame can inform the information including CSN information indicating that a critical update has occurred (e.g. Change Sequence element) and information classified as all critical update events (i.e. all critical update IE information) in the frame as shown in FIG. 16. That is, when the CSN of the AP is updated from 4 to 5, all IE information related to the critical update (e.g. critical update IE (a), . . . , critical update IE (z)) is included in the frame and transmitted.

In addition, this method can also be used as a method of notifying the low latency STA when low latency data traffic occurs in the AP. For example, when data traffic for low latency STAs occurs in a specific AP, the corresponding information may be notified to the low latency STAs in a separate announcement frame. The low latency STA receiving the corresponding announcement frame may maintain the awake state without entering the doze state for information reception.

In addition, such changes may be notified to the STA by piggybacking them to a DL frame being transmitted instead of a separate announcement. If there is a DL frame to be transmitted by the AP after a critical update occurs, the AP may include these changes in the DL frame and transmit the same. An embodiment for this is shown in FIG. 17.

Figure 17:
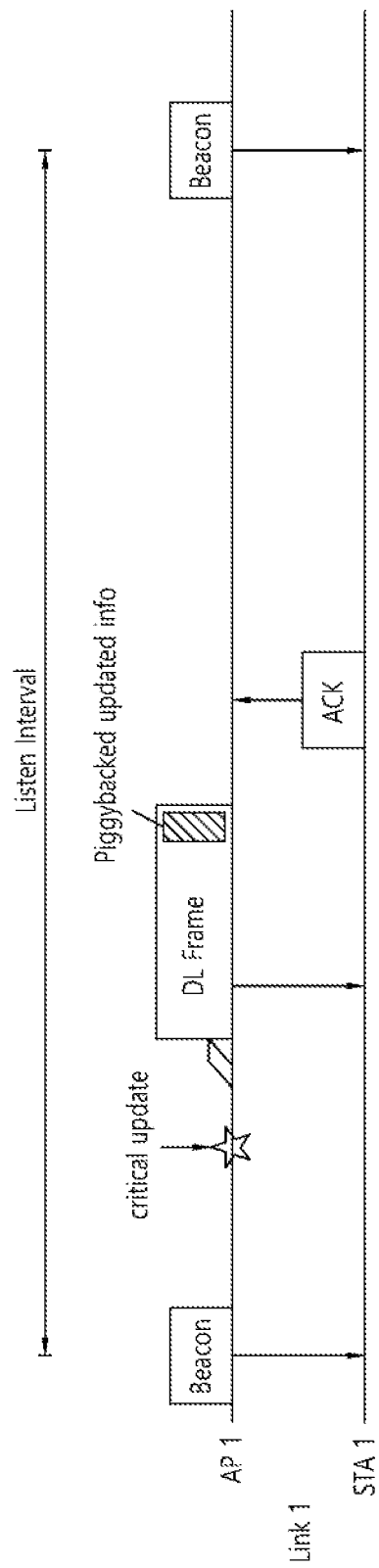
FIG. 17 shows another example of an announcement explicit method considering a single link device.

FIG. 17 shows another example of an announcement explicit method considering a single link device.

For example, when an operation element change occurs in the BSS of AP 1, if there is a DL frame to be transmitted from AP 1 to the STA before transmitting the next beacon, updated information may be included in the DL frame and transmitted. If there is a DL frame to be transmitted by AP 1, frame overhead can be reduced by not using a separate announcement frame through this method.

In this case, as shown in FIG. 17, when a critical update occurs in the AP, a DL Frame including not only changed information but all critical update IE information classified as a critical update event can be transmitted. An embodiment for this is shown in FIG. 18.

Figure 18:
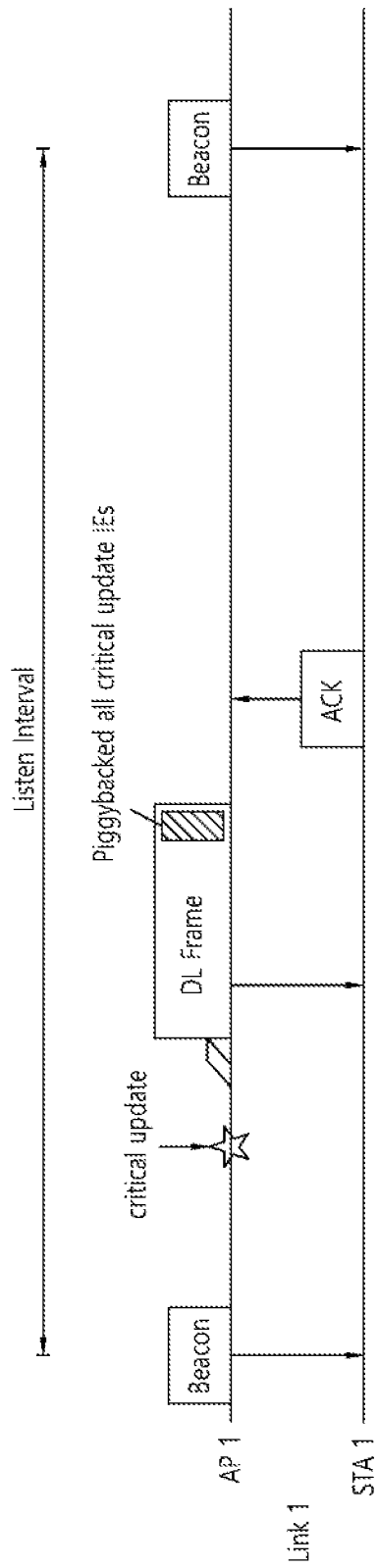
FIG. 18 shows another example of an announcement explicit method considering a single link device.

FIG. 18 shows another example of an announcement explicit method considering a single link device.

For example, when an operation element change occurs in the BSS of AP 1 (i.e., critical update), if there is a DL frame to be transmitted from AP 1 to the STA before the next beacon transmission, all critical update information for AP 1 may be included in the DL frame and transmitted. If there is a DL frame to be transmitted by AP 1, frame overhead can be reduced by not using a separate announcement frame through this method.

In addition, if critical information (e.g. low latency data traffic) occurs in the AP, the AP may transmit the information to the STA through a DL frame. At this time, this DL Frame may be a Data Frame or a TWT Frame. For example, when low latency data traffic occurs in an AP, it can piggyback a DL Frame or generate a separate DL Frame (e.g. TWT Frame) to deliver relevant critical information to the STA.

Second, when the AP MLD is connected to a non-AP MLD with multi-link, when the BSS information of the AP is changed, a method of notifying the STA of this is proposed. In 802.11be, cross-link signaling is considered by utilizing multi-link characteristics. Accordingly, through cross-link signaling, an AP MLD can inform a non-AP MLD of BSS information of other APs as well as its own BSS change information through its own link. An example of this is shown in FIG. 19.

Figure 19:
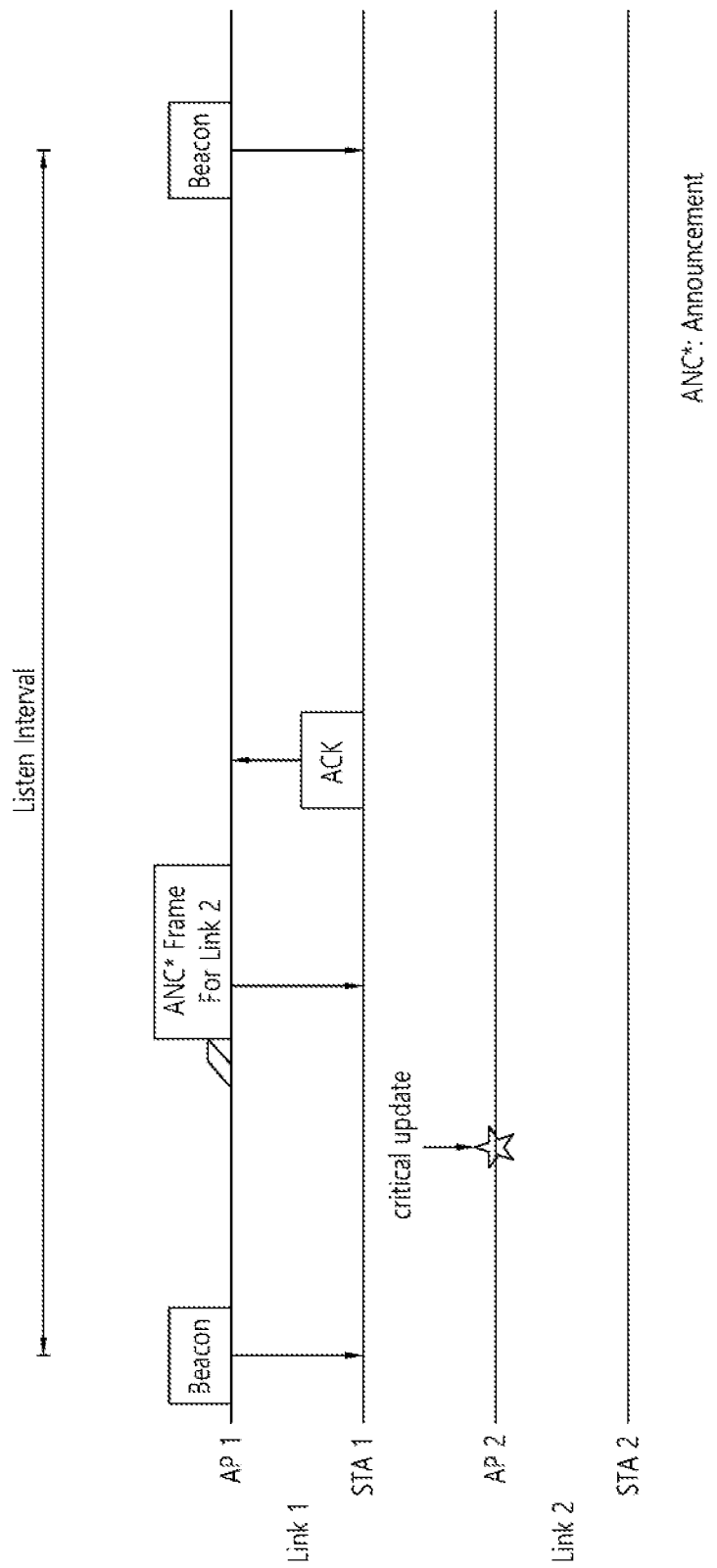
FIG. 19 shows an example of an announcement explicit method considering a multi-link device.

FIG. 19 shows an example of an announcement explicit method considering a multi-link device.

For example, when the BSS information of AP 2 is changed, the AP MLD may notify STA 2 of this by transmitting an announcement frame through Link 1 instead of Link 2. STA 1 receiving the announcement frame through Link 1 may deliver change information through information sharing. This cross-link signaling method can be used more usefully for STAs operating in PS mode because when STA 2 is in Doze state for power saving, it can transmit through Link 1 without awaking to receive changes.

Figure 20:
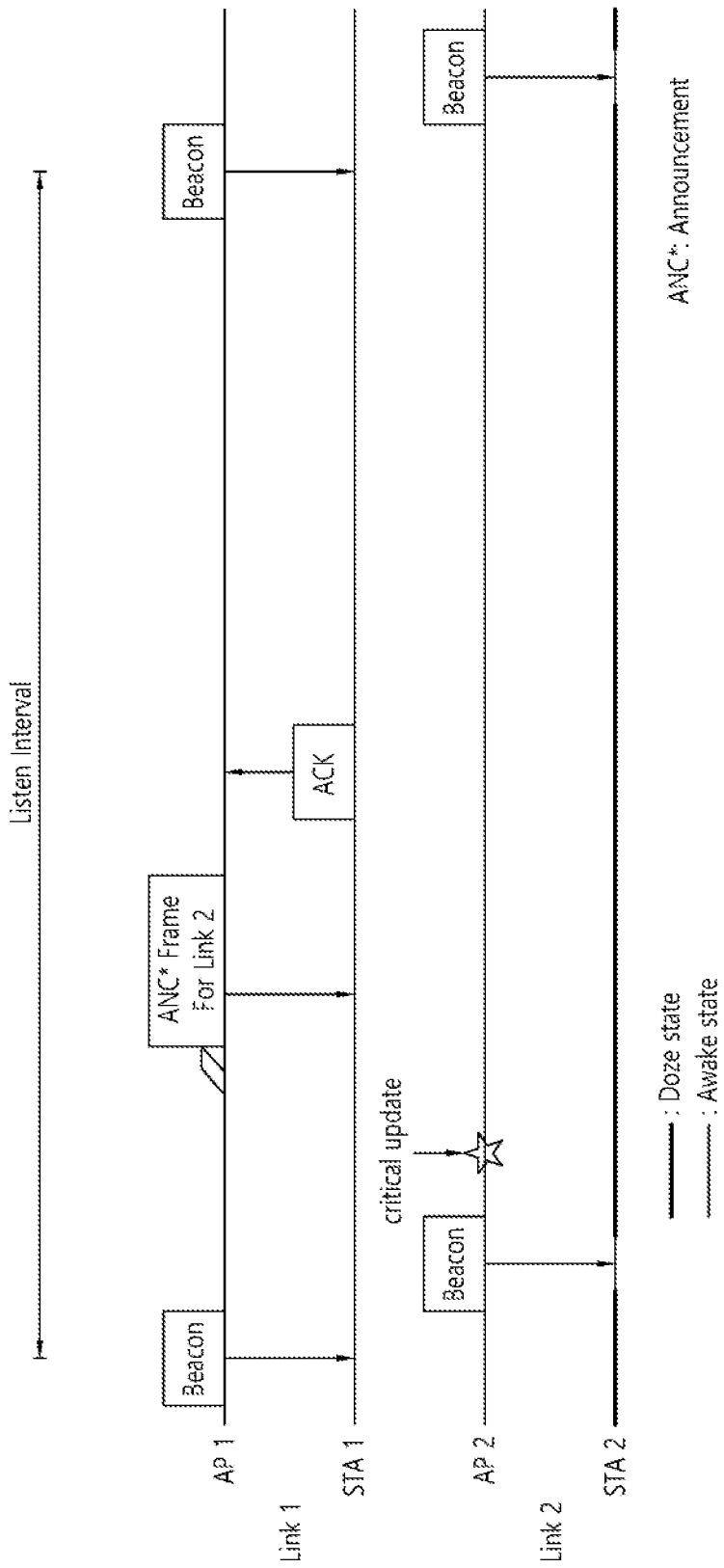
FIG. 20 shows an example of a cross-link signaling method for an STA operating in PS mode.

An example of this is shown in FIG. 20.

FIG. 20 shows an example of a cross-link signaling method for an STA operating in PS mode.

As shown in FIG. 20, if the proposed method is used when STA 2 operates in PS mode, even if a critical update occurs in AP 2, STA 2 can acquire change information of AP 2 without awakening. Utilizing this, STA 2 can further reduce power consumption.

Figure 21:
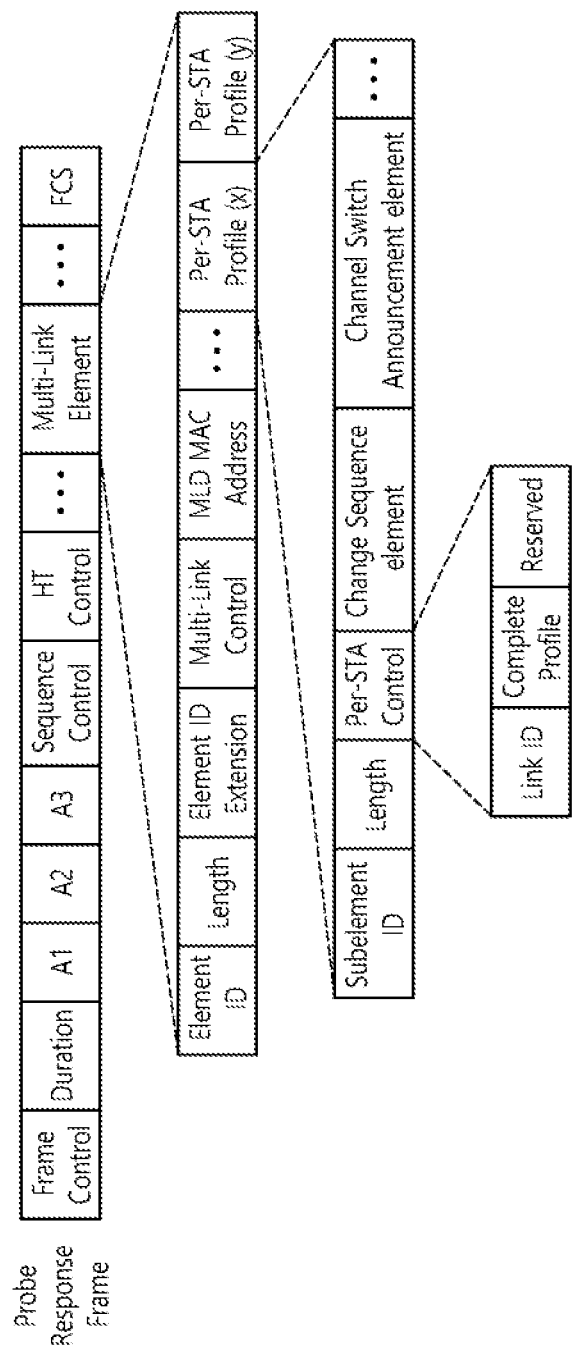
FIG. 21 shows another example of configuring an announcement frame using a probe response frame.

An embodiment of the case of using a probe response frame as an announcement frame for this is shown in FIG. 21.

FIG. 21 shows another example of configuring an announcement frame using a probe response frame.

For example, when a channel switch occurs in the BSS of AP (x) (i.e., critical update), corresponding information may be announced through a (Broadcast) Probe response. In this case, the corresponding probe response frame can notify CSN information (e.g. change sequence element) indicating that a critical update has occurred and changed parameter information (e.g. channel switch announcement) through the Multi-Link element of the probe response through the above form. In the case of a non-AP MLD operating in power save mode, since the corresponding Multi-Link element contains information on reported APs (i.e., other APs) rather than information on reporting APs, the STA may acquire change information that another STA in the doze state needs to know through the corresponding announcement frame. Additionally, all critical update information (i.e., all IE information classified as a critical update event in 802.11be) along with CSN information indicating that a critical update has occurred for another AP may be included in the frame and notified through the corresponding probe response frame. For example, it is assumed that AP 1 and AP 2 of the AP MLD and STA 1 and STA 2 of the non-AP MLD are connected through Link 1 and Link 2, and STA 2 enters the doze state due to power saving. At this time, when a critical update occurs in AP 2, it should be notified to STA 2, but since STA 2 is in a doze state, STA 2 must be awake to notify this. At this time, the AP MLD provides information on critical update of AP 2 through a (broadcast) probe response frame through Link 1, so that the non-AP MLD can obtain updated information without awake STA 2. Considering the multi-link characteristics of the AP MLD, the STA of the non-AP MLD can obtain critical update information about other APs through its own operating link, which can be useful for power saving. In this case, in particular, when a critical update event occurs for AP 2, AP 1 may notify the changed information about AP 2 through an announcement frame. At this time, a frame including all IE information classified as a critical update event for AP 2 may be transmitted. At this time, all IE information classified as a critical update event means information defined in 802.11be. (In the current 802.11be, 'The critical updates are defined in 11.2.3.15 (TIM Broadcast) and the additional update can be added if needed.') In this way, the AP MLD utilizes the multi-link feature, even when a critical update event occurs for another AP of the same AP MLD, through cross-link signaling an announcement frame (e.g. (Broadcast) Probe Response frame), the AP MLD may provide the STA with the latest critical update information of the AP.

Figure 22:
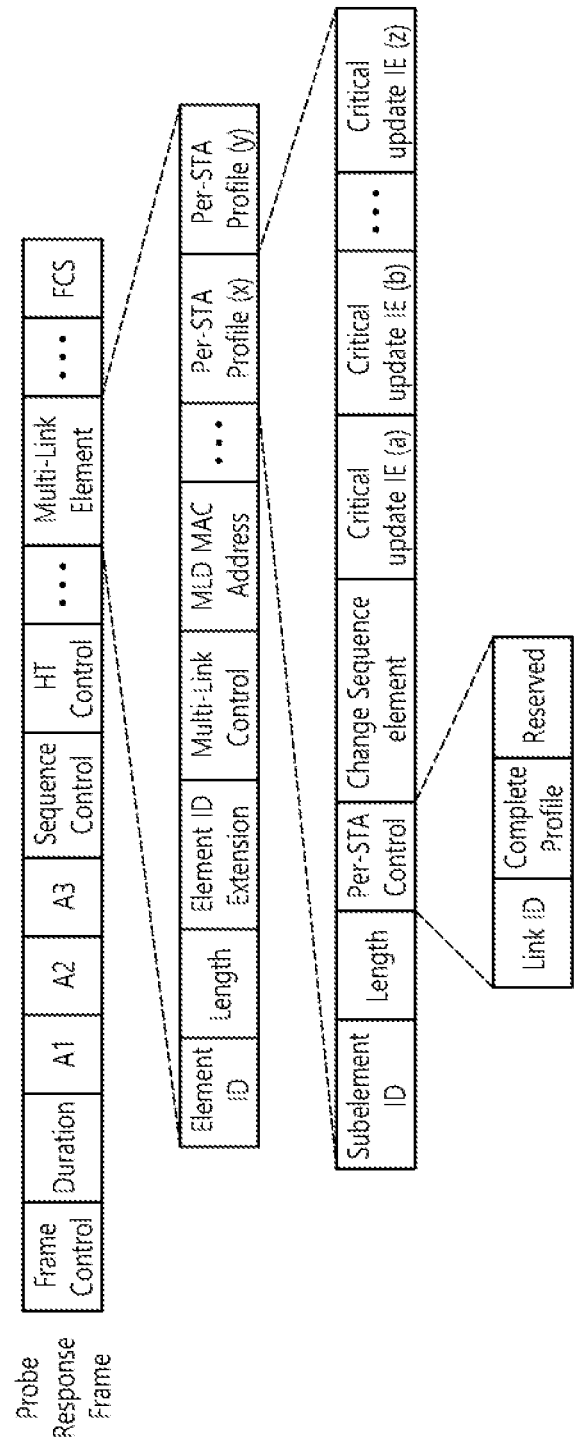
FIG. 22 shows another example of configuring an announcement frame using a probe response frame.

An embodiment of the case of using a (Broadcast) Probe response frame as an announcement frame for this is shown in FIG. 22.

FIG. 22 shows another example of configuring an announcement frame using a probe response frame.

For example, when a channel switch occurs in the BSS of AP (x) (i.e., critical update), corresponding information may be announced through a (Broadcast) Probe response. In this case, the corresponding probe response frame includes CSN information (e.g. change sequence element) indicating that a critical update has occurred through the above format and all critical update information (i.e. all IE information classified as a critical update event in 802.11be, Critical update IE (a), . . . . Critical update IE (z)) can be informed through the Multi-Link element of the probe response. Since the corresponding Multi-Link element contains information about the reported AP (i.e., other AP) rather than information about the reporting AP, in the case of a non-AP MLD operating in power save mode, an STA may acquire change information that another STA in doze state needs to know through a corresponding announcement frame. In this case, information on the reported AP may be included in Per-STA Profile (x) including a Link ID field corresponding to the reported AP.

Figure 23:
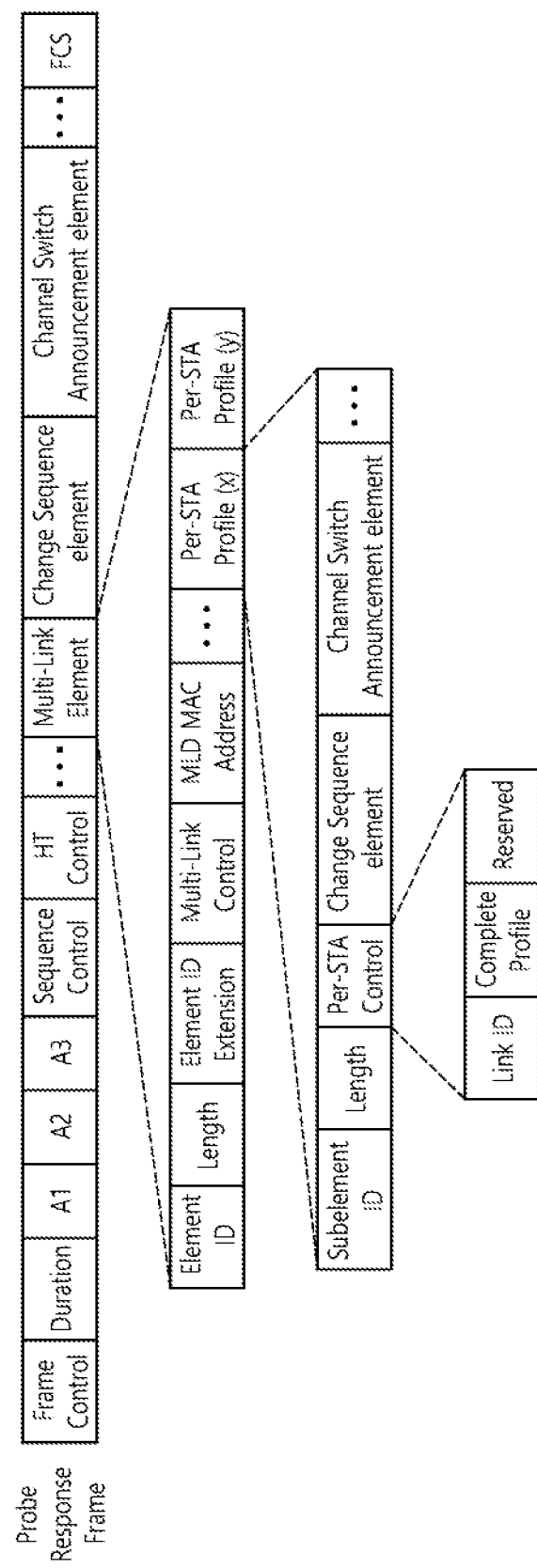
FIG. 23 shows another example of configuring an announcement frame using a probe response frame.

This method may be used in combination with the change information delivery method for the reporting AP mentioned above. An example of using the frame format of the probe response frame for this case is shown in FIG. 23. Through this form, the reporting AP can deliver critical change information about itself and change information about the reported AP according to circumstances.

FIG. 23 shows another example of configuring an announcement frame using a probe response frame.

In addition, the method of FIG. 23 can also be used as a method of notifying low latency STAs when low latency data traffic occurs in a specific AP of the AP MLD. In 802.11be, cross-link signaling is considered by utilizing multi-link characteristics. Accordingly, through cross-link signaling, the AP MLD can notify Low latency data traffic information generated in its own AP as well as Low latency data traffic information generated in other APs to Low latency STAs through its own link. When the STA receiving the announcement frame confirms low latency traffic for other STAs of the non-AP MLD to which it is connected, the corresponding other STA may awake in the doze state when in the doze state to receive information, or may maintain the awake state without entering the doze state when the other STA is in the awake state.

In addition, such changes may be notified to the STA by piggybacking them to a DL frame being transmitted instead of a separate announcement. An embodiment for this is shown in FIG. 24.

Figure 24:
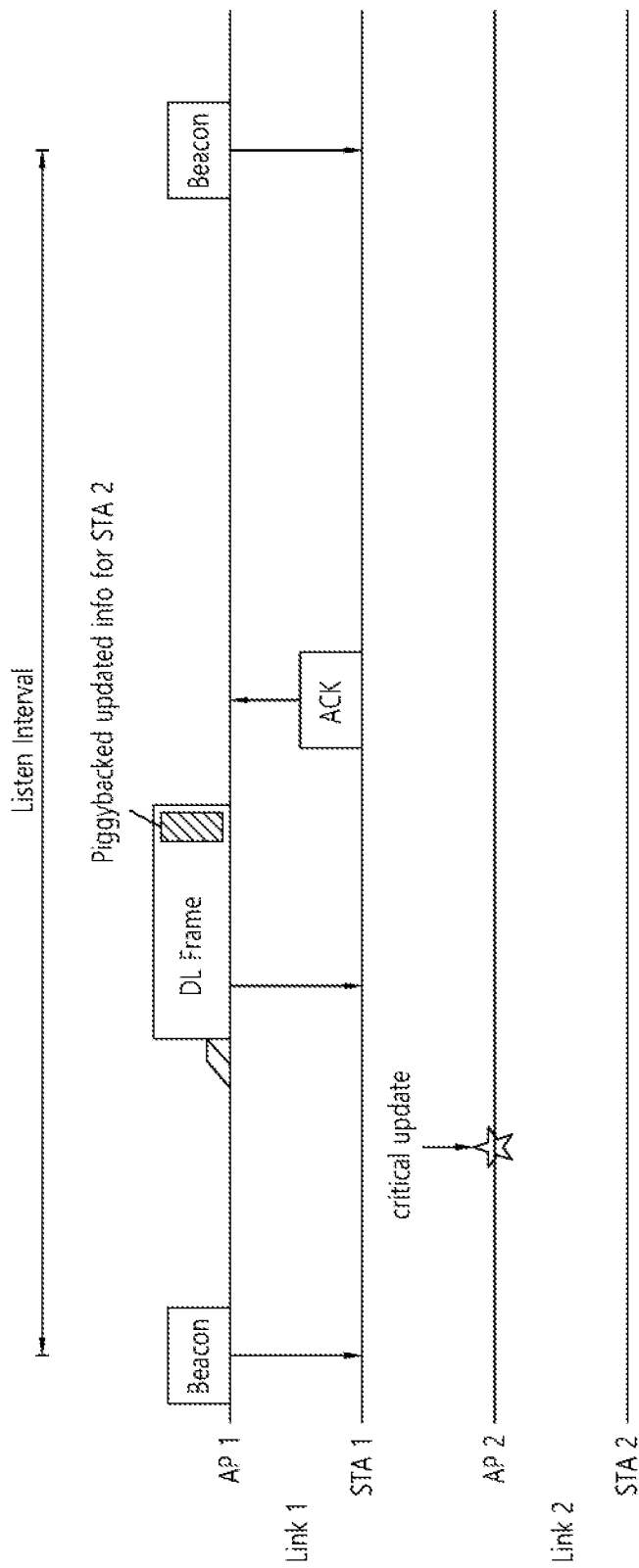
FIG. 24 shows another example of an announcement explicit method considering a multi-link device.

FIG. 24 shows another example of an announcement explicit method considering a multi-link device.

For example, when a critical update occurs in AP 2, if there is a DL frame to be transmitted in AP 1, changes in AP 2 may be included in the DL frame to be transmitted and delivered to STA 2. If there is a DL frame to be transmitted by AP 1, frame overhead can be reduced by not using a separate announcement frame through this method. In addition, when STA 2 enters Doze state through PS mode, it can be used more usefully because change information can be transmitted through Link 1 without awakening.

Figure 25:
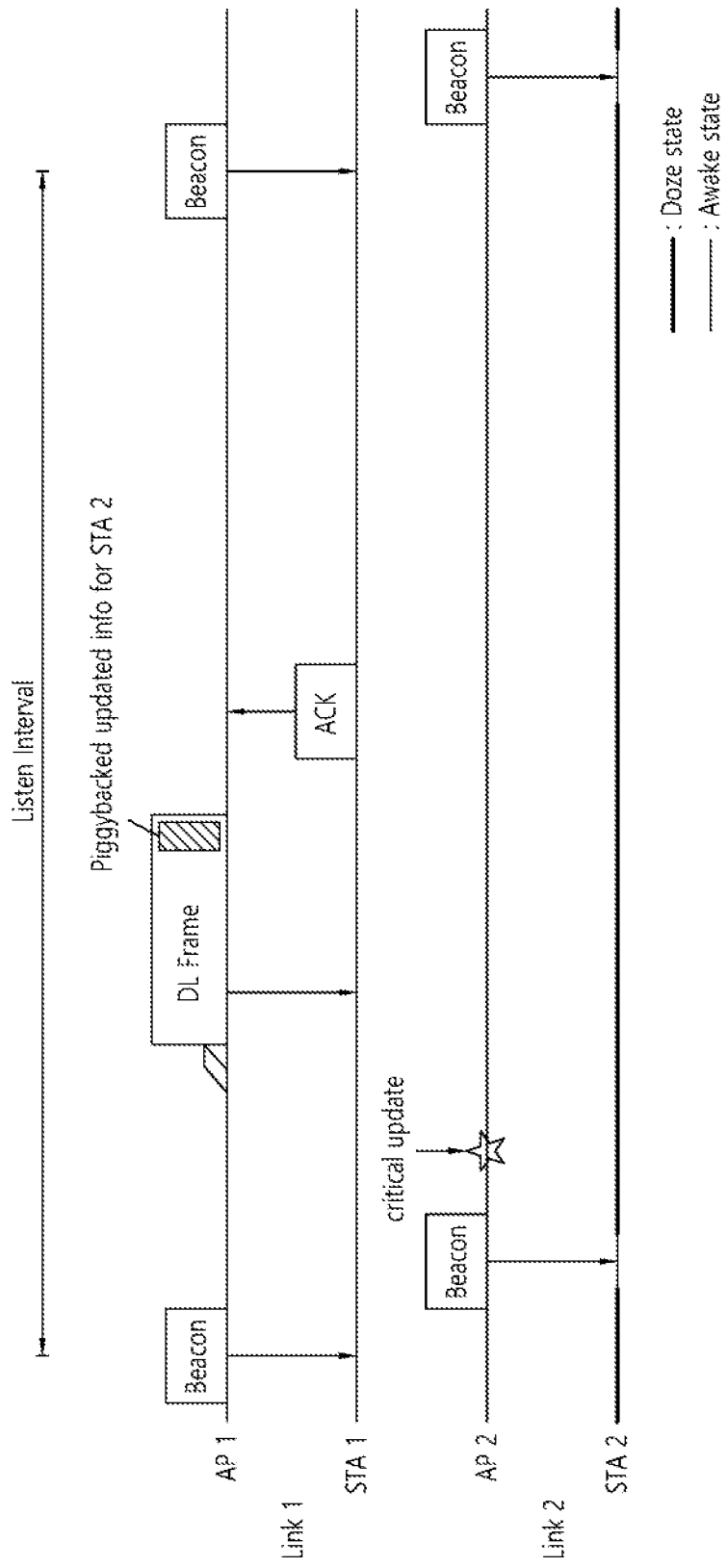
FIG. 25 shows another example of a cross-link signaling method for an STA operating in PS mode.

An example of this is shown in FIG. 25.

FIG. 25 shows another example of a cross-link signaling method for an STA operating in PS mode.

As shown in FIG. 25, if the proposed method is used when STA 2 operates in PS mode, even if a critical update occurs in AP 2, STA 2 can acquire change information of AP 2 without awakening. Utilizing this, STA 2 can further reduce power consumption.

Even in this case, when a critical update occurs in the AP, a DL Frame including not only changed information but all critical update IE information classified as a critical update event can be transmitted. An embodiment for this is shown in FIG. 26.

Figure 26:
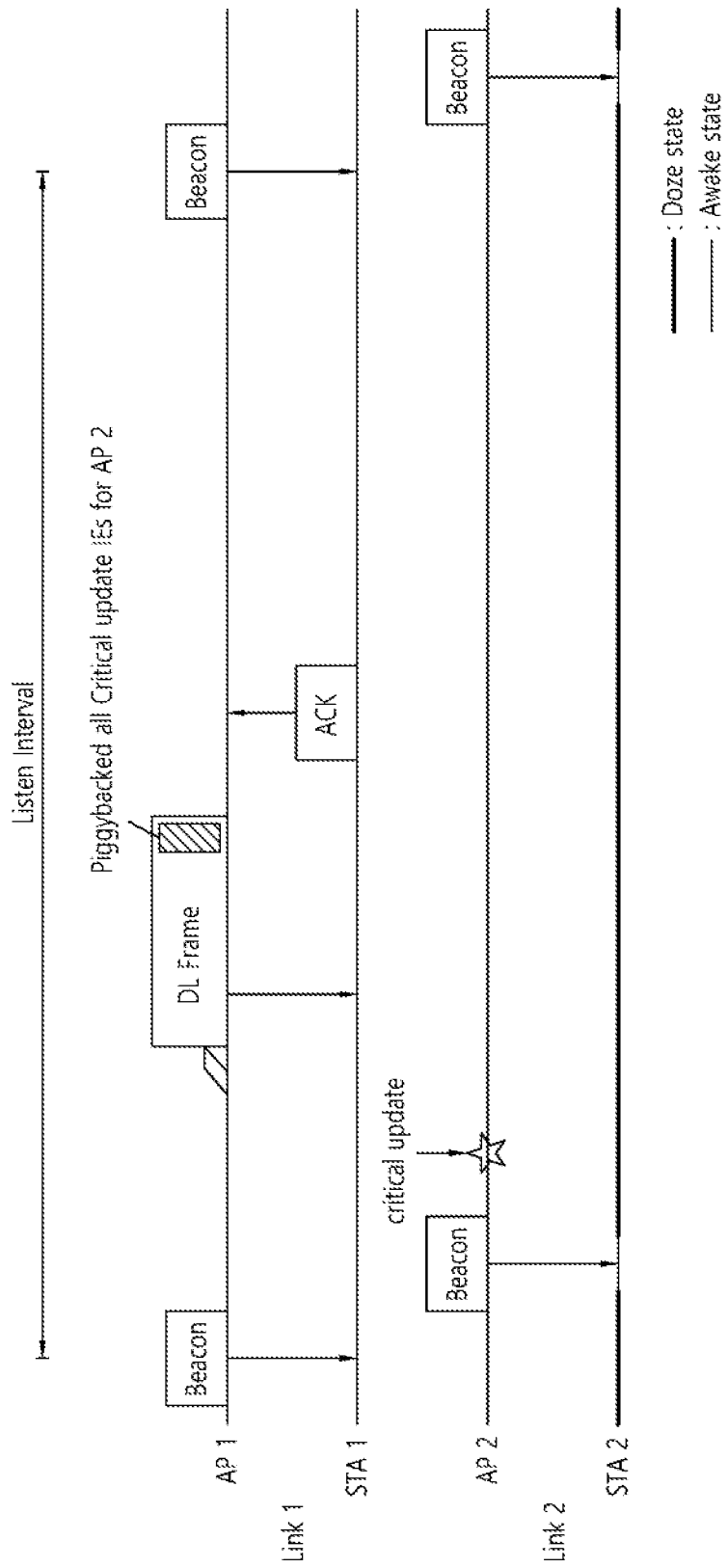
FIG. 26 shows another example of an announcement explicit method considering a multi-link device.

FIG. 26 shows another example of an announcement explicit method considering a multi-link device.

For example, when an operation element change occurs in the BSS of AP 2 (i.e., critical update), if there is a DL frame to be transmitted from AP 1 to the STA before the next beacon transmission, all critical update information for AP 2 may be included in the DL frame and transmitted. If there is a DL frame to be transmitted by AP 1, frame overhead can be reduced by not using a separate announcement frame through this method, and it is useful for power saving because it can deliver changed information without waking STA 2.

In addition, if critical information (e.g. low latency data traffic) occurs in a specific AP of the AP MLD, the AP may transmit the information to the STA through a DL frame. At this time, this DL Frame may be a data frame to be transmitted or a TWT Frame. For example, when low latency data traffic occurs to a specific AP, if there is a DL Frame to be transmitted through the other AP, the DL Frame can be piggybacked or a separate DL Frame (e.g. TWT Frame) can be generated to deliver the relevant critical information to the STA. Utilizing the cross link signaling characteristics of multi-link is efficient for throughput or power saving because the STA that needs to receive the relevant critical information does not need to wake in the doze state or perform a separate additional channel access.

1.1.2 Implicit Method for Announcement

In this section, when the BSS information of the AP MLD is changed or critical information is generated, a method of indirectly notifying the STA of the changed (generated) corresponding information is proposed. Through this method, the STA confirming that there is currently changed BSS information or generated critical information can acquire the changed information from the AP by requesting desired information from the AP.

First, when the AP MLD is connected to a non-AP MLD or legacy STA with a single link, when the BSS information of the AP is changed, a method of notifying the STA of this is proposed.

If a critical update occurs in the AP, an indicator (e.g. change sequence field, change sequence element, etc.) indicating that there is changed information is included in a separate announcement frame (e.g. new definition frame or broadcast probe response, etc.) and transmitted to the connected STA. An embodiment for this is shown in FIG. 27.

Figure 27:
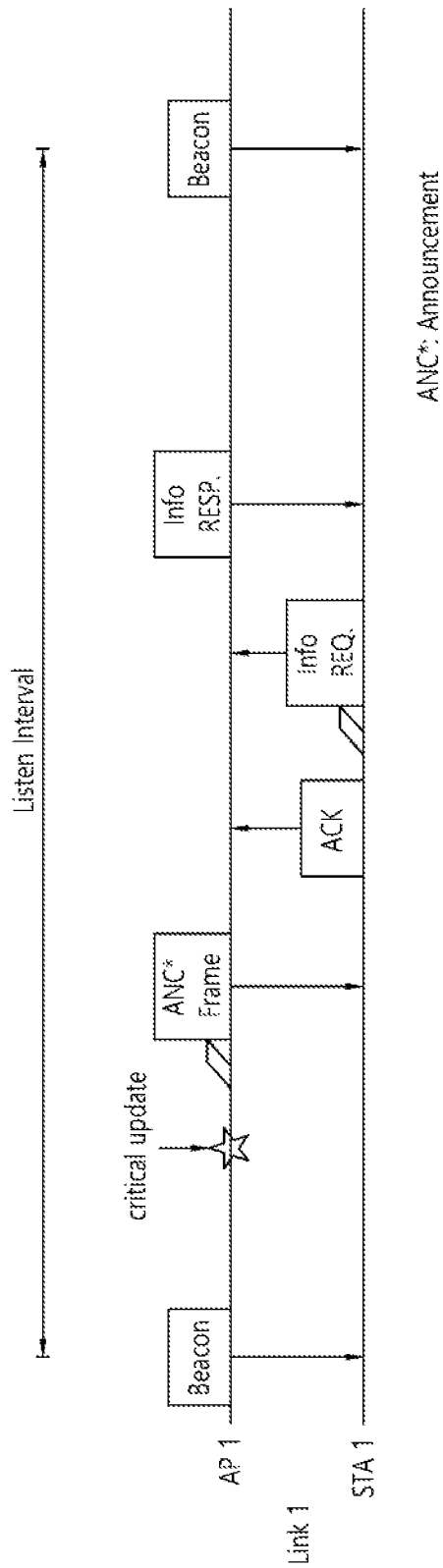
FIG. 27 shows an example of an announcement implicit method considering a single-link device.

FIG. 27 shows an example of an announcement implicit method considering a single-link device.

For example, when a critical update occurs in AP 1, AP 1 may notify STA 1 of such change presence/absence information in an announcement frame. At this time, the information included in the announcement frame includes only whether or not specific information has been updated, not actual field values. Upon receiving this, STA 1 may request the changed information through Link 1. At this time, the Request frame requested by STA 1 may be a separately defined frame, a management frame (e.g. probe request), or a Quality of Service (QoS) data frame. Alternatively, STA 1 may attempt to listen to the next beacon to receive critical change information.

Figure 28:
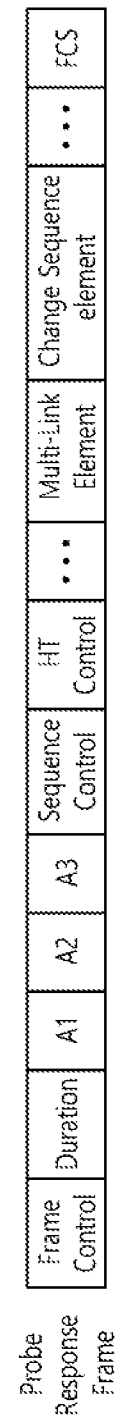
FIG. 28 shows another example of configuring an announcement frame using a probe response frame.

An embodiment of the case of using a probe response frame as an announcement frame for this is shown in FIG. 28.

FIG. 28 shows another example of configuring an announcement frame using a probe response frame.

For example, when a critical update occurs in the BSS of a reporting AP, corresponding information may be announced through a (Broadcast) Probe response. In this case, the corresponding probe response frame may inform the probe response by including CSN information (e.g. change sequence element, change sequence field) indicating that a critical update has occurred through the above form. The STA receiving the message can know that a critical update has occurred for the current reporting AP by comparing the CSN information it currently has (In 802.11be, non-AP STAs have agreed to keep their most recently received CSN information) with the CSN information received through the above announcement frame. Thereafter, the STA may transmit a probe request frame to acquire critical update change information or may attempt to receive the next Beacon. At this time, when the STA transmits a (MLD) Probe request frame to acquire critical update change information, the AP receiving it may respond with a (MLD) Probe response frame including information changed due to the critical update, but all In order to provide information about this to the STA, it may be broadcast in a (Broadcast) Probe Response frame. At this time, the information included in the response frame is information changed due to the most recent critical update (i.e., when the CSN value of the AP is 5, information changed while being updated from CSN 4 to CSN 5) may be all critical update information (i.e., all information classified as a critical update event in 802.11be).

STA 1 may request information from AP 1 for all information or some information after checking which information acquired through the announcement frame has changed. For example, when it is confirmed that various information on the BSS has been changed through the announcement frame, the STA may request only information corresponding to the critical update. At this time, if the STA wants to request only specific information, the Request IE/Extended Request IE or PV1 Probe Response Option element may be reused or extended and used, or a separate bitmap may be defined for this to indicate information that the STA wants to request.

In addition, the indicator for such change may be notified to the STA by piggybacking the indicator on the DL frame being transmitted instead of a separate announcement. If there is a DL frame to be transmitted by the AP after a critical update occurs, the AP may include such an indicator in the DL frame and transmit it. An embodiment for this is shown in FIG. 29.

Figure 29:
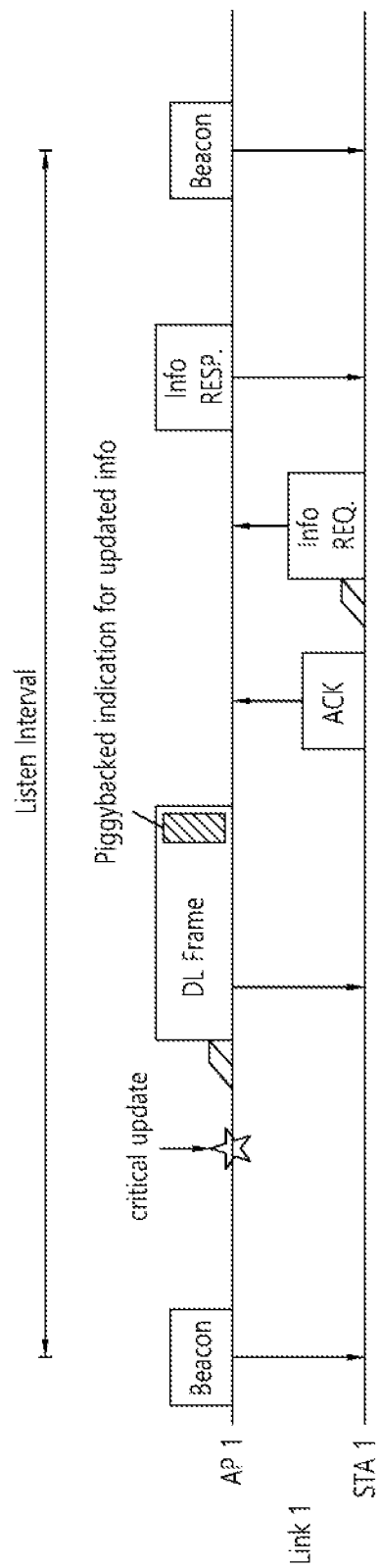
FIG. 29 shows another example of an announcement implicit method considering a single-link device.

FIG. 29 shows another example of an announcement implicit method considering a single-link device.

For example, when an operation element change occurs in the BSS of AP 1, if there is a DL frame to be transmitted from AP 1 to the STA before transmitting the next beacon, an indicator indicating updated information may be included in the DL frame and transmitted. If there is a DL frame to be transmitted by AP 1, frame overhead can be reduced by not using a separate announcement frame through this method. Upon receiving this, STA 1 may indicate the information it wants to acquire and request the corresponding information from AP 1 through a request frame. Upon receiving this request frame, the AP transmits information in a response frame. At this time, STA 1 may request all of the changed information or only some of the information.

Second, when the AP MLD is connected to a non-AP MLD with multi-link, when the BSS information of the AP is changed, a method of notifying the STA of this is proposed. In 802.11be, cross-link signaling is considered by utilizing multi-link characteristics. Accordingly, through cross-link signaling, an AP MLD can inform a non-AP MLD of BSS information of other APs as well as an indicator for its BSS change information to a non-AP MLD through its own link. An example of this is shown in FIG. 30.

Figure 30:
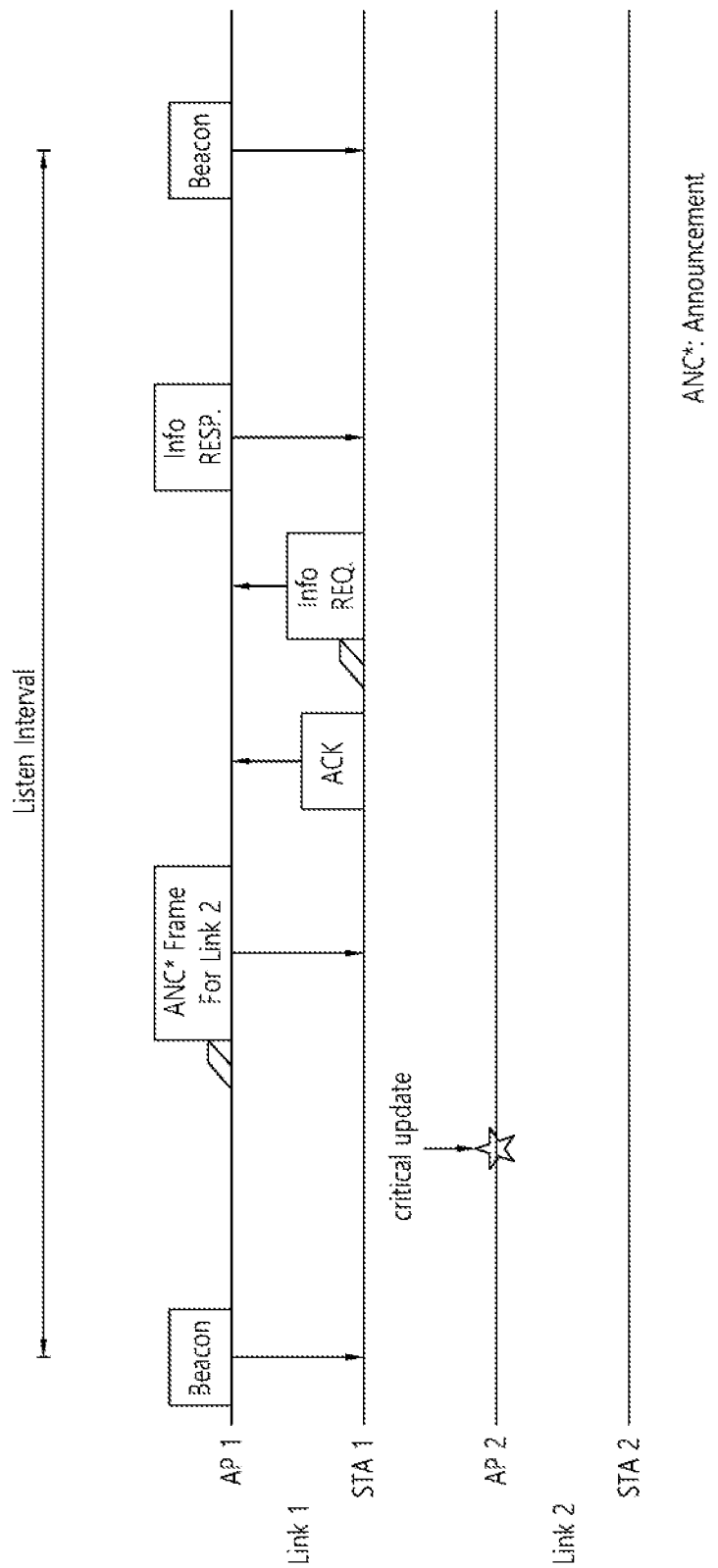
FIG. 30 shows another example of an announcement implicit method considering a multi-link device.

FIG. 30 shows another example of an announcement implicit method considering a multi-link device.

For example, when the BSS information of AP 2 is changed, the AP MLD may notify STA 2 that information has changed in AP 2 by transmitting an announcement frame through Link 1 instead of Link 2. STA 1 receiving the announcement frame through Link 1 may deliver change information through information sharing. This cross-link signaling method can be used more usefully for STAs operating in PS mode because when STA 2 is in Doze state for power saving, it can transmit through Link 1 without waking to receive changes. The non-AP MLD that has confirmed that there is changed information in AP 2 through Link 1 may request the changed information as described above through Link 1. At this time, when the STA transmits a (MLD) Probe request frame to acquire critical update change information, the AP receiving it may respond with a (MLD) Probe response frame including information changed due to the critical update, but all In order to provide information about this to the STA, it may be broadcast in a (Broadcast) Probe Response frame. At this time, information included in the response frame may be information changed due to the most recent critical update (In other words, when the CSN value of AP 2 is 5, information changed as CSN 4 is updated to CSN 5) or all critical update information (that is, all information classified as a critical update event in 802.11be of AP 2). Such a response frame may be transmitted through a link through which the STA transmits a request frame or may be transmitted through a link where a critical update actually occurs.

Figure 31:
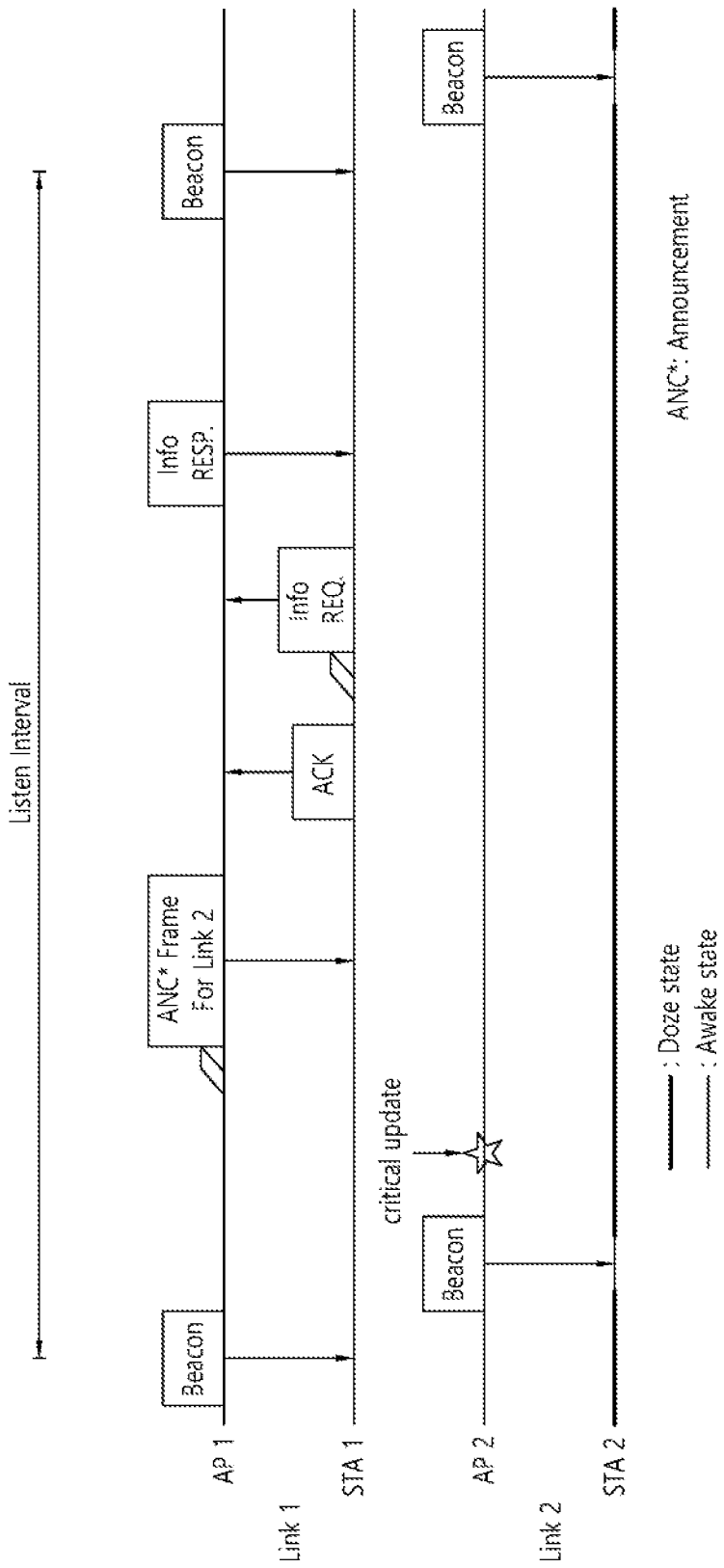
FIG. 31 shows another example of a cross-link signaling method for an STA operating in PS mode.

An embodiment of an STA operating in PS mode is shown in FIG. 31.

FIG. 31 shows another example of a cross-link signaling method for an STA operating in PS mode.

For example, when a critical update of AP 2 occurs after STA 2 operates in PS mode and enters Doze state, STA 2 can obtain a changed information indication and request information through Link 1 without awakening. Through the proposed method, the STA can further reduce power consumption.

Alternatively, the non-AP MLD confirming that there is changed information in AP 2 through Link 1 may request the changed information through Link 2. An embodiment for this is shown in FIG. 32.

Figure 32:
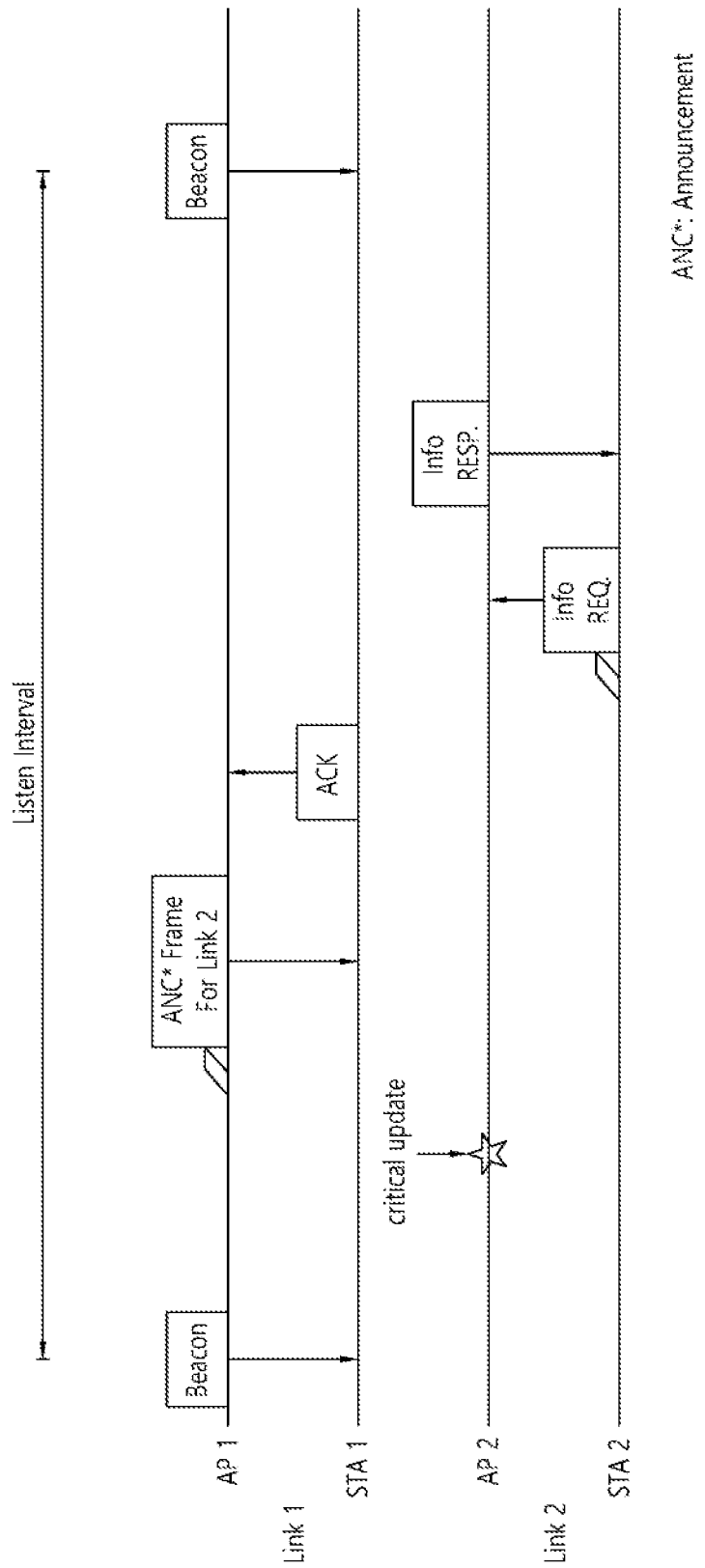
FIG. 32 shows another example of an announcement implicit method considering a multi-link device.

FIG. 32 shows another example of an announcement implicit method considering a multi-link device.

Figure 33:
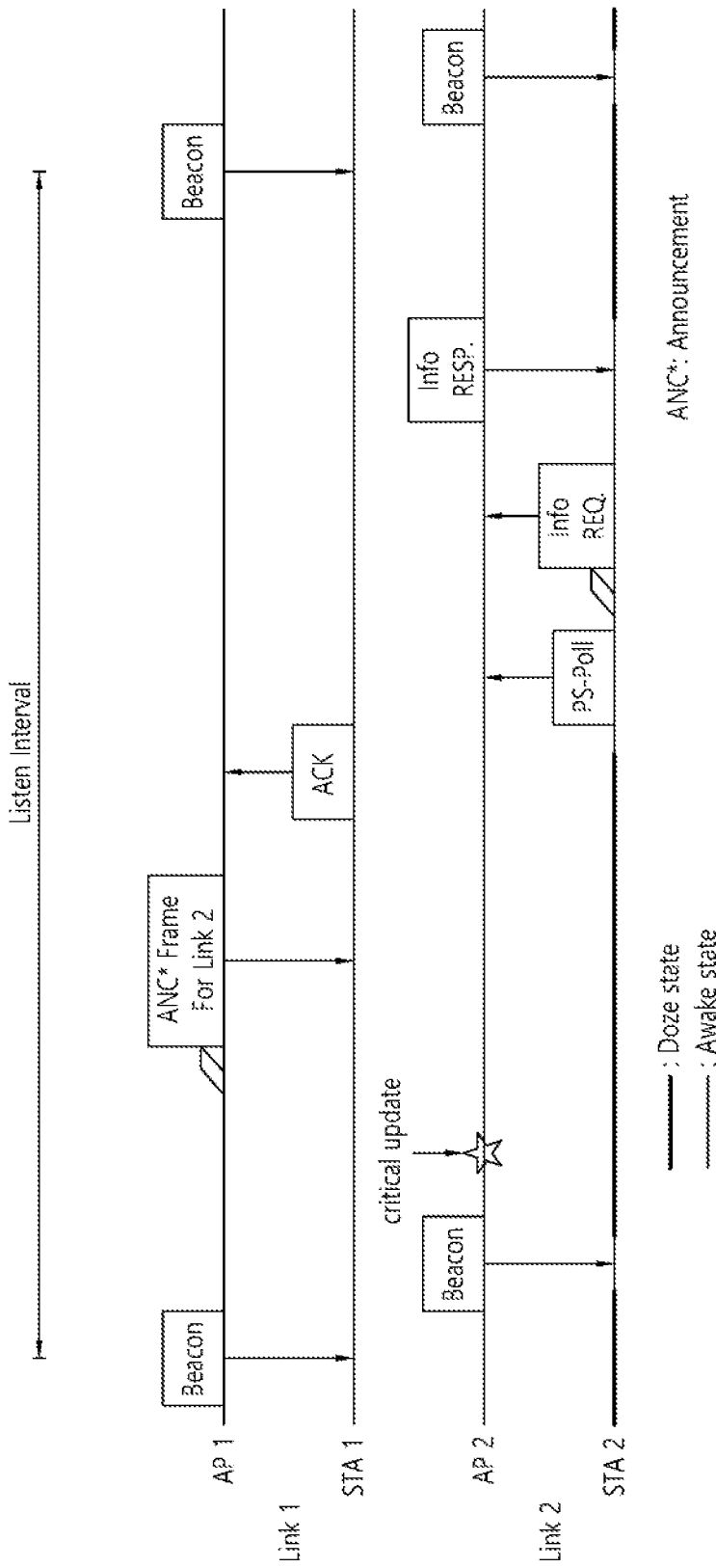
FIG. 33 shows another example of a cross-link signaling method for an STA operating in PS mode.

If STA 2 operates in PS mode, an embodiment is as shown in FIG. 33.

FIG. 33 shows another example of a cross-link signaling method for an STA operating in PS mode.

For example, when the BSS change information indicator of AP 2 is received through Link 1, STA 2 may wake up and request desired information through Link 2 only when there is changed information. If it is confirmed through the received announcement frame that there is no currently changed information or there is no change information to be acquired, the STA may maintain the Doze state.

Figure 34:
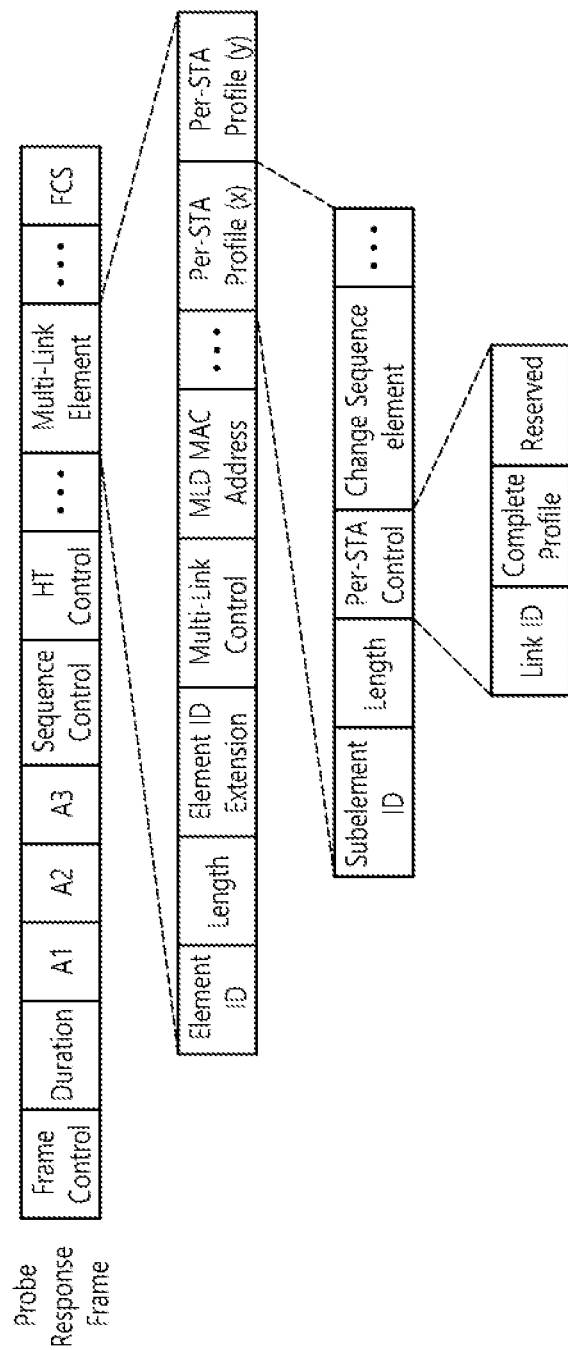
FIG. 34 shows another example of configuring an announcement frame using a probe response frame.

An embodiment of the case of using a probe response frame as an announcement frame for this is shown in FIG. 34.

FIG. 34 shows another example of configuring an announcement frame using a probe response frame.

For example, when a critical update occurs in the BSS of AP (x), corresponding information may be announced through a (Broadcast) Probe response. In this case, the corresponding probe response frame may inform CSN information (e.g. change sequence element, change sequence field) indicating that a critical update has occurred through the multi-link element of the probe response through the above form. Since the corresponding Multi-Link element includes information on the reported AP (i.e., other AP) rather than information on the reporting AP, in the case of a non-AP MLD operating in power save mode, the STA through the corresponding announcement frame Change information that another STA in the doze state needs to know may be acquired. The STA receiving the message compares the CSN information (In 802.11be, non-AP STAs have agreed to keep their most recently received CSN information) for another STA it currently has with the CSN information for another AP received through the above announcement frame, so that the STA can know that a critical update has occurred for the currently reported AP. Thereafter, another STA may transmit a probe request frame to acquire critical update change information or may attempt to receive the next Beacon.

Figure 35:
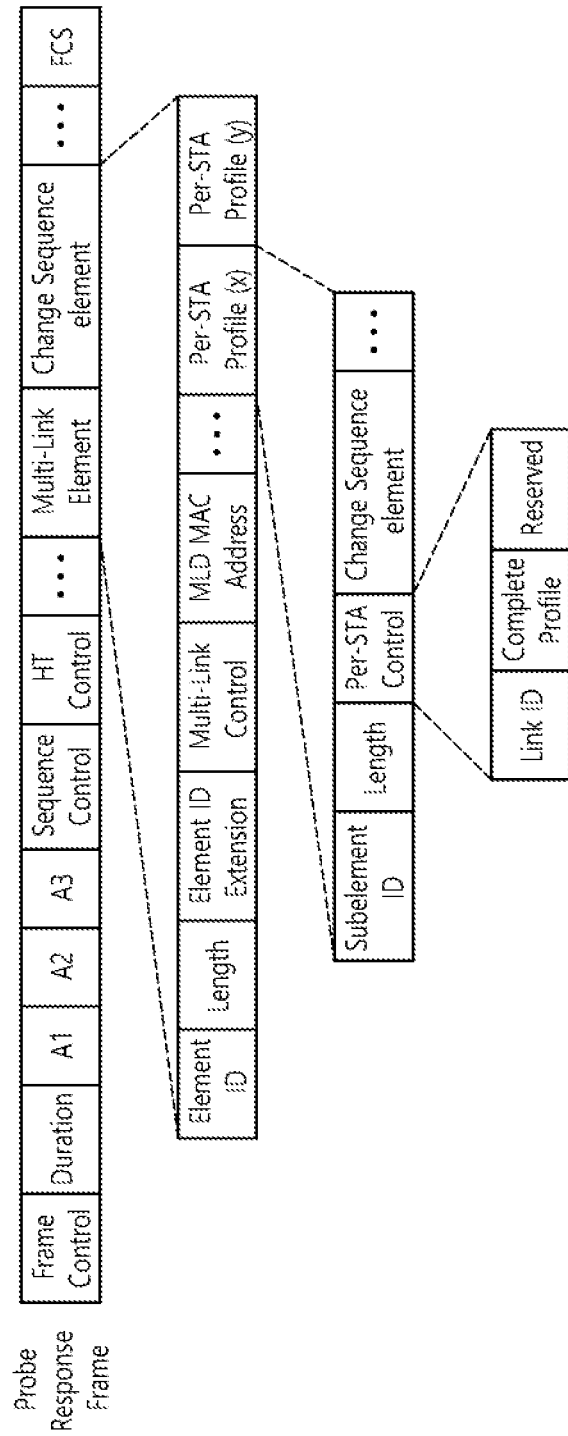
FIG. 35 shows another example of configuring an announcement frame using a probe response frame.

This method may be used in combination with the change information delivery method for the reporting AP mentioned above. An example of using the frame format of the probe response frame for this case is shown in FIG. 35. Through this form, the reporting AP can deliver critical change information about itself and the presence or absence of change information about the reported AP together depending on the case.

FIG. 35 shows another example of configuring an announcement frame using a probe response frame.

In addition, such changes may be notified to the STA by piggybacking them to a DL frame being transmitted instead of a separate announcement. An embodiment for this is shown in FIG. 36.

Figure 36:
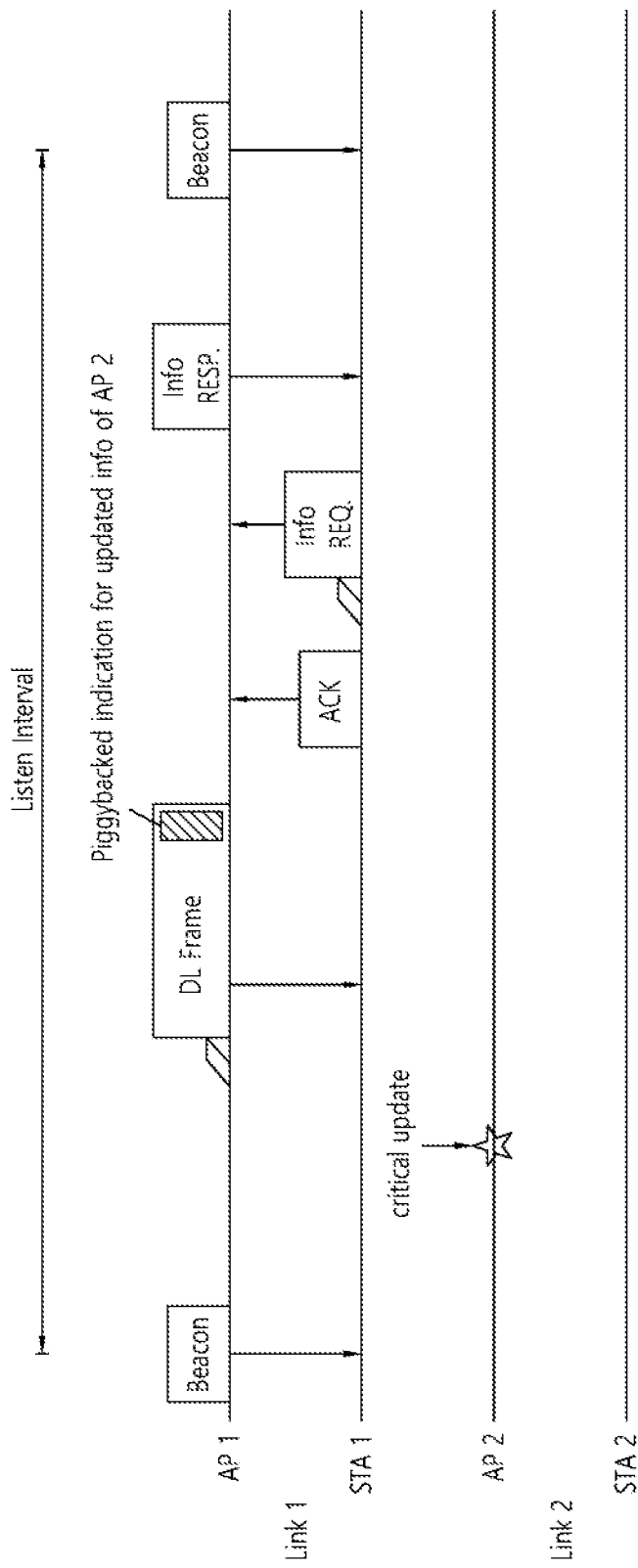
FIG. 36 shows another example of an announcement implicit method considering a multi-link device.

FIG. 36 shows another example of an announcement implicit method considering a multi-link device.

For example, when a critical update occurs in AP 2, if there is a DL frame to be transmitted by AP 1, an indication indicating a change in AP 2 may be included in the DL frame to be transmitted and delivered to STA 2. Upon receiving this, the non-AP MLD may transmit a request message for obtaining desired information or all information through Link 1. If there is a DL frame to be transmitted by AP 1, frame overhead can be reduced by not using a separate announcement frame through this method. In addition, when STA 2 enters Doze state through PS mode, it can be used more usefully because change information can be transmitted through Link 1 without awakening.

Figure 37:
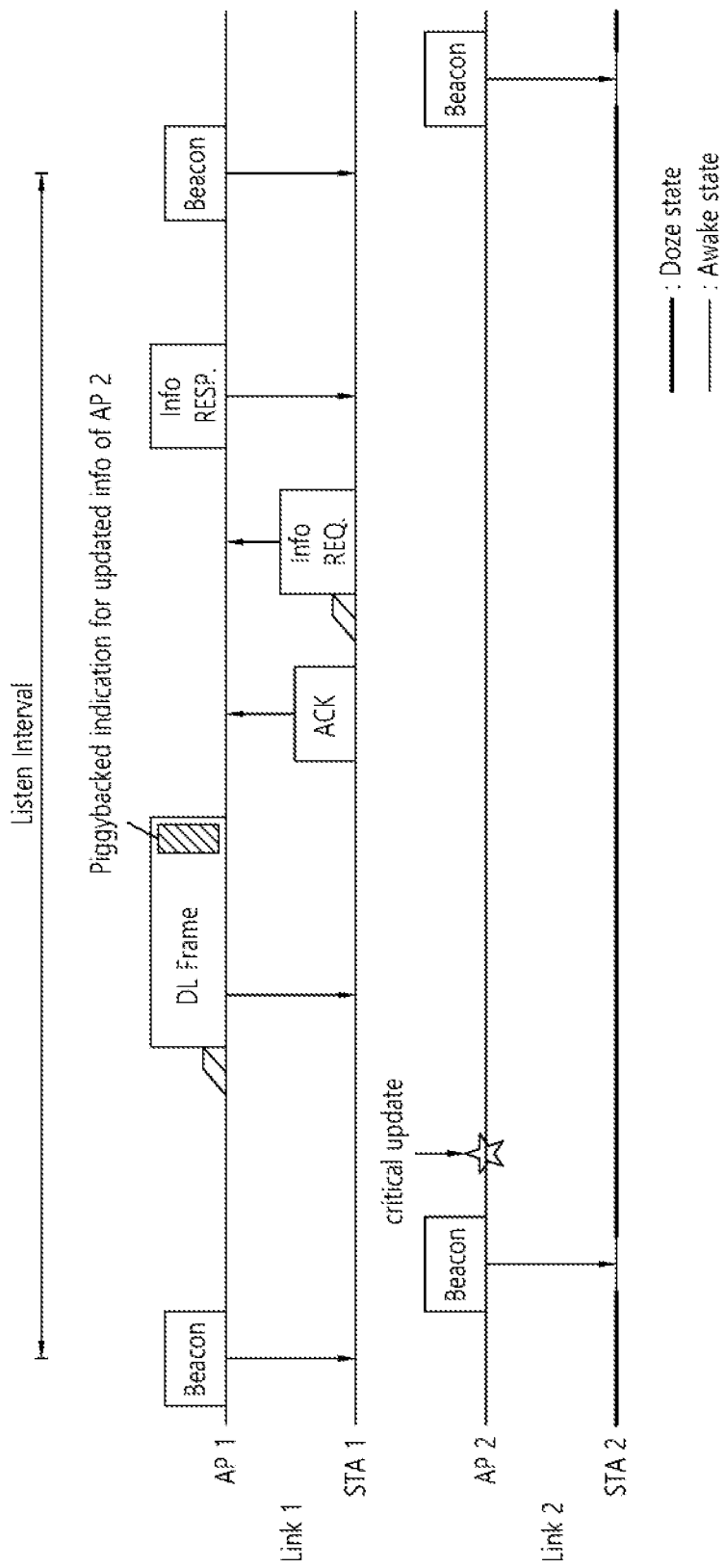
FIG. 37 shows another example of a cross-link signaling method for an STA operating in PS mode.

An example of this is shown in FIG. 37.

FIG. 37 shows another example of a cross-link signaling method for an STA operating in PS mode.

For example, when a critical update of AP 2 occurs after STA 2 operates in PS mode and enters Doze state, STA 2 may obtain a changed information indicator and request information through Link 1 without awakening. Through the proposed method, the STA can further reduce power consumption.

Alternatively, the non-AP MLD confirming that there is changed information in AP 2 through Link 1 may request the changed information through Link 2. An embodiment for this is shown in FIG. 38.

Figure 38:
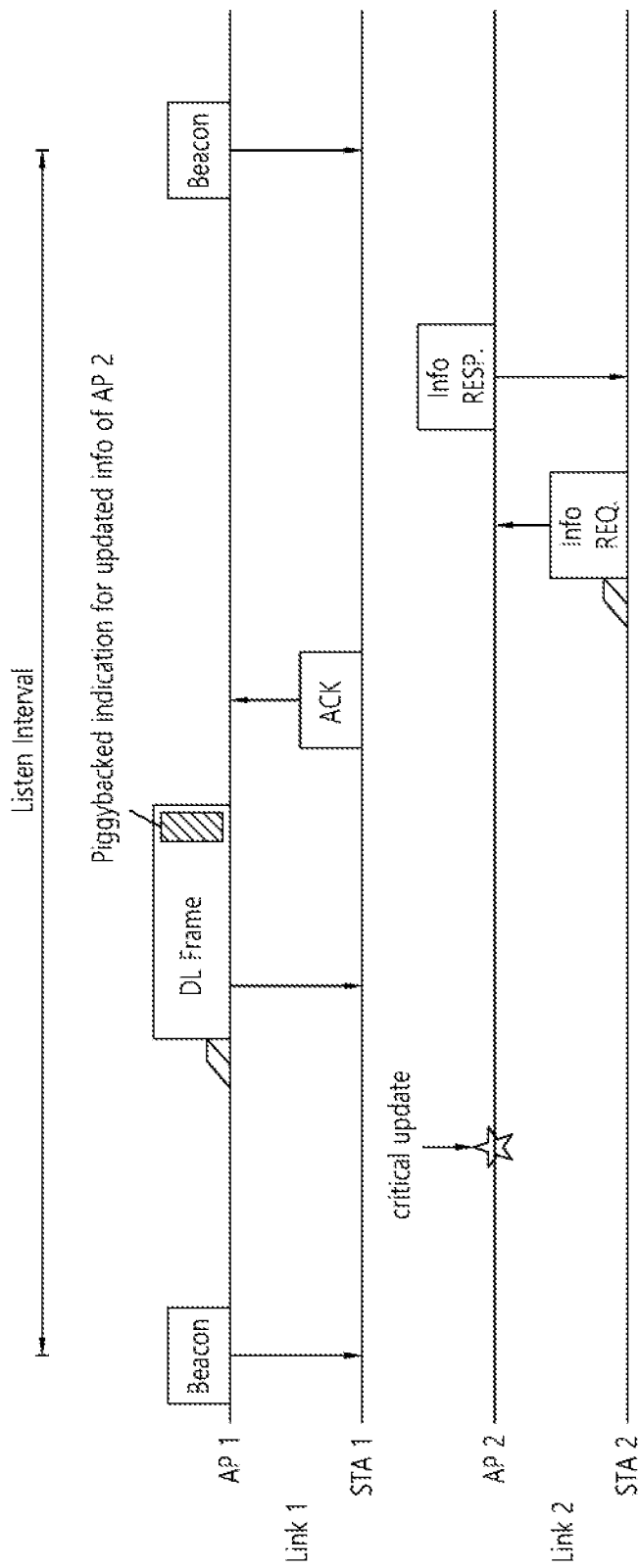
FIG. 38 shows another example of an announcement implicit method considering a multi-link device.

FIG. 38 shows another example of an announcement implicit method considering a multi-link device.

Figure 39:
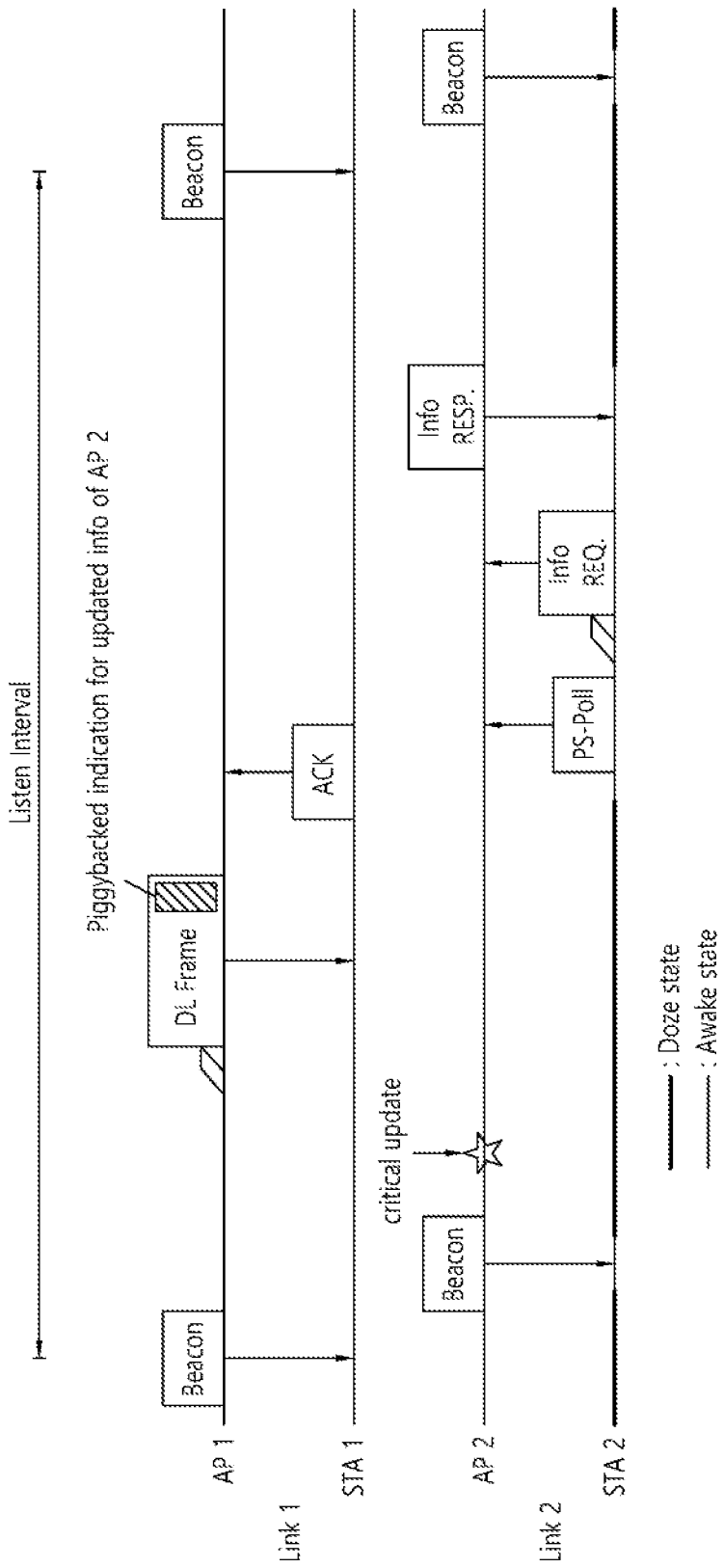
FIG. 39 shows another example of a cross-link signaling method for an STA operating in PS mode.

If STA 2 operates in PS mode, an embodiment is as shown in FIG. 39.

FIG. 39 shows another example of a cross-link signaling method for an STA operating in PS mode.

For example, when the BSS change information indicator of AP 2 is received through Link 1, STA 2 may wake up and request desired information through Link 2 only when there is changed information. If it is confirmed that there is no currently changed BSS information through an indicator included in the received DL frame or there is no change information to be acquired, the STA may maintain the Doze state.

1.2 Announcement Method for Power Saving

This section proposes an announcement method for STAs operating in PS (Power Saving) mode.

In general, the AP must inform the STA of this information when a change in BSS information (e.g. critical update, Capabilities, Operation element, etc.) occurs. Information on critical update mentioned in this specification refers to elements classified as critical update events in the 802.11be standard.

Basically, such change information and the presence or absence of the change information (e.g. Reduced Neighbor Report (RNR) Element, Change sequence, Check Beacon, etc.) can be notified through periodically transmitted Beacon and additional TIM (Traffic Indication Map) Frame. At this time, the change information may be information itself updated in the BSS (e.g., system information parameter value, etc.) or may be an indicator indicating a version of change information (e.g., change sequence, etc.) to reduce overhead. However, among the information delivered by the AP, there may be information that needs to be immediately notified to the STA. In particular, since change information and the presence or absence of change information for a critical update such as a critical update may affect various operations of the STA, it is better to inform immediately when the change is made. However, the listen interval of the beacon may be different for each STA, and especially for an STA having a rather long listen interval for power saving, receiving change information through the beacon may not be sufficient.

To this end, the present specification proposes an announcement method for announcing changed BSS information among APs (including other APs in the same AP MLD) of the AP MLD regardless of the beacon period.

The announcement method proposed in this section informs the STA of this information regardless of the beacon period whenever the AP's BSS information is updated. In this case, the changed BSS information may be included in a separate announcement frame and transmitted, or may be piggybacked and transmitted in a DL frame transmitted by the AP. In addition, in the case of an AP MLD, when an AP's BSS information update occurs, this information may be delivered to an STA of a non-AP MLD through another link, if necessary.

If STAs operate in PS mode, some STAs may enter the Doze state and then change to the Awake state. At this time, if there is critical change information of the connected AP that has not been delivered during the period in which the specific STA enters Doze, a method for informing the STA of this information when the STA wakes up is required.

Therefore, in the present specification, an announcement method for informing an STA that has awake after a doze period of changed critical information is proposed.

In the case of an STA operating in an active mode, since data can be transmitted or received at any time, the AP can inform the STA of critical BSS change information as soon as it occurs. However, in the case of an STA operating in PS mode, if the STA enters doze for power saving, this change information cannot be notified to the STA during the doze period.

Basically, it is possible to transmit BSS change information by including BSS change information in the beacon considering the TBTT (Target Beacon Transmission Time) of the STA, but in the case of an STA operating in PS mode, since the STA may set a longer Listen interval or skip Beacon reception for more power reduction, transmission of BSS change information through Beacon may not be sufficient. An example of operation for this is shown in FIG. 40.

Figure 40:
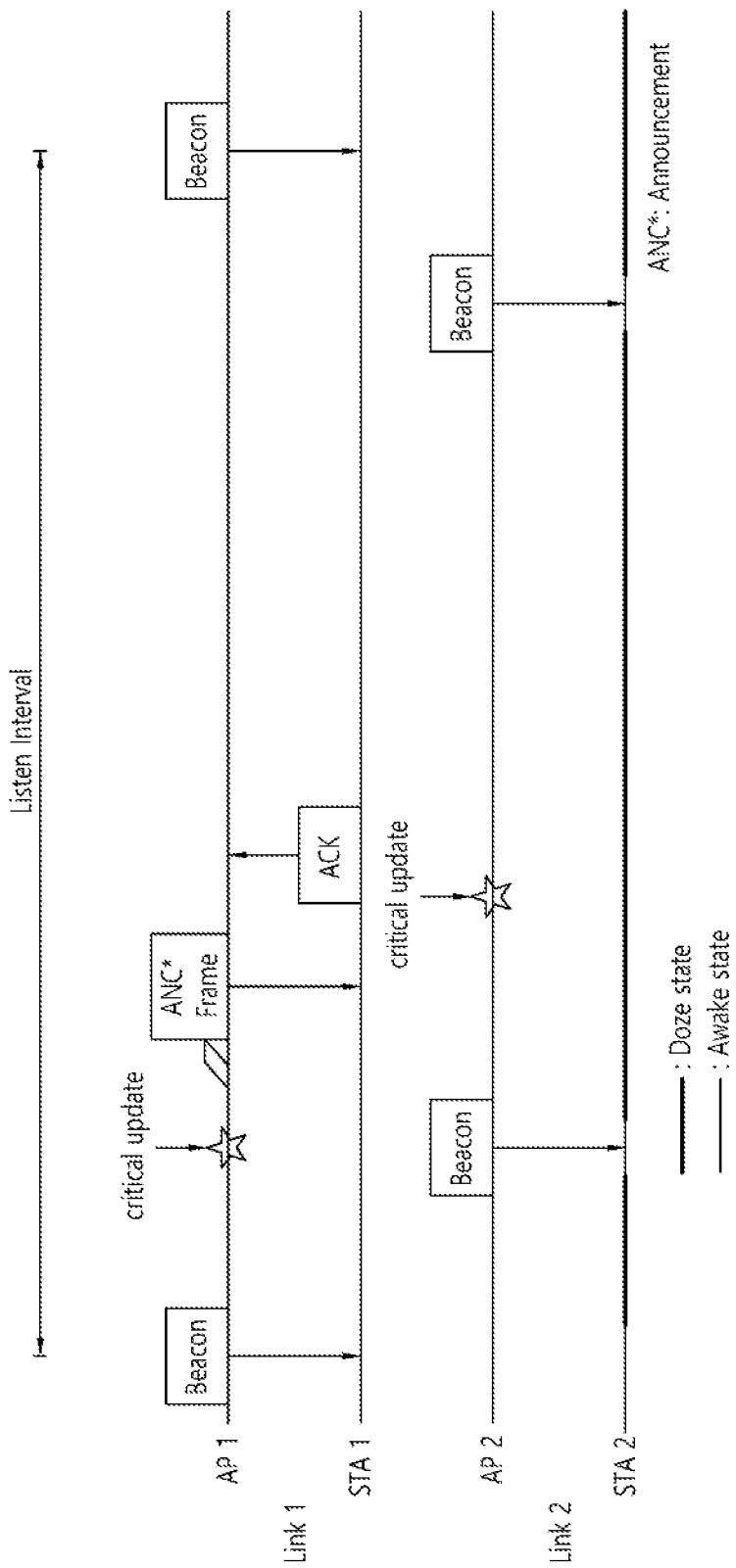
FIG. 40 shows an example of an announcement method for an STA operating in PS mode.

FIG. 40 shows an example of an announcement method for an STA operating in PS mode.

Therefore, if the STA has updated BSS information for the connected AP during the Doze period, it stores it and confirms that the STA has awake (e.g. when PS-Poll/QoS null is received from the STA or QoS data is received from the STA In one case), the method in which the AP delivers this information to the STA can be useful because critical update information can be delivered regardless of the beacon cycle.

For example, STAs supporting Broadcast TWT maintain a doze state for power saving and then awake for data transmission/reception during a scheduled Broadcast TWT SP received from an AP. At this time, the awake STA, if there is critical change information of the connected AP during the period of Doze, must know these changes before transmitting or receiving data.

Figure 41:
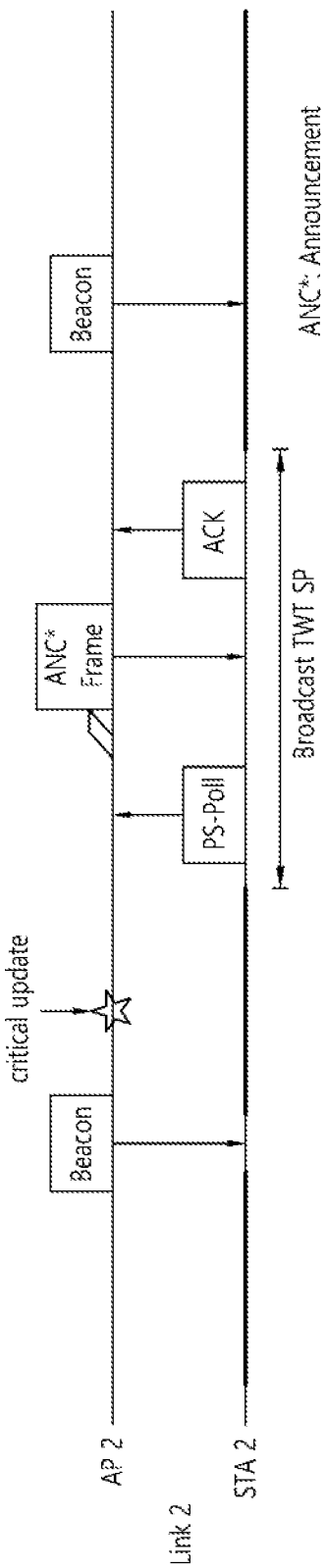
FIG. 41 shows another example of an announcement method for an STA operating in PS mode.

FIG. 41 shows another example of an announcement method for an STA operating in PS mode.

For example, if a critical update occurs after STA 2 enters doze due to PS mode, AP2 cannot inform the STA of this. At this time, if the STA awakes before receiving the next beacon as described above (e.g. Broadcast TWT SP, UL frame transmission, etc.), when the STA awakes, it can inform AP 2 of this through PS-Poll. Upon receiving this, the AP recognizes that the current STA 2 is awake and transmits BSS change information generated during the doze period in an announcement frame.

Figure 42:
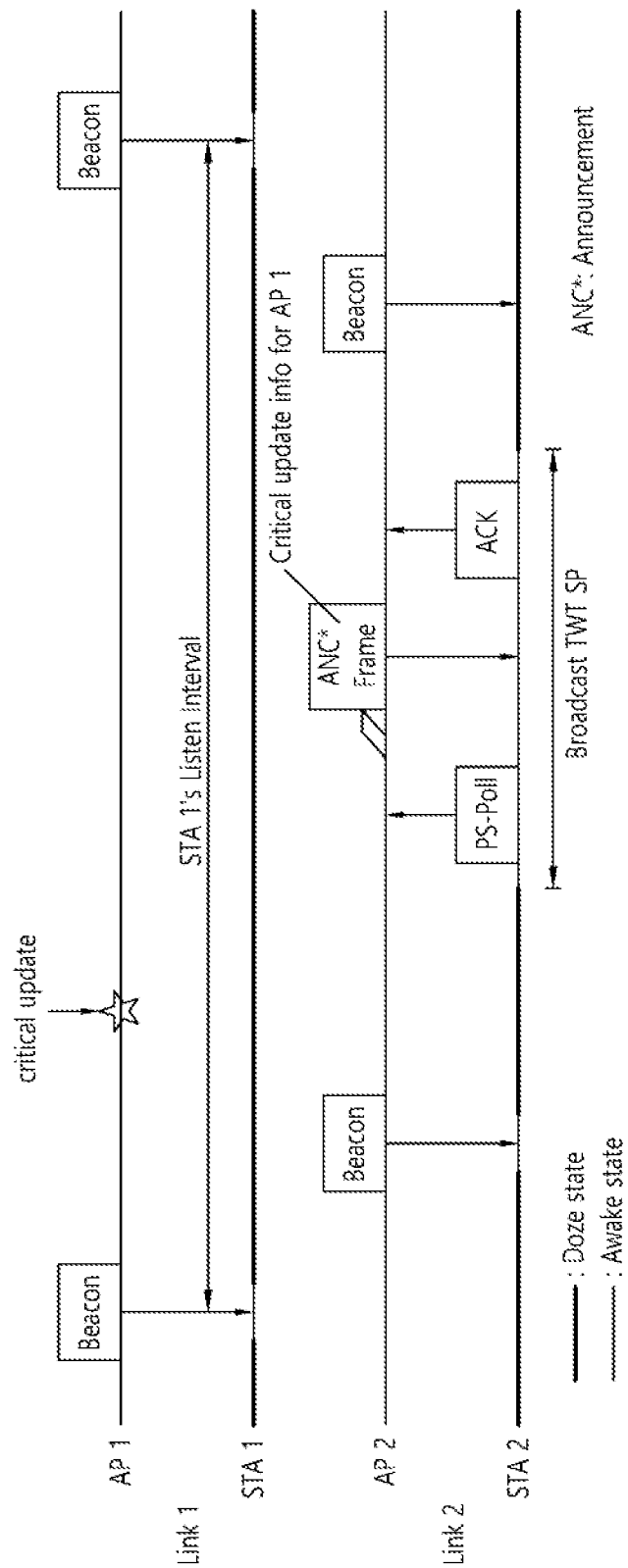
FIG. 42 shows another example of an announcement method for an STA operating in PS mode.

An example of the multi-link case for the above example is shown in FIG. 42.

FIG. 42 shows another example of an announcement method for an STA operating in PS mode.

Figure 43:
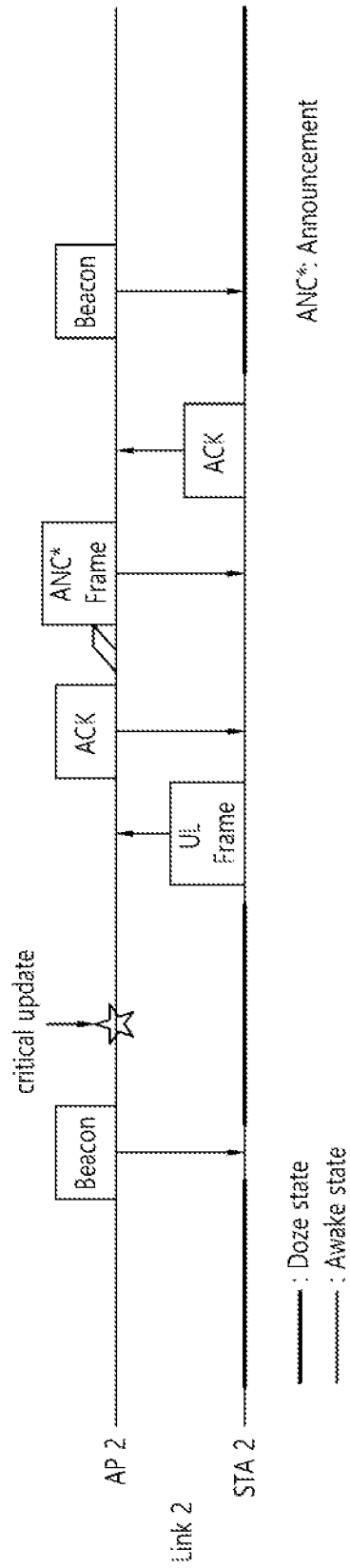
FIG. 43 shows another example of an announcement method for an STA operating in PS mode.

When the AP MLD and the non-AP MLD are connected by two links, if the non-AP MLD operates in PS mode and STA 1 and STA 2 awake according to the listen interval, conventionally, critical update information can be checked when an STA wakes up according to its Listen interval. (At this time, the critical update information may be an updated information parameter value or an indicator indicating a version of the update information (e.g. change sequence).) However, when the method proposed in this specification is used, in AP 1 When a critical update occurs, FIG. 43 shows another example of an announcement method for an STA operating in PS mode.

For example, even when STA 2 dozes and then awakes for transmission of the UL frame, the AP may notify the changed information through an announcement frame after receiving the UL frame from the STA as described above.

Figure 44:
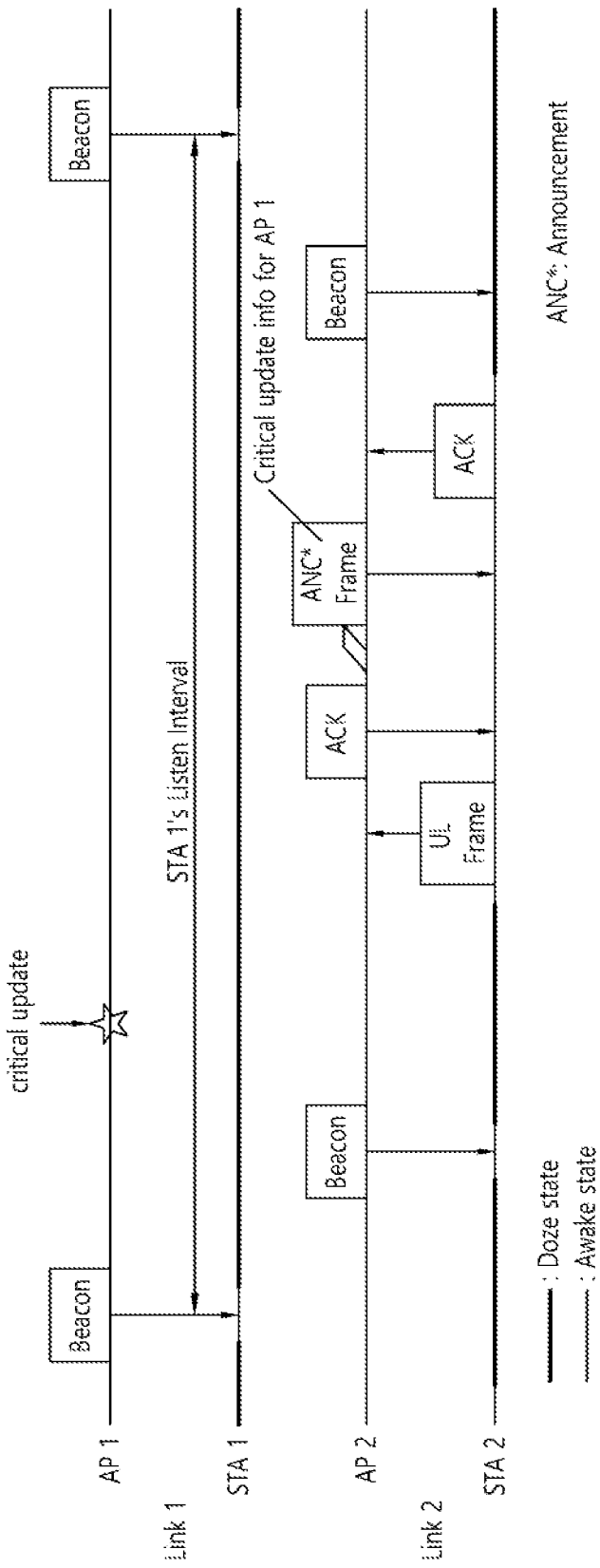
FIG. 44 shows another example of an announcement method for an STA operating in PS mode.

An example of the multi-link case for the above example is shown in FIG. 44.

FIG. 44 shows another example of an announcement method for an STA operating in PS mode.

When the AP MLD and the non-AP MLD are connected by two links, if the non-AP MLD operates in PS mode and STA 1 and STA 2 awake according to the listen interval, conventionally, critical update information can be checked when an STA wakes up according to its Listen interval. (At this time, the critical update information may be an updated information parameter value or an indicator indicating a version of the update information (e.g. change sequence).) However, when the method proposed in this specification is used, in AP 1 When a critical update occurs, if STA 2 wakes up before the next TBTT time of STA 1 (e.g. TWT SP, UL frame transmission, etc.), AP 2 may transmit critical update information of AP 1 through Link 2 by transmitting it before STA 2 enters the doze state again. Through this, STA 1 can obtain critical update information for itself through Link 2 before its next TBTT time. Although the example of FIG. 44 shows that update information on one BSS is included in the ANC frame, information on several other BSSs may also be included regardless of whether or not they are updated.

Figure 45:
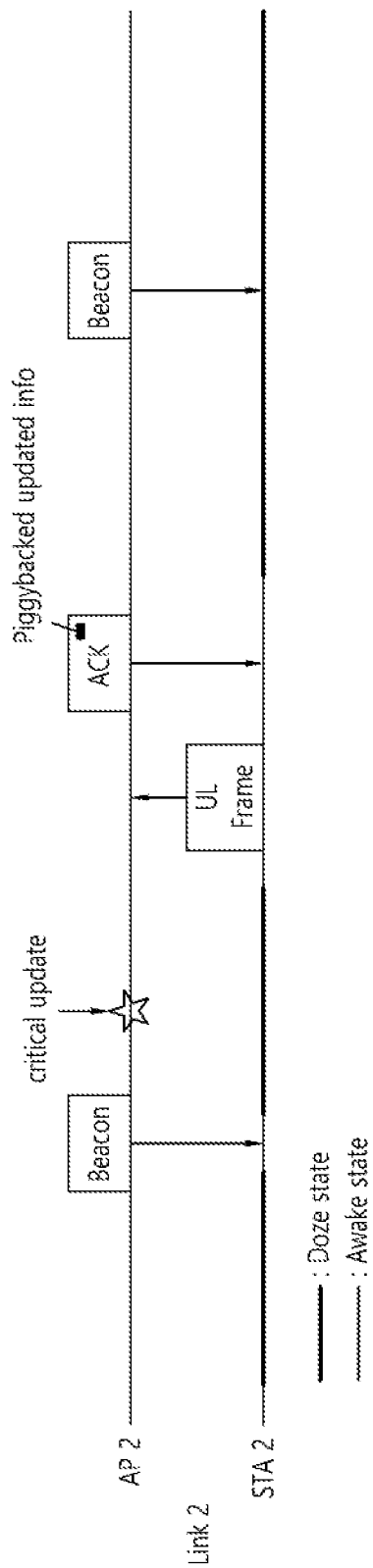
FIG. 45 shows another example of an announcement method for an STA operating in PS mode.

Additionally, when the STA transmits the UL frame when awake, a method of including such BSS change information in the ACK for the UL frame and sending it is also proposed. An embodiment for this is shown in FIG. 45. If the ACK is sent with update information, frame overhead is reduced, and since the STA can doze for a longer period of time, more power consumption can be reduced.

FIG. 45 shows another example of an announcement method for an STA operating in PS mode.

Figure 46:
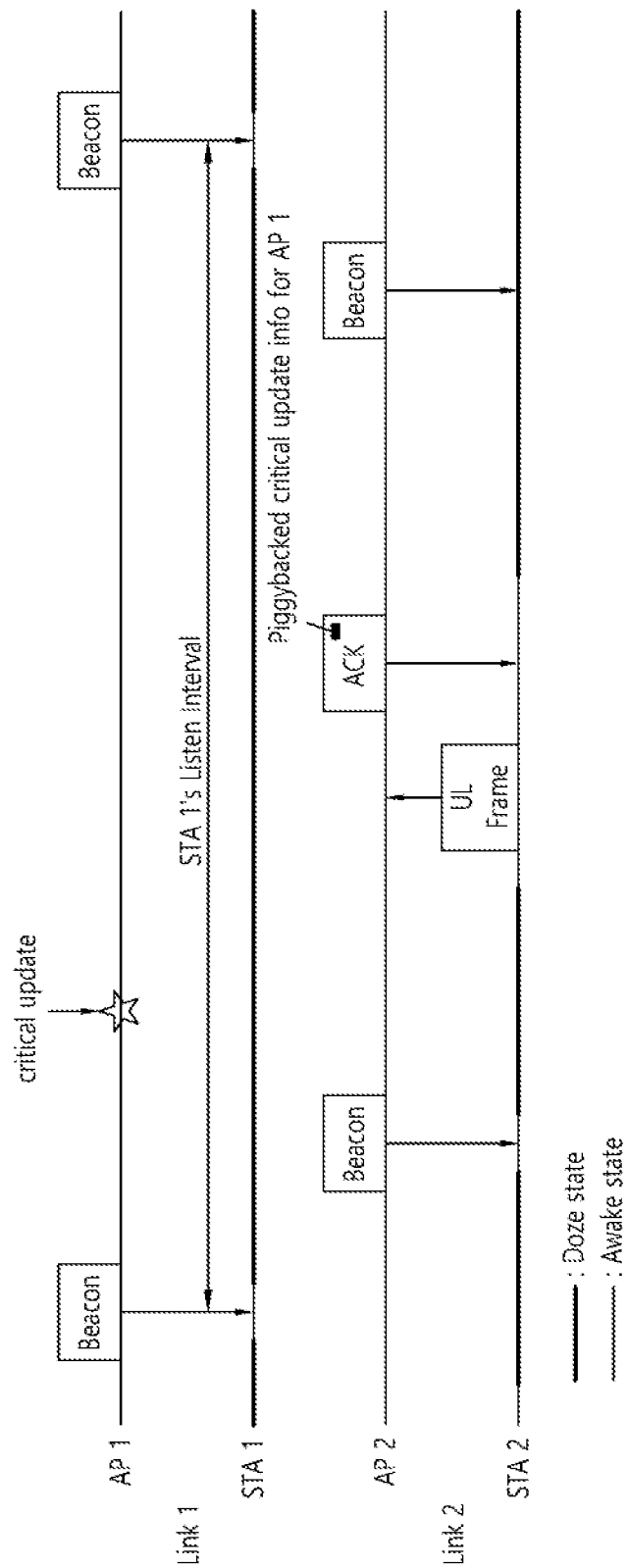
FIG. 46 shows another example of an announcement method for an STA operating in PS mode.

An example of a multi-link case for the example of FIG. 45 is shown in FIG. 46.

FIG. 46 shows another example of an announcement method for an STA operating in PS mode.

When the AP MLD and the non-AP MLD are connected by two links, if the non-AP MLD operates in PS mode and STA 1 and STA 2 awake according to the listen interval, conventionally, critical update information can be checked when an STA wakes up according to its Listen interval. (At this time, the critical update information may be an updated information parameter value or an indicator indicating a version of the update information (e.g. change sequence).) However, when the method proposed in this specification is used, in AP 1 When a critical update occurs, if STA 2 wakes up before the next TBTT time of STA 1 (e.g. TWT SP (Target Wakeup Time Service Period), UL frame transmission, etc.), a method of transmitting such BSS change information by including it in the ACK for the UL frame is also proposed. If the ACK is sent with update information, frame overhead is reduced, and since the STA can doze for a longer period of time, more power consumption can be reduced. Although the example of FIG. 46 shows that update information on one BSS is included in the ACK Frame, information on several other BSSs may also be included regardless of whether or not they are updated.

At this time, if the AP receives the PS-Poll from the STA and knows that it has been awakened, if there is a DL frame to be delivered to the corresponding STA, the update BSS information may be piggybacked in this DL Frame instead of a separate Announcement frame and delivered. An example of this is shown in FIG. 47.

Figure 47:
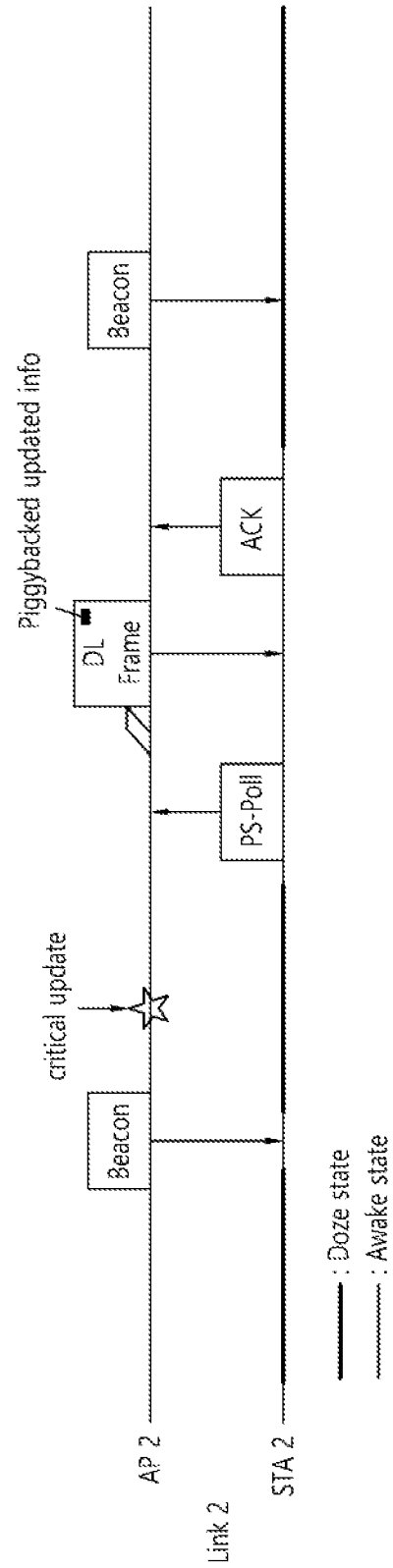
FIG. 47 shows another example of an announcement method for an STA operating in PS mode.

FIG. 47 shows another example of an announcement method for an STA operating in PS mode.

Figure 48:
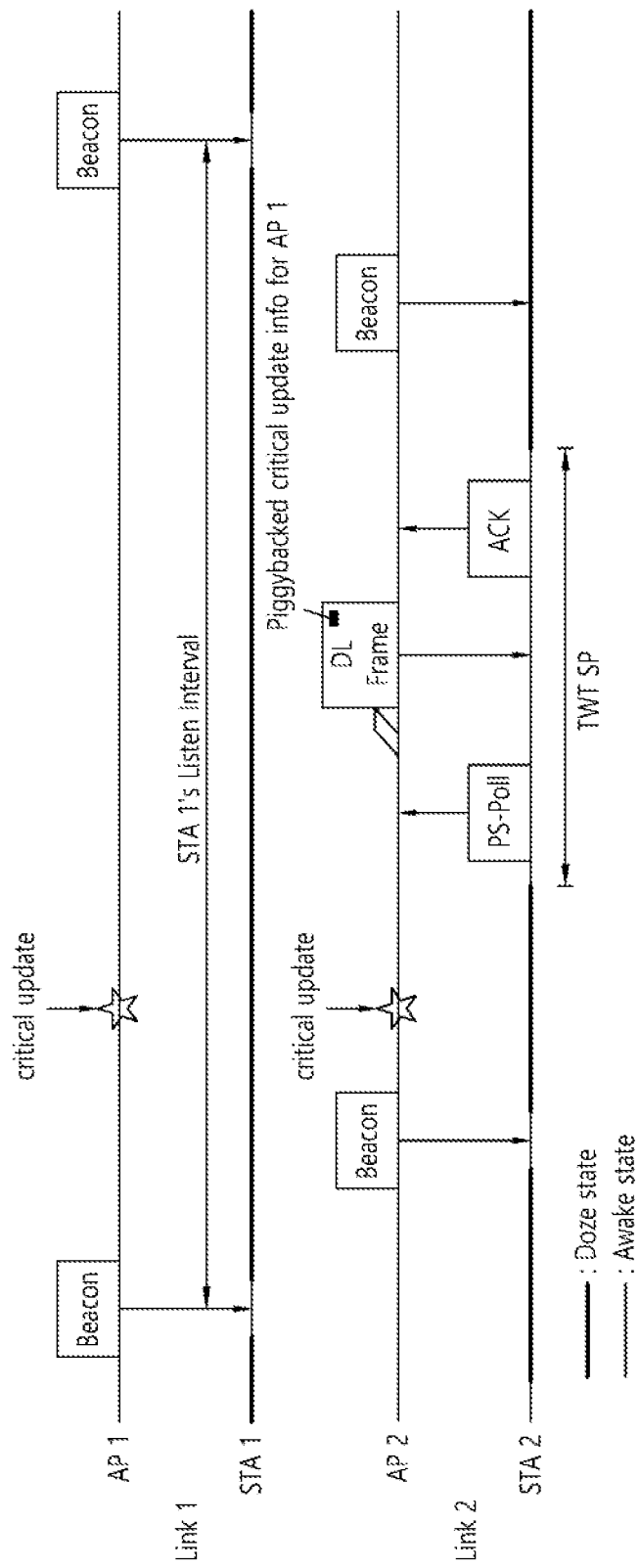
FIG. 48 shows another example of an announcement method for an STA operating in PS mode.

An example of a multi-link case for the example of FIG. 47 is shown in FIG. 48.

FIG. 48 shows another example of an announcement method for an STA operating in PS mode.

When the AP MLD and the non-AP MLD are connected by two links, if the non-AP MLD operates in PS mode and STA 1 and STA 2 awake according to the listen interval, conventionally, critical update information can be checked when an STA wakes up according to its Listen interval. (At this time, the critical update information may be an updated information parameter value or an indication (e.g. change sequence) indicating a version of the update information.) However, when the method proposed in the present disclosure is used, AP 1 If a critical update occurs in, if STA 2 knows that it has awake before the next TBTT time of STA 1, (e.g. TWT SP, UL frame reception, PS-poll reception, etc.), if there is a DL frame to be delivered to STA2, the update BSS information may be piggybacked and delivered to this DL Frame instead of a separate Announcement frame.

If the DL Frame is sent with update information included, the frame overhead is reduced and power consumption can be reduced because the STA can doze for a longer period of time. Although the example of FIG. 48 shows that update information on one BSS is included in the DL Frame, information on several other BSSs may also be included regardless of whether or not they are updated.

An STA receiving changed information through this method can operate based on the changed information without having to wait for the next beacon.

1.3 Signaling for the Announcement Method

This section describes how to signal the announcement method proposed above.

In order to operate based on the announcement method proposed in this section, two methods for activating the operation can be proposed. First, it is a static method and an operation activation method through capability negotiation between an AP MLD and a non-AP MLD in a multi-link setup process. The second is the dynamic method, which allows the non-AP MLD to activate or deactivate the operation of the corresponding method as needed after multi-link setup.

First of all, the following fields are defined to indicate this operation. The names or ranks of fields proposed in this specification may be changed according to later embodiments.

1) Support Announcement method: Information indicating whether the MLD supports the Announcement method. If it has a value of 1, it means that the corresponding MLD can support the announcement method, and if it has a value of 0, it means that the corresponding method function is not supported. The corresponding information may indicate whether or not support is available at the MLD level, but may also indicate whether or not support is available at the link level. If the MLD level indicates support, all links in the MLD support the corresponding mode if the MLD supports it, and if not, all links in the MLD do not support the corresponding mode. Alternatively, when the corresponding information indicates support at the link level, it indicates support for each entity within the MLD. At this time, a Link indicator (e.g. Link ID) can be used to indicate whether each entity is supported. When the corresponding information is used together with the Link indicator (e.g. Link ID), it can indicate whether or not the announcement method is supported for each specific entity in the MLD. That is, the corresponding operation can be independently supported for each entity within the MLD.

For example, this information may be defined in the EHT MAC Capabilities information field.

2) Announcement method Mode: Information indicating whether the announcement method operation of the corresponding MLD is activated. If the corresponding information has a value of 1, it means that the announcement method of the corresponding MLD has been activated, and if it has a value of 0, it means that it has been deactivated.

The corresponding information may indicate whether or not it is activated at the MLD level, but it may also indicate whether it is activated or not at the link level. If activation or not is indicated at the MLD level, activation or deactivation of the corresponding mode for the MLD is indicated. If the corresponding mode is activated for the MLD, all links in the MLD are activated for the corresponding mode, and if the corresponding mode is deactivated for the MLD, all links in the MLD are deactivated for the corresponding mode. Alternatively, if the corresponding information indicates activation at the link level, it can indicate activation for each entity in the MLD. At this time, a link indicator (e.g. Link ID) can be used to indicate whether each entity is activated. When the information is used together with the Link indicator (e.g. Link ID), it can indicate whether or not the announcement method is activated for each specific entity in the MLD. That is, the operation can be independently controlled for each entity within the MLD. This mode can be indicated as semi-static or dynamic. For example, in the case of semi-static, it can be included in EHT capability or EHT operation element, in case of dynamic indication, it can be piggy back to a frame (e.g. control frame, data frame, null frame, etc.) or indicated through the A-Control field or Control field. In addition, the corresponding indicator may be included in the Beacon frame to inform the STA that an announcement frame including information on critical update will be transmitted.

1.3.1 Static Signaling for the Announcement Method

The announcement method proposed in this section is a method of indicating in a static way. If the corresponding method (i.e., announcement method) is supported statically, it operates as follows.

If the AP or STA supports the operation of the corresponding announcement method, it has a 'Support Announcement method' value of 1. In the link setup process, if both the STA and the AP support the corresponding mode (i.e., 'Support Announcement method'=1), operation is based on the corresponding method after the link setup process through capability negotiation process.

Figure 49:
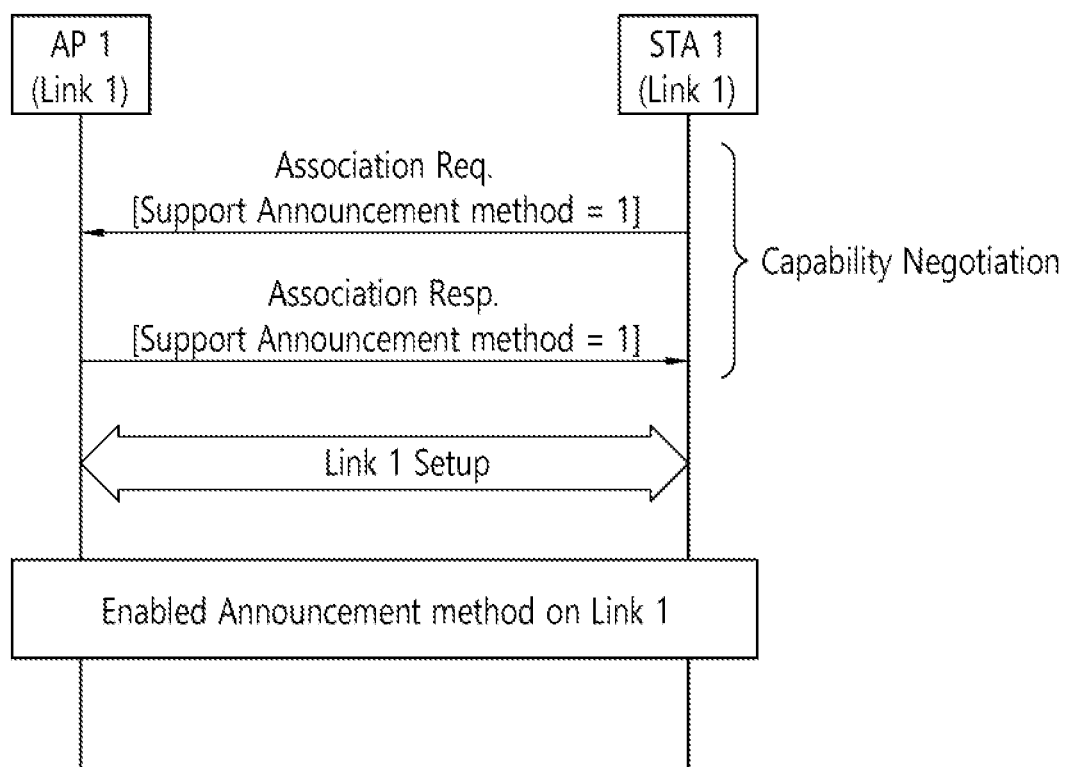
FIG. 49 shows an example of a static signaling method of a single link device.

FIG. 49 shows an example of a static signaling method of a single link device.

When non-AP MLD and AP MLD perform multi-link setup, it operates in the corresponding method after multi-link setup through capability negotiation for the entity that supports the corresponding method (i.e., 'Support Announcement method'=1). At this time, if the method is supported at the MLD level, the non-AP MLD or AP MLD supports all entities within the MLD based on the method.

Figure 50:
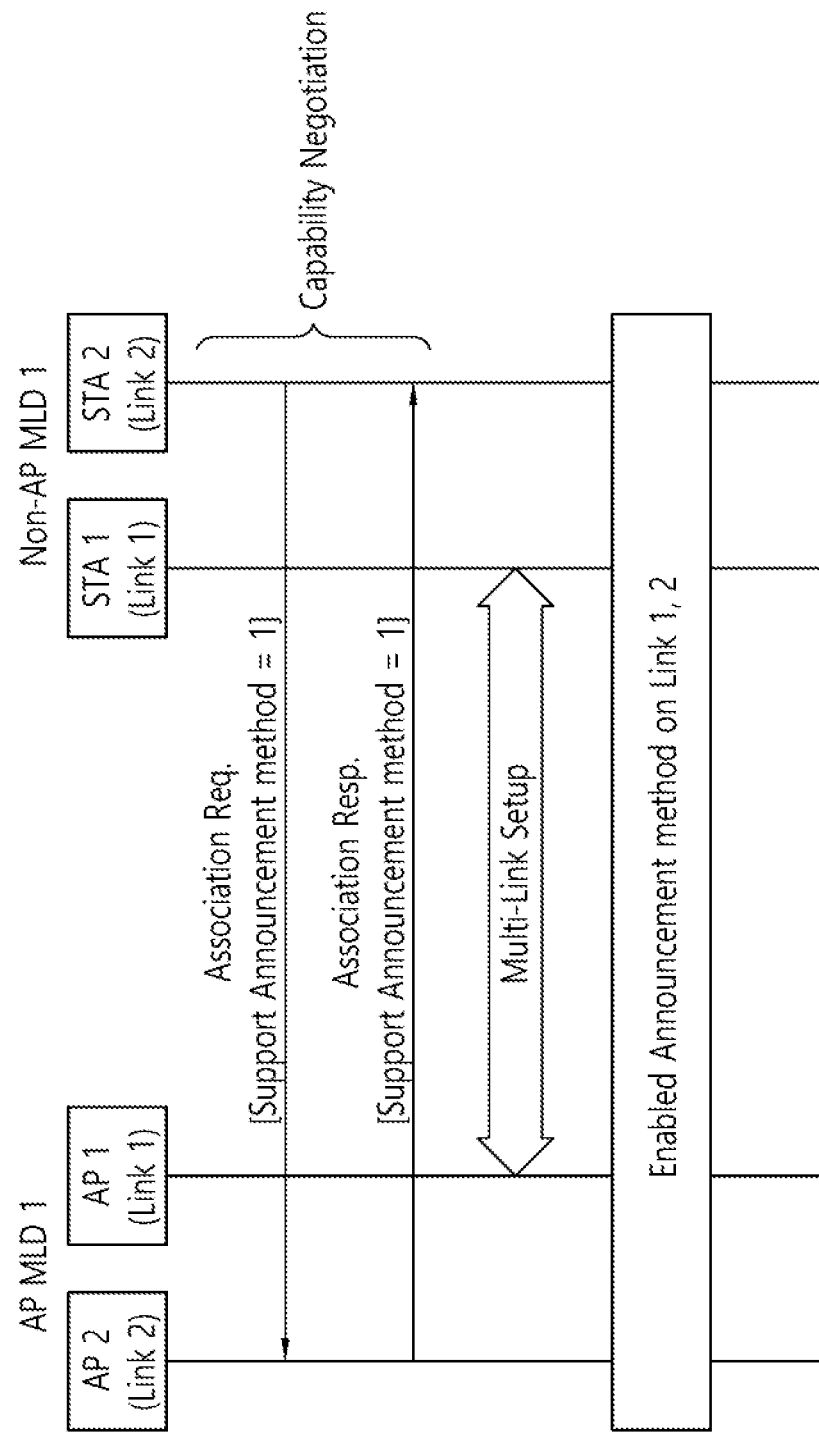
FIG. 50 shows an example of a static signaling method of a multi-link device.

FIG. 50 shows an example of a static signaling method of a multi-link device.

If the corresponding method is supported at the link level, the corresponding method operates only for non-AP MLD or entities that support the corresponding method in the AP MLD. Like the embodiment of FIG. 51, if the corresponding method is supported at the link level, it may be notified to indicate whether or not the corresponding method is supported for each link. Based on the corresponding information, the non-AP MLD and AP MLD can independently operate based on the corresponding method for each link.

Figure 51:
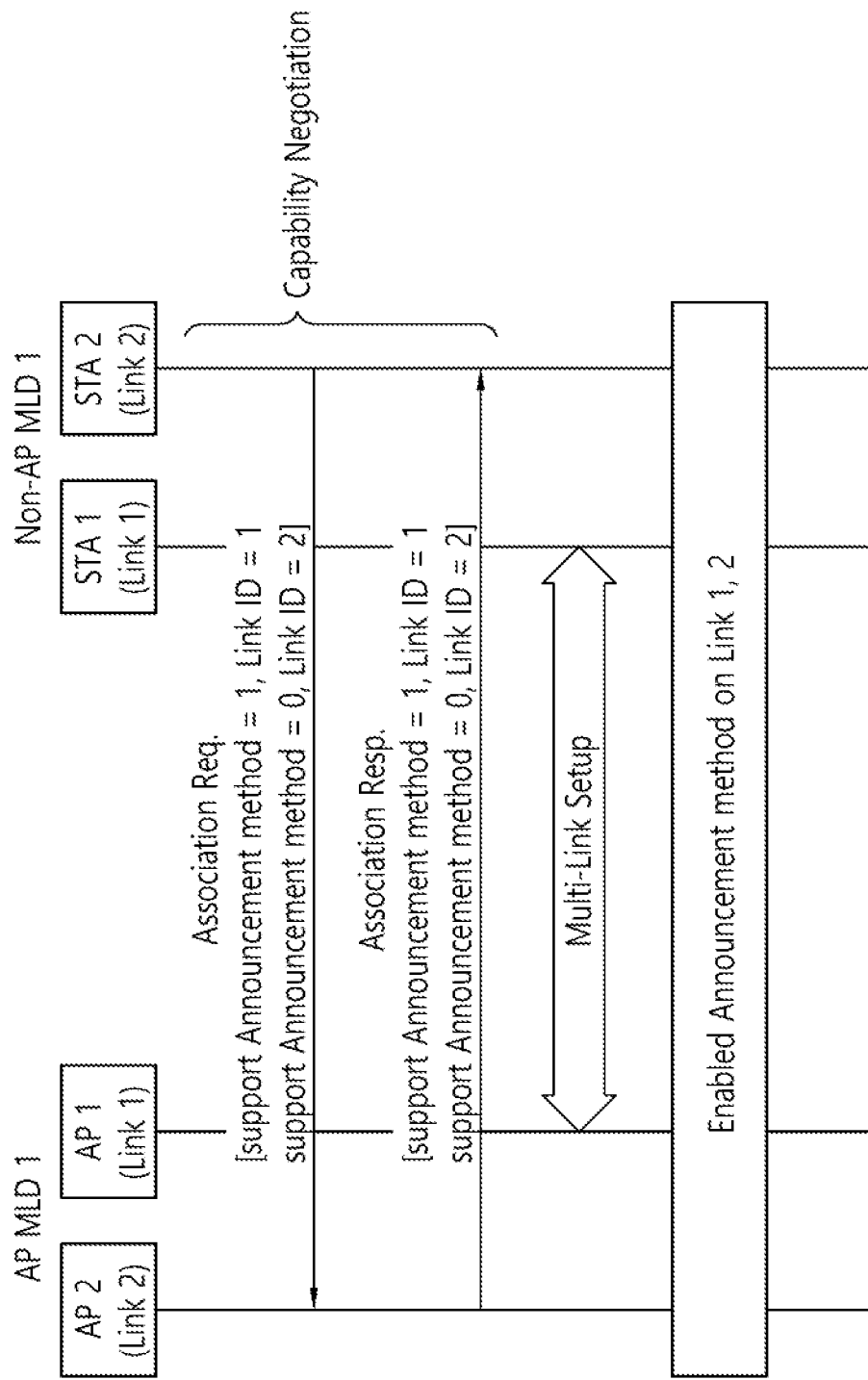
FIG. 51 shows another example of a static signaling method of a multi-link device.

FIG. 51 shows another example of a static signaling method of a multi-link device.

1.3.2 Dynamic Signaling for the Announcement Method

The announcement method proposed in this section is a method of indicating in a dynamic way. If the corresponding method (i.e., announcement method) is dynamically supported, it operates as follows. In this method, after multi-link setup, the STA can use the A-Control field or Control field to freely control whether or not the corresponding method is activated according to circumstances. For example, the AP has 'Announcement method mode' information indicating whether the corresponding method is activated. At this time, if the STA wants to activate the corresponding method, it can be requested by piggy back in a frame (e.g. control frame or data frame, etc.) or by indicating 'Announcement method mode'=1 in the A-Control field or Control field. Upon receiving this, the AP activates the announcement method and then operates based on the corresponding method. Conversely, if the STA wants to deactivate the corresponding method, it can be requested by piggy backing in a frame (e.g. control frame or data frame, etc.) or by indicating a value of 'Announcement method mode'=0 in the A-Control field or Control field. Upon receiving this, the AP deactivates the corresponding method.

Figure 52:
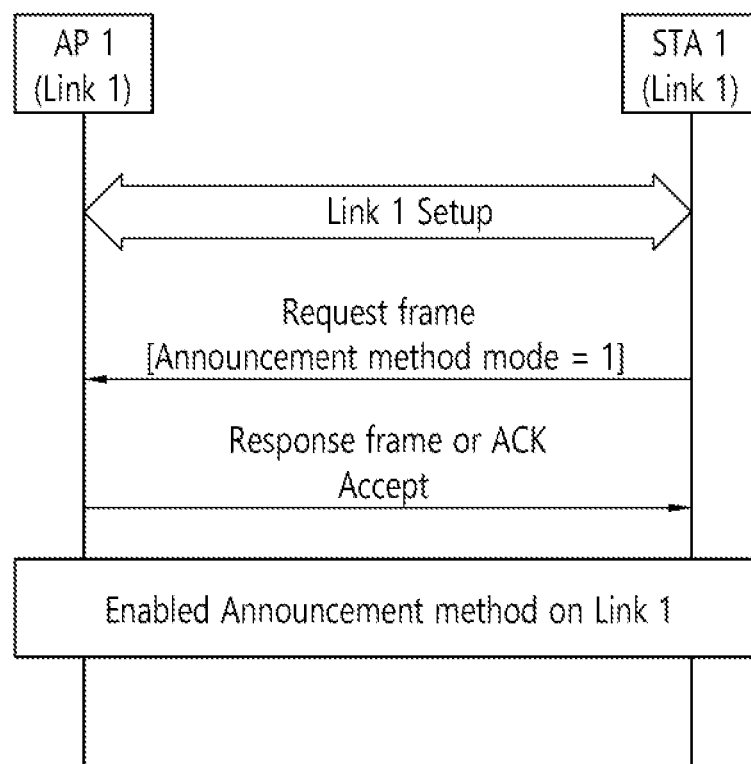
FIG. 52 shows an example of a dynamic signaling method of a single link device.

FIG. 52 shows an example of a dynamic signaling method of a single link device.

The operation in MLD with multi-link is as follows. If it wants to activate the corresponding method, the STA of the non-AP MLD transmits a message requesting activation of the corresponding method to the connecting AP of the AP MLD. It can be requested by piggy backing in the request frame (e.g. control frame or data frame, etc.) or by instructing 'Announcement method mode'=1 in the A-Control field or Control field. Upon receiving this, the AP activates the announcement method for all links within the AP MLD, and then operates based on the method. Conversely, if the STA wants to deactivate the corresponding method, it can be requested by piggy backing in a frame (e.g. control frame or data frame, etc.) or by indicating a value of 'Announcement method mode'=0 in the A-Control field or Control field. Upon receiving this, the AP deactivates the corresponding method for all links within the AP MLD.

Figure 53:
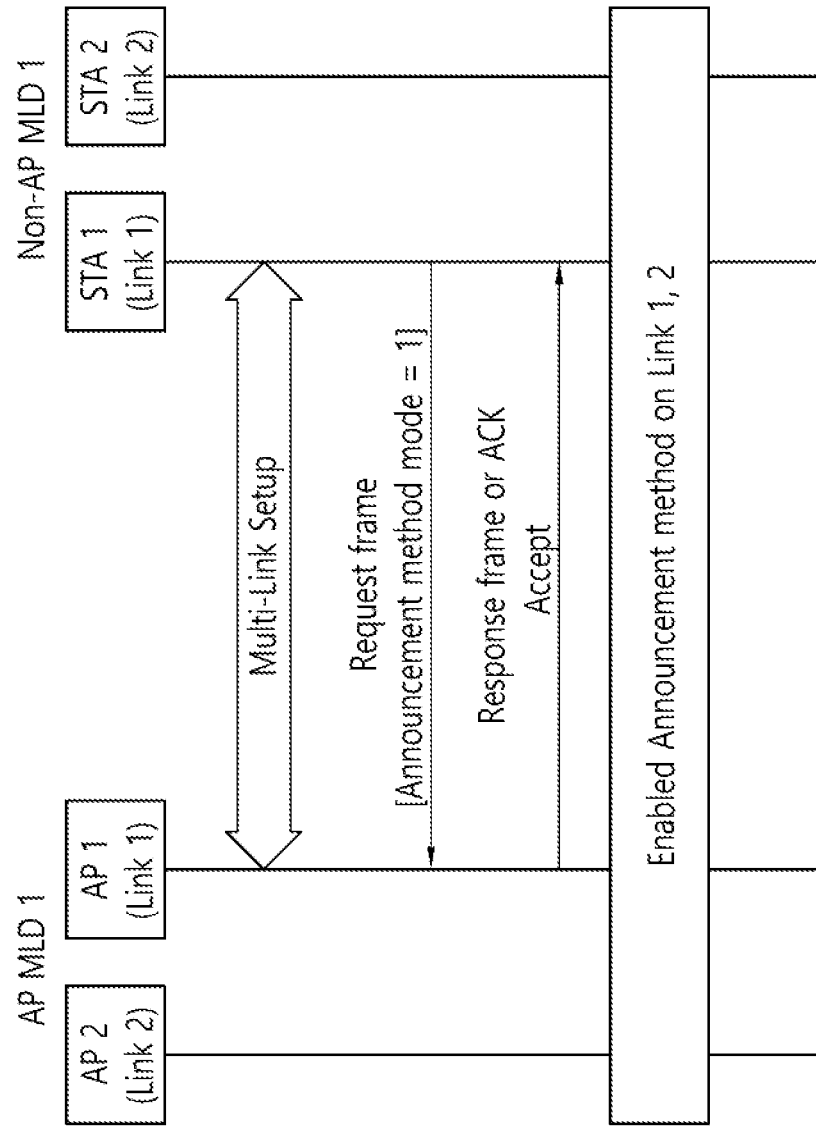
FIG. 53 shows an example of a dynamic signaling method of a multi-link device.

FIG. 53 shows an example of a dynamic signaling method of a multi-link device.

For example, when one STA of a non-AP MLD transmits a request message for activating an announcement method to an AP of a connected AP MLD, the announcement method is activated for all entities in the AP MLD. The deactivation process may also be instructed in the same way.

Figure 54:
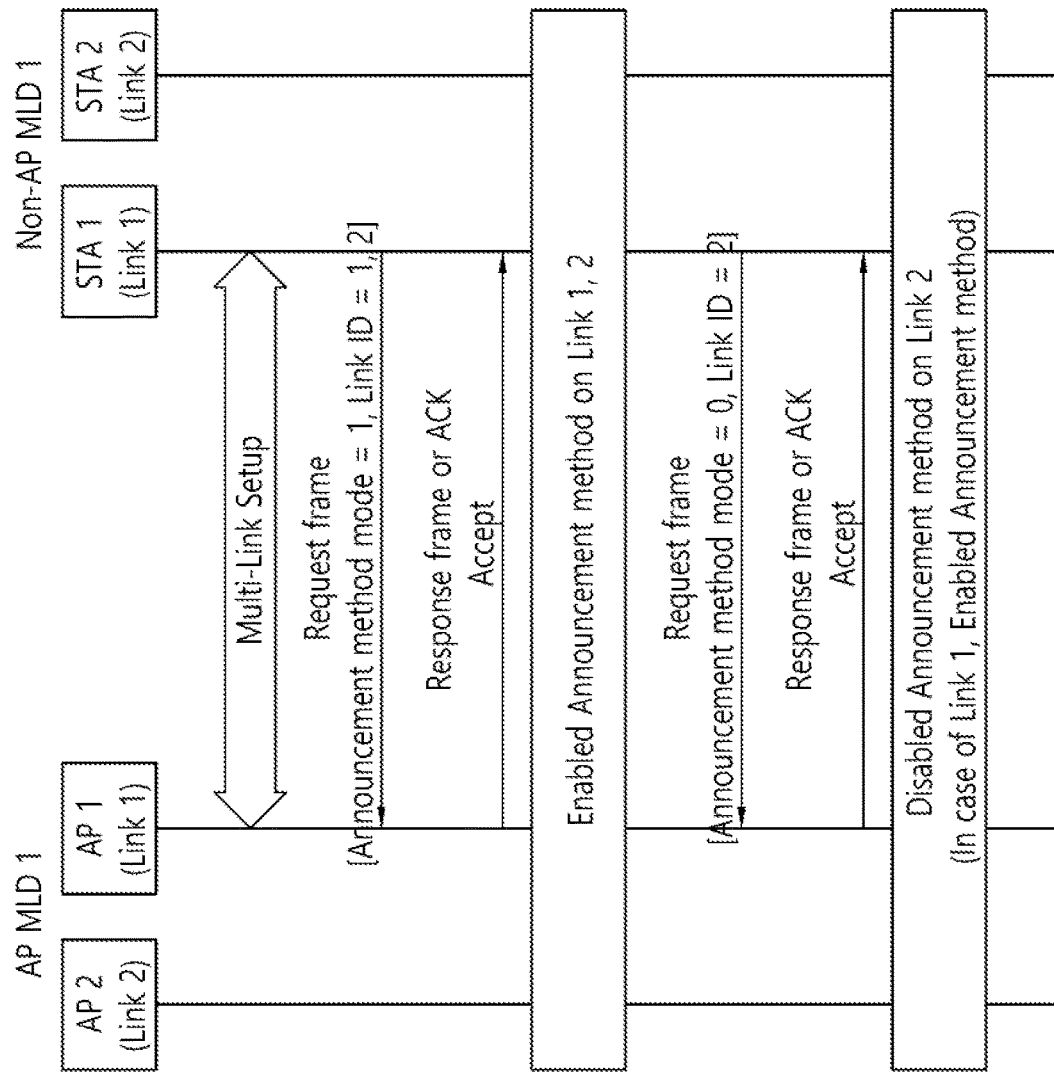
FIG. 54 shows another example of a dynamic signaling method of a multi-link device (when link level is supported).

FIG. 54 shows another example of a dynamic signaling method of a multi-link device (when link level is supported).

For example, when an STA of a non-AP MLD transmits a request message for activating an announcement method to an AP of a connected AP MLD, each entity in the AP MLD may be instructed to activate the announcement method. At this time, if 'Announcement method mode'=1 is requested along with Link information to be activated, the AP activates the corresponding method only for the indicated Link. The deactivation process may also be instructed in the same way.

1.3.3 Semi-Static Signaling for the Announcement Method

The announcement method proposed in this section is a method of indicating in a semi-static way. If the corresponding method (i.e., announcement method) is supported semi-statically, it operates as follows.

The corresponding method (i.e., announcement method) can be activated through capability negotiation (e.g. using the Support Announcement method field) in the multi-link setup process. At this time, after link setup, the corresponding mode can be freely activated or deactivated using the 'Announcement method mode' field, like the dynamic signaling method described in Section 1.3.2. The semi-static signaling method may be used as a method of compromising the static signaling method and the dynamic signaling method.

1.3.4 Indication of the Announcement Method for Critical Update

The 'Announcement method Mode' field indicating whether the announcement method proposed in this section is activated can be included in the Beacon frame and transmitted. For example, the field may be included and transmitted as shown in FIG. 55 in the Capability information field of the Beacon frame.

FIG. 55 shows the format of the Capability information field of a Beacon frame.

As shown in FIG. 55, the 'Announcement method Mode' field is added to the Capability Information field and included in the Beacon transmitted by the AP to inform the STA whether the method is activated.

The 'Announcement method Mode' field is set to 1 when a critical update occurs for any AP in the MLD, the same AP of the AP transmitting the beacon. (e.g. Unsolicited (broadcast) Probe Response frame) means that it will be transmitted as a broadcast. The corresponding announcement frame is transmitted until the next DTIM of the AP transmitting the frame.

At this time, the corresponding announcement frame includes the link information of the AP where the critical update information has occurred, the current Change Sequence field information of the corresponding AP (i.e., the Change Sequence number information corresponding to the critical update that has occurred), the changed BSS parameters information, and other information.

In 802.11be, the 'Critical Update Flag' field is defined to notify whether a critical update occurs for the same AP of the AP transmitting the beacon and any AP of the MLD. The STA receiving the beacon can check whether the critical update for the other link in the current AP MLD is performed through the corresponding field. When the corresponding Flag value is 1, the STA of the non-AP MLD will try to obtain the updated BSS parameter information of the critically updated AP by checking the value of the Change Sequence field in the RNR element. To this end, the non-AP MLD will attempt to acquire the changed information by awake the link corresponding to the AP with the changed Change Sequence field value or by sending an ML probe request.

However, the AP MLD supports the announcement method proposed in this specification and there is an 'Announcement method mode' field in the Capability Information field of Beacon, the STA confirming that the corresponding field value is 1 can know that one or more Unsolicited (broadcast) Probe Response frames including updated BSS parameter information and current Change Sequence information will be transmitted in the next DTIM. The STA confirming this does not need to awake the other link or transmit the ML probe request frame. However, since the field value is set to 1 after a critical update occurs and then set to 0 again after the next DTIM, in the case of an STA that awakes after a long sleep, a separate ML probe request can be transmitted to obtain updated information.

In the case of a non-AP MLD that operates in PS mode and awakes at beacon timing for only one or more links, if it is confirmed that 'Announcement method mode' is set to 1 when awake for beacon reception, the STA maintains an awake state to obtain an Unsolicited (broadcast) Probe Response frame including updated BSS parameter information. The STA receiving the frame may then enter doze.

At this time, the STA confirming that the value of the corresponding field (i.e. 'announcement method mode') of the Beacon is 1 may limit ML probe request transmission until the value of the corresponding field is 0 to prevent a probe storm issue.

1.3.4.1 Transmission Timing of the Announcement Method for Critical Update

In this specification, when a critical update occurs in any AP of the AP MLD, a method of indicating whether to activate an announcement method that transmits changed critical update information through an indicator included in a beacon frame is proposed. In this case, the value of the corresponding indicator is set to 1 until the next DTIM of the reporting AP after the critical update occurs, and the value may be set to 0 again thereafter. At this time, various cases can be considered for the 'Announcement method mode' field setting timing and announcement frame transmission timing, and these cases are dealt with in this specification.

1.3.4.1.1 When an Announcement Frame is Transmitted After a Critical Update Occurs, Regardless of Whether an Indicator is Set in Beacon or Not When the AP MLD supports the announcement method for the critical update proposed in this specification, when a critical update occurs in any AP of the AP MLD, the AP may transmit an announcement frame including information changed due to the critical update. If, as in Section 1.3.4.1.1, an announcement frame is transmitted regardless of whether an indicator within a beacon is set, the corresponding announcement frame can be transmitted regardless of the beacon cycle after a critical update occurs. Therefore, in this case, the AP may transmit an announcement frame immediately after the critical update occurs regardless of the beacon transmission period, and if the STA is awake, the corresponding announcement frame may be received before checking the 'Announcement method mode' field value of the beacon.

If an announcement frame is transmitted before the transmission of a Beacon frame in which the 'Announcement method mode' field value is set to 1 after a critical update occurs through the corresponding method, even if an Announcement frame is transmitted before Beacon frame transmission for an STA that wakes up after checking the Beacon's 'Announcement method mode' indicator by operating in PS mode, 'Announcement method mode' of the Beacon frame is set to 1 and transmitted, and at least one Unsolicited (broadcast) Probe Response frame must be transmitted.

This method has the advantage of being able to immediately receive changed information immediately after a critical update occurs, regardless of the beacon period.

1.3.4.1.2 In Case of Sending Announcement Frame After Setting Indicator in Beacon After Critical Update Occurs When the AP MLD supports the announcement method for the critical update proposed in this specification, when a critical update occurs in any AP of the AP MLD, the AP may transmit an announcement frame including information changed due to the critical update. If, as in Section 1.3.4.1.2, after a critical update occurs, the announcement frame may be limited to transmission after setting the value of the 'Announcement method mode' field in Beacon. In other words, even if a critical update occurs in any AP, the corresponding announcement frame is set to Beacon's 'Announcement method mode' field =1, and after notifying that the Unsolicited (broadcast) Probe Response frame will be transmitted, the AP transmits one or more announcement frames.

This method is a method for reducing traffic overhead for the announcement frame because an announcement frame (e.g. Unsolicited (Broadcast) Probe Response frame) that occurs before Beacon reception may be missed if the STA is not in an awake state. However, this method does not obtain information immediately after a critical update occurs, and the STA can obtain changed BSS parameter information after transmitting at least one beacon.

1.4 Operation of Announcement Method in PS Mode

In this specification, announcement considering power saving is additionally considered.

If the non-AP MLD can support the announcement method for power saving (section 1.2) proposed in the present disclosure, it operates as follows. The corresponding method can indicate activation through the signaling method proposed above. If enabled for the corresponding method, the announcement method can operate according to the PS mode enabled of the non-AP MLD. For example, when a non-AP MLD operates in Active mode, it operates based on the General Announcement method (Section 1.1 proposal), and when it operates in PS mode, it uses Announcement method for power saving (Section 1.2 proposal). works based on On the other hand, if the non-AP MLD does not support the Announcement method for power saving (Section 1.2 content) proposed in this specification, it operates based on the existing General Announcement method (Section 1.1 proposal content).

For example, when the non-AP MLD operates in Active mode, the General Announcement method operates, and when the non-AP MLD or STA operates in PS mode and enters the doze state, the announcement message is pending until the announcement message is discarded or the STA awakes.

1.5 Signaling for Additional Information

In the present specification, several methods for notifying the STA of the change or generation of critical information for the AP have been defined. Such critical information can be delivered through an announcement frame or piggy-backed on a separate DL frame or an existing DL frame. At this time, if critical information is included in the frame transmitted by the AP, signaling for informing the STA of this may be defined.

'Check data' field (or subfield or element): An indicator indicating that a frame including the field includes critical information for the STA. If the corresponding value is 1, since the corresponding frame includes critical information that the STA needs to check, the STA can confirm that the corresponding Frame includes critical information that it needs to check. After confirming that the corresponding field value is 1, the STA must decode the corresponding Frame. For example, this signaling indicates 1 when critical information included in the announcement frame, and the STA receiving this recognizes that the announcement frame includes critical information and decodes it. In addition, this signaling can confirm that additional critical information is included in the frame in addition to the existing DL data when critical information is piggy-backed in the DL Frame. The corresponding directive can be usefully used in other cases as well. If this is not the case, the corresponding value is indicated as 0. The name of the corresponding field can be defined with a different name later.

When the 'Check data' field mentioned above is used together with the explicit method for announcement method (Section 1.1.1) proposed in this specification, the announcement frame or DL frame transmitted to the STA includes this indicator through the corresponding field. It can indicate that there is critical information in a frame.

'Check info' field (or subfield or element): An indicator indicating that critical information about the corresponding STA is generated or generated in the BSS. This field may be indicated as a non-AP MLD level or as a non-AP STA level. A non-AP MLD or non-AP STA receiving a frame in which the value of the corresponding field indicator is set to 1 can confirm that critical information (e.g. critical update event or low latency traffic) necessary for it has occurred. After confirming that the indicator corresponding to itself is 1, the STA may awake when in a doze state to obtain information through a beacon, or may obtain critical information through an info response message by transmitting an info request message. If not, the corresponding value is indicated as 0. The name of the corresponding field may be defined later as a different name.

When the 'Check info' field mentioned above is used together with the implicit method for announcement method (Section 1.1.2) proposed in this specification, the STA indicated by the corresponding indicator may inform the connecting AP (or BSS) that critical information to be checked has been created or changed.

Hereinafter, the above-described embodiment will be described with reference to FIGS. 1 to 55.

Figure 56:
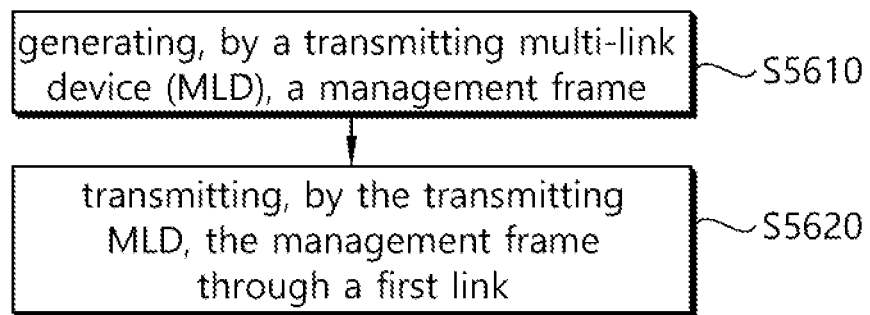
FIG. 56 is a flowchart illustrating a procedure in which a transmitting MLD transmits critical update information for a specific AP through a management frame according to this embodiment.

FIG. 56 is a flowchart illustrating a procedure in which a transmitting MLD transmits critical update information for a specific AP through a management frame according to this embodiment.

The example of FIG. 56 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for configuring a management frame notifying that an announcement frame including critical update information for a specific AP in a transmitting MLD will be transmitted based on an announcement method mode field. Here, the transmitting MLD may correspond to the AP MLD, and the receiving MLD may correspond to the non-AP MLD. A first transmitting STA connected to a first receiving STA included in the receiving MLD through a first link may correspond to a peer AP, the second and third transmitting STAs connected through different links (second and third links) may correspond to different APs.

In step S5610, a receiving multi-link device (MLD) receives a management frame from a transmitting MLD through a first link.

In step S5610, the receiving MLD decodes the management frame.

The transmitting MLD includes a first transmitting station (STA) operating on the first link and a second transmitting STA operating on a second link. The receiving MLD includes a first receiving STA operating on the first link and a second receiving STA operating on the second link.

The management frame includes an announcement method mode field.

When a critical update for the second transmitting STA occurs, a value of the announcement method mode field is set to 1, and the management frame includes critical update information of the second transmitting STA.

When the value of the announcement method mode field is set to 1, the announcement method mode field may include information indicating that the management frame will be transmitted until the next delivery traffic indication message (DTIM) of the first transmitting STA.

At this time, the management frame may be a beacon frame or an unsolicited probe response frame. The beacon frame or the unsolicited probe response frame may be broadcast.

That is, this embodiment proposes a method of notifying that an announcement frame including critical update information for a specific AP of a transmitting MLD will be transmitted by including an announcement method mode field in the management frame. According to this embodiment, the first receiving STA of the receiving MLD receives the beacon frame or the unsolicited probe response frame from the first transmitting STA of the transmitting MLD without transmitting a separate request message, thereby the first receiving STA obtains critical update information of other transmitting STAs. Accordingly, there is an effect that frame overhead can be reduced because the first receiving STA does not transmit the separate request message. In addition, when another receiving STA in the receiving MLD operates in Power Saving (PS) mode, critical update information of other transmitting STAs can be obtained without waking the corresponding receiving STA, so a power saving effect can be expected.

The management frame may further include information on the second link and information on a current change sequence number of the second transmitting STA. That is, the first receiving STA may obtain a change sequence number value of the second transmitting STA through the management frame when a critical update of the second transmitting STA occurs. The information on the second link may include identifier information on the second link.

When a critical update event for the second transmitting STA occurs, a value of the current change sequence number of the second transmitting STA may be increased by 1. The first receiving STA may confirm that a critical update event of the second transmitting STA has occurred based on the current change sequence number of the second transmitting STA. Information related to the above critical update event may include Channel Switch Announcement, Extended Channel Switch Announcement element, EDCA parameters element, Quiet element, DSSS Parameter Set, CF Parameter Set element, HT Operation element, Wide Bandwidth Channel Switch element, Channel Switch Wrapper element, Operating Mode Notification element, Quiet Channel element, VHT Operation element, HE Operation element, Broadcast TWT element, BSS Color Change Announcement element, MU EDCA Parameter Set element, Spatial Reuse Parameter Set element, UORA Parameter Set element, EHT Operation element and/or Basic variant Multi-Link element.

The transmitting MLD may further include a third transmitting STA operating in a third link, and the receiving MLD may further include a third receiving STA operating in the third link.

When a critical update for the third transmitting STA occurs, the value of the announcement method mode field may be set to 1, and the management frame may include critical update information of the third transmitting STA.

The management frame may further include information on the third link and information on a current change sequence number of the third transmitting STA. That is, the first receiving STA may obtain a change sequence number value of the third transmitting STA through the management frame when a critical update of the third transmitting STA occurs. The information on the third link may include identifier information on the third link.

When a critical update event for the third transmitting STA occurs, a value of the current change sequence number of the third transmitting STA may be increased by 1. The first receiving STA may confirm that a critical update event of the third transmitting STA has occurred based on the current change sequence number of the third transmitting STA.

The information on the current change sequence number of the second and third transmitting STAs may be a change sequence number or count value of a basic service set (BSS) parameter.

The management frame may include a reduced neighbor report (RNR) element. The RNR element may include the announcement method mode field. The announcement method mode field may be named an All Updates Included subfield. The management frame may further include a Change Sequence Field (CSF) field. The CSF field may also be named a BSS Parameter Change Count (BPCC) subfield.

Figure 57:
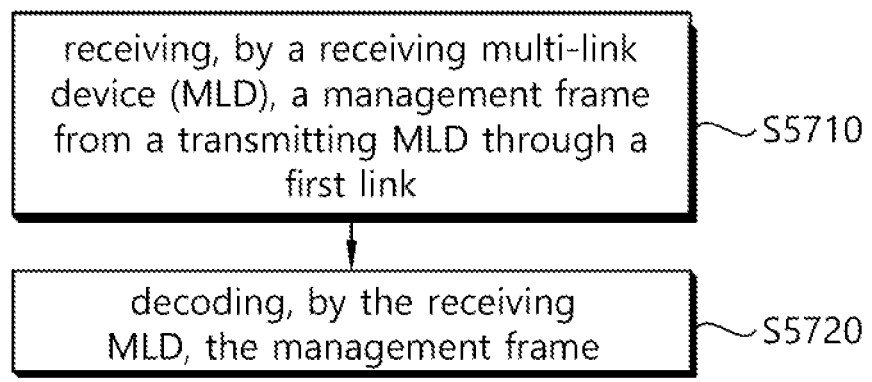
FIG. 57 is a flowchart illustrating a procedure in which a receiving MLD receives critical update information for a specific AP through a management frame according to this embodiment.

FIG. 57 is a flowchart illustrating a procedure in which a receiving MLD receives critical update information for a specific AP through a management frame according to this embodiment.

The example of FIG. 57 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for configuring a management frame notifying that an announcement frame including critical update information for a specific AP in a transmitting MLD will be transmitted based on an announcement method mode field. Here, the transmitting MLD may correspond to the AP MLD, and the receiving MLD may correspond to the non-AP MLD. A first transmitting STA connected to a first receiving STA included in the receiving MLD through a first link may correspond to a peer AP, the second and third transmitting STAs connected through different links (second and third links) may correspond to different APs.

In step S5710, a receiving multi-link device (MLD) receives a management frame from a transmitting MLD through a first link.

In step S5720, the receiving MLD decodes the management frame.

The transmitting MLD includes a first transmitting station (STA) operating on the first link and a second transmitting STA operating on a second link. The receiving MLD includes a first receiving STA operating on the first link and a second receiving STA operating on the second link.

The management frame includes an announcement method mode field.

When a critical update for the second transmitting STA occurs, a value of the announcement method mode field is set to 1, and the management frame includes critical update information of the second transmitting STA.

When the value of the announcement method mode field is set to 1, the announcement method mode field may include information indicating that the management frame will be transmitted until the next delivery traffic indication message (DTIM) of the first transmitting STA.

At this time, the management frame may be a beacon frame or an unsolicited probe response frame. The beacon frame or the unsolicited probe response frame may be broadcast.

That is, this embodiment proposes a method of notifying that an announcement frame including critical update information for a specific AP of a transmitting MLD will be transmitted by including an announcement method mode field in the management frame. According to this embodiment, the first receiving STA of the receiving MLD receives the beacon frame or the unsolicited probe response frame from the first transmitting STA of the transmitting MLD without transmitting a separate request message, thereby the first receiving STA obtains critical update information of other transmitting STAs. Accordingly, there is an effect that frame overhead can be reduced because the first receiving STA does not transmit the separate request message. In addition, when another receiving STA in the receiving MLD operates in Power Saving (PS) mode, critical update information of other transmitting STAs can be obtained without waking the corresponding receiving STA, so a power saving effect can be expected.

The management frame may further include information on the second link and information on a current change sequence number of the second transmitting STA. That is, the first receiving STA may obtain a change sequence number value of the second transmitting STA through the management frame when a critical update of the second transmitting STA occurs. The information on the second link may include identifier information on the second link.

When a critical update event for the second transmitting STA occurs, a value of the current change sequence number of the second transmitting STA may be increased by 1. The first receiving STA may confirm that a critical update event of the second transmitting STA has occurred based on the current change sequence number of the second transmitting STA. Information related to the above critical update event may include Channel Switch Announcement, Extended Channel Switch Announcement element, EDCA parameters element, Quiet element, DSSS Parameter Set, CF Parameter Set element, HT Operation element, Wide Bandwidth Channel Switch element, Channel Switch Wrapper element, Operating Mode Notification element, Quiet Channel element, VHT Operation element, HE Operation element, Broadcast TWT element, BSS Color Change Announcement element, MU EDCA Parameter Set element, Spatial Reuse Parameter Set element, UORA Parameter Set element, EHT Operation element and/or Basic variant Multi-Link element.

The transmitting MLD may further include a third transmitting STA operating in a third link, and the receiving MLD may further include a third receiving STA operating in the third link.

When a critical update for the third transmitting STA occurs, the value of the announcement method mode field may be set to 1, and the management frame may include critical update information of the third transmitting STA.

The management frame may further include information on the third link and information on a current change sequence number of the third transmitting STA. That is, the first receiving STA may obtain a change sequence number value of the third transmitting STA through the management frame when a critical update of the third transmitting STA occurs. The information on the third link may include identifier information on the third link.

When a critical update event for the third transmitting STA occurs, a value of the current change sequence number of the third transmitting STA may be increased by 1. The first receiving STA may confirm that a critical update event of the third transmitting STA has occurred based on the current change sequence number of the third transmitting STA.

The information on the current change sequence number of the second and third transmitting STAs may be a change sequence number or count value of a basic service set (BSS) parameter.

The management frame may include a reduced neighbor report (RNR) element. The RNR element may include the announcement method mode field. The announcement method mode field may be named an All Updates Included subfield. The management frame may further include a Change Sequence Field (CSF) field. The CSF field may also be named a BSS Parameter Change Count (BPCC) subfield.

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives a management frame from a transmitting multi-link device (MLD) through a first link; and decodes the management frame.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a management frame from a transmitting multi-link device (MLD) through a first link; and decoding the management frame. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
   receiving, by a first non-access point (non-AP) station (STA), management frames from a first AP; and
   decoding, by the first non-AP STA, the management frames,
   wherein the first AP operating on a first link and a second AP operating on a second link are affiliated with an AP multi-link device (MLD),
   wherein the first non-AP STA operating on the first link and a second non-AP STA operating on the second link affiliated with a non-AP MLD,
   wherein the management frames include an All Updates Included subfield indicating whether updated elements of the second AP based on a critical update for the second AP are included in the management frames, and
   wherein based on the All Updates Included subfield set to 1, the updated elements of the second AP are included in the management frames until the next delivery traffic indication message (DTIM) of the first AP.

2. The method of claim 1, wherein the management frames further include information on the second link and information on a current change sequence number of the second AP,
   wherein based on the critical update for the second AP, a value of the current change sequence number of the second AP is increased by 1.

3. The method of claim 2, wherein the information on the current change sequence number of the second AP is a change sequence number or count value of a basic service set (BSS) parameter.

4. The method of claim 1, wherein the management frames include a beacon frame and an unsolicited probe response frame;
   wherein the beacon frame and the unsolicited probe response frame are broadcast.

5. A first non-access point (non-AP) station (STA) in a wireless local area network (WLAN) system, the first non-AP STA comprising:
   a memory;
   a transceiver; and
   a processor operatively coupled to the memory and the transceiver,
   wherein processor is configured to:
   receive management frames from a first AP; and
   decode the management frames,
   wherein the first AP operating on a first link and a second AP operating on a second link are affiliated with an AP multi-link device (MLD),
   wherein the first non-AP STA operating on the first link and a second non-AP STA operating on the second link affiliated with a non-AP MLD,
   wherein the management frames include an All Updates Included subfield indicating whether updated elements of the second AP based on a critical update for the second AP are included in the management frames, and
   wherein based on the All Updates Included subfield set to 1, the updated elements of the second AP are included in the management frames until the next delivery traffic indication message (DTIM) of the first AP.

6. A method in a wireless local area network (WLAN) system, the method comprising:
- generating, by a first access point (AP), management frames; and
- transmitting, by the first AP, the management frames to a first non-AP station (STA),
- wherein the first AP operating on a first link and a second AP operating on a second link are affiliated with an AP multi-link device (MLD),
- wherein the first non-AP STA operating on the first link and a second non-AP STA operating on the second link affiliated with a non-AP MLD,
- wherein the management frames include an All Updates Included subfield indicating whether updated elements of the second AP based on a critical update for the second AP are included in the management frames, and
- wherein based on the All Updates Included subfield set to 1, the updated elements of the second AP are included in the management frames until the next delivery traffic indication message (DTIM) of the first AP.

7. The method of claim 6, wherein the management frames further include information on the second link and information on a current change sequence number of the second AP,
- wherein based on the critical update for the second AP, a value of the current change sequence number of the second AP is increased by 1.

8. The method of claim 7, wherein the information on the current change sequence number of the second AP is a change sequence number or count value of a basic service set (BSS) parameter.

9. The method of claim 6, wherein the management frames include a beacon frame and an unsolicited probe response frame;
- wherein the beacon frame and the unsolicited probe response frame are broadcast.

* * * * *